US012770454B2

(12) United States Patent
Masinter, II et al.

(10) Patent No.: US 12,770,454 B2
(45) Date of Patent: Oct. 20, 2026

(54) DYNAMIC WHEEL

(71) Applicant: Aristocrat Technologies, Inc., Las Vegas, NV (US)

(72) Inventors: Joseph Masinter, II, Las Vegas, NV (US); Alfred Thomas, Ventura, CA (US); Jehoshua Josue, Las Vegas, NV (US)

(73) Assignee: Aristocrat Technologies, Inc., Las Vegas, NV (US)

( * ) Notice: Subject to any disclaimer, the term of this patent is extended or adjusted under 35 U.S.C. 154(b) by 241 days.

(21) Appl. No.: 18/222,171

(22) Filed: Jul. 14, 2023

(65) Prior Publication Data

US 2024/0054852 A1 Feb. 15, 2024

Related U.S. Application Data

(60) Provisional application No. 63/407,803, filed on Sep. 19, 2022, provisional application No. 63/397,057, filed on Aug. 11, 2022.

(51) Int. Cl.
*G07F 17/00* (2006.01)
*G07F 17/32* (2006.01)

(52) U.S. Cl.
CPC ...... *G07F 17/3213* (2013.01); *G07F 17/3209* (2013.01); *G07F 17/3262* (2013.01); *G07F 17/3267* (2013.01)

(58) Field of Classification Search
None
See application file for complete search history.

(56) References Cited

U.S. PATENT DOCUMENTS 3,656,362 A * 4/1972 Buchsteiner ............ F16H 27/04 74/393
5,755,440 A * 5/1998 Sher .......................... A63F 5/00 463/32
6,168,519 B1 1/2001 Nakagawa
6,402,619 B1 6/2002 Sato
7,789,756 B2 9/2010 Jones
7,997,987 B2 8/2011 Johnson
(Continued)

OTHER PUBLICATIONS

Office Action (Non-Final Rejection) dated Aug. 7, 2025 for U.S. Appl. No. 18/222,054 (pp. 1-9).
(Continued)

*Primary Examiner* — Paul A D'Agostino
(74) *Attorney, Agent, or Firm* — Blank Rome LLP

(57) ABSTRACT

A game involves selection between two opponents using a segmented wheel. Different jackpots and awards may be configured according to the odds of triggering the bonus game, selecting the opponents, selecting which of the opponents is the winner and which is the loser, selecting an order of the opponents (such as a home and visitor (or away) team), and so on. In various embodiments, one or more wheels may be displayed on a main screen associated with play of a game via multiple electronic gaming machines. Selections from the multiple electronic gaming machines may be used to alter game results on the main screen and/or the multiple electronic gaming machines, RTP, provide customized outputs to the main screen and/or the multiple electronic gaming machines, and so on.

11 Claims, 50 Drawing Sheets

(56) References Cited

U.S. PATENT DOCUMENTS 8,036,132 B1 * 10/2011 Beattie, Jr. .......... H04L 43/0864 370/242
8,100,754 B2 1/2012 Bigelow, Jr.
8,147,339 B1 4/2012 Perry
8,282,461 B2 10/2012 Berman
8,282,464 B2 10/2012 Chongolnee
8,366,535 B2 * 2/2013 Watkins .................. G07F 17/34 463/31
8,535,141 B2 9/2013 Rommerdahl et al.
8,715,050 B1 5/2014 Booth
8,731,289 B2 5/2014 Straub
8,845,437 B2 9/2014 Lim
8,898,252 B2 11/2014 Mccaffrey
8,932,125 B1 1/2015 Harris
9,117,134 B1 8/2015 Geiss
9,616,329 B2 4/2017 Szufnara
9,776,091 B1 10/2017 Lebrun
9,826,898 B1 11/2017 Jin
10,118,097 B2 11/2018 Stevens
10,207,191 B2 2/2019 Jensen
10,314,477 B1 6/2019 Goodsitt
10,369,476 B2 8/2019 Pearce
10,665,052 B2 5/2020 Chapman
10,878,540 B1 12/2020 Stevens
11,024,114 B2 6/2021 Kroupp
11,141,659 B2 10/2021 Matsushita
11,504,625 B2 11/2022 Stevens
11,830,121 B1 11/2023 Starke
11,872,492 B2 1/2024 Stevens
12,380,759 B2 8/2025 Milosevich
12,430,816 B2 9/2025 Miyamoto
2002/0042294 A1 4/2002 Pau
2006/0046823 A1 3/2006 Kaminkow
2006/0131156 A1 * 6/2006 Voelckers ............ H01H 25/041 200/512
2006/0170155 A1 * 8/2006 Silverman ................. A63F 5/00 273/143 R
2007/0004510 A1 * 1/2007 Underdahl .......... G07F 17/3211 463/29
2007/0069460 A1 3/2007 Hein
2007/0073908 A1 * 3/2007 Gormley ............ G05B 19/0421 710/8
2007/0139769 A1 * 6/2007 DeCusatis ............ H04N 13/341 348/E13.058
2007/0191101 A1 8/2007 Coliz
2007/0265083 A1 * 11/2007 Ikebata ................... A63F 13/45 463/37
2008/0004098 A1 1/2008 Bennett
2008/0004100 A1 * 1/2008 Hein ................... G07F 17/3267 463/20
2008/0020827 A1 * 1/2008 Underdahl .......... G07F 17/3223 463/25
2008/0214266 A1 * 9/2008 Phillips ............... G07F 17/3213 463/17
2009/0082882 A1 * 3/2009 Parfitt .................. G05B 19/054 700/14
2009/0083589 A1 * 3/2009 Fulton .................... G05B 19/05 714/48
2009/0227314 A1 9/2009 Bennett
2010/0304806 A1 12/2010 Coleman
2011/0086702 A1 4/2011 Borst
2011/0118014 A1 5/2011 Mitchell
2011/0218027 A1 9/2011 Manz
2011/0306398 A1 * 12/2011 Boch ....................... A63F 13/52 463/7
2012/0100911 A1 * 4/2012 Rejen ...................... A63F 13/52 463/31
2012/0122545 A1 5/2012 Watkins
2012/0157180 A1 6/2012 Baerlocher
2012/0172103 A1 * 7/2012 Gurule ...................... A63F 5/00 463/17
2012/0220376 A1 8/2012 Takayama
2013/0205022 A1 * 8/2013 Kagan ..................... H04L 67/56 709/224
2013/0207988 A1 8/2013 Artigue
2014/0011595 A1 1/2014 Muller
2014/0066196 A1 3/2014 Crenshaw
2014/0094280 A1 4/2014 Berman
2014/0113698 A1 * 4/2014 Rakestraw .......... G07F 17/3239 463/20
2014/0194182 A1 7/2014 Young
2014/0357360 A1 12/2014 Shono
2015/0087378 A1 3/2015 Louie
2015/0126268 A1 * 5/2015 Keilwert ............. G07F 17/3206 463/23
2015/0235351 A1 8/2015 Mirbach
2015/0279149 A1 10/2015 Alexander
2015/0287227 A1 * 10/2015 Reeves ................... G06T 11/26 345/440
2015/0294529 A1 * 10/2015 Loose ................. G07F 17/3213 463/20
2015/0324217 A1 * 11/2015 Shilmover .......... G06F 9/45558 718/1
2016/0188181 A1 * 6/2016 Smith ................. G06F 3/04886 715/765
2016/0300454 A1 10/2016 Uss
2016/0366330 A1 * 12/2016 Boliek .................. G06F 3/0484
2017/0050107 A1 * 2/2017 Hendon .................. A63F 5/007
2017/0236382 A1 * 8/2017 Colvin ................ G07F 17/3211 463/17
2017/0242667 A1 * 8/2017 Kotman ................. G16B 50/00
2017/0270236 A1 * 9/2017 Yamaura ................. G06F 30/20
2017/0301310 A1 10/2017 Bonnier
2018/0043257 A1 2/2018 Stevens
2019/0091581 A1 3/2019 Reiche, III
2019/0347896 A1 11/2019 Beria
2019/0370545 A1 * 12/2019 Josephson .............. G06V 20/20
2019/0371125 A1 * 12/2019 Nelson ................ G07F 17/3213
2019/0392674 A1 12/2019 Hawkins
2020/0026354 A1 * 1/2020 Swindells ............... G06F 3/016
2020/0306630 A1 * 10/2020 Karlsson .............. A63F 13/355
2020/0306631 A1 * 10/2020 Karlsson .............. A63F 13/355
2020/0327778 A1 10/2020 Chesworth
2021/0005058 A1 1/2021 Pennington
2021/0035414 A1 2/2021 Kashif
2021/0065515 A1 * 3/2021 Hendricks ........... G07F 17/3267
2021/0133160 A1 * 5/2021 Craft ...................... G06F 16/148
2021/0158655 A1 * 5/2021 Halvorson .......... G07F 17/3209
2021/0213361 A1 7/2021 Abecassis
2021/0228990 A1 7/2021 Yoo
2021/0252392 A1 * 8/2021 Stevens .................... G06F 3/016
2021/0291731 A1 * 9/2021 Chugh ..................... G06F 3/016
2021/0312761 A1 * 10/2021 Abrahamson ....... G07F 17/3293
2022/0076531 A1 * 3/2022 Cuddy ................ G07F 17/3213
2022/0148232 A1 5/2022 Sollami
2022/0237986 A1 * 7/2022 Watkins .............. G07F 17/3211
2022/0395744 A1 12/2022 Marsh
2023/0005332 A1 * 1/2023 Abrahamson ........... A63F 5/043
2023/0015622 A1 1/2023 Paul
2023/0117304 A1 4/2023 Sears
2023/0316850 A1 10/2023 Peterson
2023/0410602 A1 12/2023 Peterson
2024/0087181 A1 3/2024 Andersson
2024/0193825 A1 6/2024 Ebelin
2025/0078620 A1 3/2025 Loomes

OTHER PUBLICATIONS

"Madden 2004 User Manual", 2004 (retrieved Nov. 28, 2025, EA Sports (Year: 2004).
Office Action (Non-Final Rejection) dated Dec. 2, 2025 for U.S. Appl. No. 18/222,110 (pp. 1-13).
Office Action (Notice of Allowance and Fees Due (PTOL-85)) dated Feb. 25, 2026 for US App. No.
Office Action (Ex Parte Quayle Action) dated Apr. 28, 2026 for U.S. Appl. No. 18/222,054 (pp. 1-4).

* cited by examiner

1600

| 1601 | | 1602 | |
|---|---|---|---|
| PARAMETER/CONDITION | 1 | AUDIO AND/OR VISUAL OUTPUT | 1 |
| PARAMETER/CONDITION | 2 | AUDIO AND/OR VISUAL OUTPUT | 2 |
| PARAMETER/CONDITION | 3 | AUDIO AND/OR VISUAL OUTPUT | 3 |
| PARAMETER/CONDITION | 4 | AUDIO AND/OR VISUAL OUTPUT | 4 |
| PARAMETER/CONDITION | 5 | AUDIO AND/OR VISUAL OUTPUT | 5 |
| PARAMETER/CONDITION | 6 | AUDIO AND/OR VISUAL OUTPUT | 6 |
| PARAMETER/CONDITION | 7 | AUDIO AND/OR VISUAL OUTPUT | 7 |
| PARAMETER/CONDITION | 8 | AUDIO AND/OR VISUAL OUTPUT | 8 |
| PARAMETER/CONDITION | 9 | AUDIO AND/OR VISUAL OUTPUT | 9 |
| PARAMETER/CONDITION | 10 | AUDIO AND/OR VISUAL OUTPUT | 10 |

*FIG. 16*

1900

| 1901 | 1902 | 1903 |
|---|---|---|
| TEAM 1 | TRUE RED 5 | GOLD |
| TEAM 2 | NAVY 1 | GOLD 3 |
| TEAM 3 | BLACK 1148 | GOLD 3 |
| TEAM 4 | DARK RED | TAN 1364 |
| TEAM 5 | NAVY 1 | WHITE 1350 |
| TEAM 6 | TRUE BLUE 15 | ORANGE 8 |
| TEAM 7 | TRUE BLUE 15 | WHITE 1350 |
| TEAM 8 | NAVY 1 | ORANGE 8 |
| TEAM 9 | BLACK 1148 | GOLD 3 |
| TEAM 10 | TRUE BLUE 15 | TRUE RED 5 |

*FIG. 19*

DYNAMIC WHEEL

CROSS-REFERENCE TO RELATED APPLICATIONS

This application is a nonprovisional and claims the benefit under 35 U.S.C. 119(e) to U.S. Provisional Patent Application No. 63/397,057, filed Aug. 11, 2022, and U.S. Provisional Patent Application No. 63/407,803, filed Sep. 19, 2022, the contents of which are incorporated herein by reference as if fully disclosed herein.

BACKGROUND

Electronic gaming machines ("EGMs") or gaming devices provide a variety of wagering games such as slot games, video poker games, video blackjack games, roulette games, video bingo games, keno games, and other types of games that are frequently offered at casinos and other locations. Play on EGMs typically involves a player establishing a credit balance by inputting money, or another form of monetary credit, and placing a monetary wager (from the credit balance) on one or more outcomes of an instance (or single play) of a primary or base game. In some cases, a player may qualify for a special mode of the base game, a secondary game, or a bonus round of the base game by attaining a certain winning combination or triggering event in, or related to, the base game, or after the player is randomly awarded the special mode, secondary game, or bonus round. In the special mode, secondary game, or bonus round, the player is given an opportunity to win extra game credits, game tokens, or other forms of payout. In the case of "game credits" that are awarded during play, the game credits are typically added to a credit meter total on the EGM and can be provided to the player upon completion of a gaming session or when the player wants to "cash out."

"Slot" type games are often displayed to the player in the form of various symbols arrayed in a row-by-column grid or matrix. Specific matching combinations of symbols along predetermined paths (or paylines) through the matrix indicate the outcome of the game. The display typically highlights winning combinations/outcomes for identification by the player. Matching combinations and their corresponding awards are usually shown in a "pay-table" which is available to the player for reference. Often, the player may vary his/her wager to include differing numbers of paylines and/or the amount bet on each line. By varying the wager, the player may sometimes alter the frequency or number of winning combinations, frequency or number of secondary games, and/or the amount awarded.

Typical games use a random number generator (RNG) to randomly determine the outcome of each game. The game is designed to return a certain percentage of the amount wagered back to the player over the course of many plays or instances of the game, which is generally referred to as return to player (RTP). The RTP and randomness of the RNG ensure the fairness of the games and are highly regulated. Upon initiation of play, the RNG randomly determines a game outcome and symbols are then selected which correspond to that outcome. Notably, some games may include an element of skill on the part of the player and are therefore not entirely random.

SUMMARY

In some embodiments, a game may involve selection of a winner between two opponents using a segmented wheel.

Different jackpots and awards may be configured according to the odds of triggering the bonus game, selecting the opponents, selecting which of the opponents is the winner and which is the loser, selecting an order of the opponents (such as a home and visitor (or away) team), and so on. The highest jackpot may be configured for triggering the bonus game and selecting the opponents in their precise order, including the winner and loser, as this may correspond to the lowest compound odds of occurring. This may enable higher jackpots and/or other game awards than would otherwise be possible based on bet amounts without violating a target return to player ("RTP"). Various configurations are possible and contemplated without departing from the scope of the present disclosure.

In various embodiments, one or more wheels may be displayed on a main screen associated with play of a game via multiple electronic gaming machines. Selections from the multiple electronic gaming machines may be used to alter game results on the main screen and/or the multiple electronic gaming machines, RTP, provide customized outputs to the main screen and/or the multiple electronic gaming machines, and so on. Various configurations are possible and contemplated without departing from the scope of the present disclosure.

BRIEF DESCRIPTION OF THE DRAWINGS

FIG. 16 depicts a chart of parameter/condition sets and associated audio and/or visual outputs that may be used by the method of FIG. 15.

FIG. 19 depicts a chart of opponents with associated primary and alternate colors.

DESCRIPTION

Figure 1:
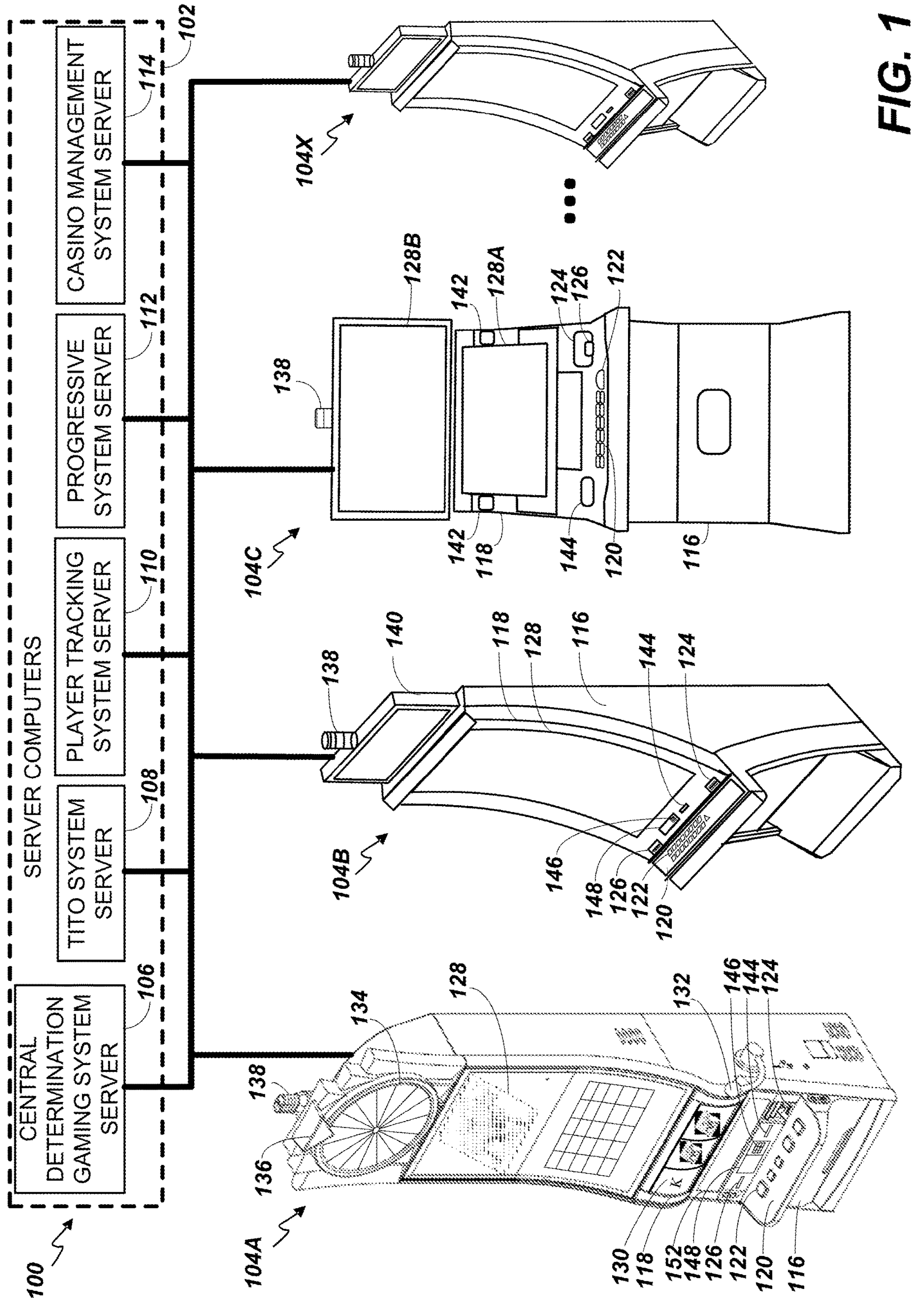
FIG. 1 is an exemplary diagram showing several EGMs networked with various gaming related servers.

In some embodiments, a bonus game may be configured to be triggerable from a base game. The bonus game may involve selection of a winner between two opponents using a segmented wheel. Different jackpots and awards may be configured according to the odds of triggering the bonus game, selecting the opponents, selecting which of the opponents is the winner and which is the loser, selecting an order of the opponents (such as a home and away or visitor team), and so on. The highest jackpot may be configured for triggering the bonus game and selecting the opponents in their precise order, including the winner and loser, as this may correspond to the lowest compound odds of occurring. This may enable higher jackpots and/or other game awards than would otherwise be possible based on bet amounts without violating a target return to player ("RTP"). Various configurations are possible and contemplated without departing from the scope of the present disclosure.

In a number of embodiments, wheel games (such as may involve one or more base games, one or more bonus games, and so on) may use one or more various configurations. Such configurations may improve a player's understanding of transitions between base games and bonus games, arrange information on a screen to be more readily understood by a player, and so on. Some such configurations may involve animating a transition between a first wheel with one segment for each of two opponents to a second wheel with multiple segments for each of the two opponents. Various configurations are possible and contemplated without departing from the scope of the present disclosure.

In various embodiments, one or more wheels may be displayed on a main screen associated with play of a game via multiple electronic gaming machines. Selections from the multiple electronic gaming machines may be used to alter game results on the main screen and/or the multiple electronic gaming machines, RTP, provide customized outputs to the main screen and/or the multiple electronic gaming machines, and so on. Various configurations are possible and contemplated without departing from the scope of the present disclosure.

In some embodiments, different wheel layouts may be selected for use in one or more wheel games. The wheel layouts may be selected for use in the one or more wheel games in a way that maintains a target RTP. Various configurations are possible and contemplated without departing from the scope of the present disclosure.

In various embodiments, one or more wheel layouts for one or more wheel games may be changed in response to player requests. Such changes may improve the chase for the player as the player may be able to increase the chances that a favorite team will win, a hated team will lose, and so on. However, such changes may alter the odds of a potential outcome from the game, thus potentially violating a target RTP and/or one or more regulations and/or laws. In order to maintain RTP, various techniques may be used to compensate for the effects of such changes. Various configurations are possible and contemplated without departing from the scope of the present disclosure.

One issue with dynamic wheel type games and other games that simulate play or sporting and/or other events is that the simulation of the play of the sporting and/or other events is not as dynamic as actual play of the sporting and/or other events. Even when different sets of opponents and scores are used to simulate the play of the sporting and/or other events, the play is still not as dynamic as actual play of the sporting and/or other events due to the simplification in how the play is represented, the lesser number of happenstances that may occur during the simulation as opposed to the play, and so on. This may cause the user interface for the dynamic wheel type games and other games to be unsatisfying for players. However, the present disclosure provides an improved user interface that is more dynamic by providing output that is dependent upon one or more parameters and/or conditions of the game. In some embodiments, an engine evaluates one or more parameters and/or conditions, selects one or more audio and/or visual outputs based on the evaluation, and outputs the audio and/or visual output.

Another issue with dynamic wheel type games and other games that simulate play or sporting and/or other events is that one or more user interfaces presented include one or more colors that represent one or more opponents, but the colors selected may be similar. Presentation of similar colors to represent different opponents may impair user interfaces by making players unable to tell what on a display represents one opponent and what represents another. However, the present disclosure provides an improved user interface that selects an alternate opponent color for output upon determining that selected opponent colors are similar. In various embodiments, opponents may be determined, colors for the opponents may be retrieved, a determination may be made whether or not the colors are similar, and if the colors are determined to be similar, retrieves an alternate color.

Yet another issue with dynamic wheel type games and other wheel type games is that there may be a disconnect between animating spinning of a wheel responsive to user touch input and animating spinning of the wheel to arrive at a wheel stop position corresponding to a game outcome. For example, a player may touch and slide the wheel on a display to start the wheel spinning. The wheel may then be animated spinning responsive to the player's user touch input to mimic spinning of a physical wheel. However, the wheel does not stop at a wheel stop position responsive to the player's user touch input as the outcome of the game may be controlled, such as where a wheel stop position is randomly determined using a random number generator that produces numbers related to wheel stop positions. Animation of the wheel spinning to the wheel stop position may involve determining a current wheel position and then animating the wheel from the current wheel position to the determined wheel stop position. However, if the wheel is currently spinning responsive to the player's user touch input, the wheel will have spun past the current wheel position by the time the animation of the wheel spinning to the wheel stop position start. This may impair the user interface by causing the spinning of the wheel to jerk upon switching over from animating spinning of the wheel responsive to the user touch input and animating spinning of the wheel to the wheel stop position. The present disclosure improves the user interface by controlling switchover from animating spinning of the wheel responsive to the user touch input and animating spinning of the wheel to the wheel stop position to prevent a perceptible jerk. In a number of embodiments, user touch input may be received, a first script may animate a wheel responsive to the user touch input, an initial wheel speed may be determined according to the user touch input, the wheel may be stopped, and a second script may animate the wheel spinning at the initial wheel speed and stopping at a determined stop position. As the second script may animate the wheel a fraction of a second after the wheel is stopped, any jerk between the animation performed by the first script and the animation performed by the second script may be visually imperceptible.

FIG. 1 illustrates several different models of EGMs which may be networked to various gaming related servers. Shown is a system 100 in a gaming environment including one or more server computers 102 (e.g., slot servers of a casino) that are in communication, via a communications network, with one or more gaming devices 104A-104X (EGMs, slots, video poker, bingo machines, etc.) that can implement one or more aspects of the present disclosure. The gaming devices 104A-104X may alternatively be portable and/or remote gaming devices such as, but not limited to, a smart phone, a tablet, a laptop, or a game console. Gaming devices 104A-104X utilize specialized software and/or hardware to form non-generic, particular machines or apparatuses that comply with regulatory requirements regarding devices used for wagering or games of chance that provide monetary awards.

Communication between the gaming devices 104A-104X and the server computers 102, and among the gaming devices 104A-104X, may be direct or indirect using one or more communication protocols. As an example, gaming devices 104A-104X and the server computers 102 can communicate over one or more communication networks, such as over the Internet through a website maintained by a computer on a remote server or over an online data network including commercial online service providers, Internet service providers, private networks (e.g., local area networks and enterprise networks), and the like (e.g., wide area networks). The communication networks could allow gaming devices 104A-104X to communicate with one another and/or the server computers 102 using a variety of communication-based technologies, such as radio frequency (RF) (e.g., wireless fidelity (WiFi®) and Bluetooth®), cable TV, satellite links and the like.

In some implementation, server computers 102 may not be necessary and/or preferred. For example, in one or more implementations, a stand-alone gaming device such as gaming device 104A, gaming device 104B or any of the other gaming devices 104C-104X can implement one or more aspects of the present disclosure. However, it is typical to find multiple EGMs connected to networks implemented with one or more of the different server computers 102 described herein.

The server computers 102 may include a central determination gaming system server 106, a ticket-in-ticket-out (TITO) system server 108, a player tracking system server 110, a progressive system server 112, and/or a casino management system server 114. Gaming devices 104A-104X may include features to enable operation of any or all servers for use by the player and/or operator (e.g., the casino, resort, gaming establishment, tavern, pub, etc.). For example, game outcomes may be generated on a central determination gaming system server 106 and then transmitted over the network to any of a group of remote terminals or remote gaming devices 104A-104X that utilize the game outcomes and display the results to the players.

Gaming device 104A is often of a cabinet construction which may be aligned in rows or banks of similar devices for placement and operation on a casino floor. The gaming device 104A often includes a main door which provides access to the interior of the cabinet. Gaming device 104A typically includes a button area or button deck 120 accessible by a player that is configured with input switches or buttons 122, an access channel for a bill validator 124, and/or an access channel for a ticket-out printer 126.

In FIG. 1, gaming device 104A is shown as a Relm XL™ model gaming device manufactured by Aristocrat® Technologies, Inc. As shown, gaming device 104A is a reel machine having a gaming display area 118 comprising a number (typically 3 or 5) of mechanical reels 130 with various symbols displayed on them. The mechanical reels 130 are independently spun and stopped to show a set of symbols within the gaming display area 118 which may be used to determine an outcome to the game.

In many configurations, the gaming device 104A may have a main display 128 (e.g., video display monitor) mounted to, or above, the gaming display area 118. The main display 128 can be a high-resolution liquid crystal display (LCD), plasma, light emitting diode (LED), or organic light emitting diode (OLED) panel which may be flat or curved as shown, a cathode ray tube, or other conventional electronically controlled video monitor.

In some implementations, the bill validator 124 may also function as a "ticket-in" reader that allows the player to use a casino issued credit ticket to load credits onto the gaming device 104A (e.g., in a cashless ticket ("TITO") system). In such cashless implementations, the gaming device 104A may also include a "ticket-out" printer 126 for outputting a credit ticket when a "cash out" button is pressed. Cashless TITO systems are used to generate and track unique barcodes or other indicators printed on tickets to allow players to avoid the use of bills and coins by loading credits using a ticket reader and cashing out credits using a ticket-out printer 126 on the gaming device 104A. The gaming device 104A can have hardware meters for purposes including ensuring regulatory compliance and monitoring the player credit balance. In addition, there can be additional meters that record the total amount of money wagered on the gaming device, total amount of money deposited, total amount of money withdrawn, total amount of winnings on gaming device 104A.

In some implementations, a player tracking card reader 144, a transceiver for wireless communication with a mobile device (e.g., a player's smartphone), a keypad 146, and/or an illuminated display 148 for reading, receiving, entering, and/or displaying player tracking information is provided in gaming device 104A. In such implementations, a game controller within the gaming device 104A can communicate with the player tracking system server 110 to send and receive player tracking information.

Gaming device 104A may also include a bonus topper wheel 134. When bonus play is triggered (e.g., by a player achieving a particular outcome or set of outcomes in the primary game), bonus topper wheel 134 is operative to spin and stop with indicator arrow 136 indicating the outcome of the bonus game. Bonus topper wheel 134 is typically used to play a bonus game, but it could also be incorporated into play of the base or primary game.

A candle 138 may be mounted on the top of gaming device 104A and may be activated by a player (e.g., using a switch or one of buttons 122) to indicate to operations staff that gaming device 104A has experienced a malfunction or the player requires service. The candle 138 is also often used to indicate a jackpot has been won and to alert staff that a hand payout of an award may be needed.

There may also be one or more information panels 152 which may be a back-lit, silkscreened glass panel with lettering to indicate general game information including, for example, a game denomination (e.g., $0.25 or $1), pay lines, pay tables, and/or various game related graphics. In some implementations, the information panel(s) 152 may be implemented as an additional video display.

Gaming devices 104A have traditionally also included a handle 132 typically mounted to the side of main cabinet 116 which may be used to initiate game play.

Figure 2A:
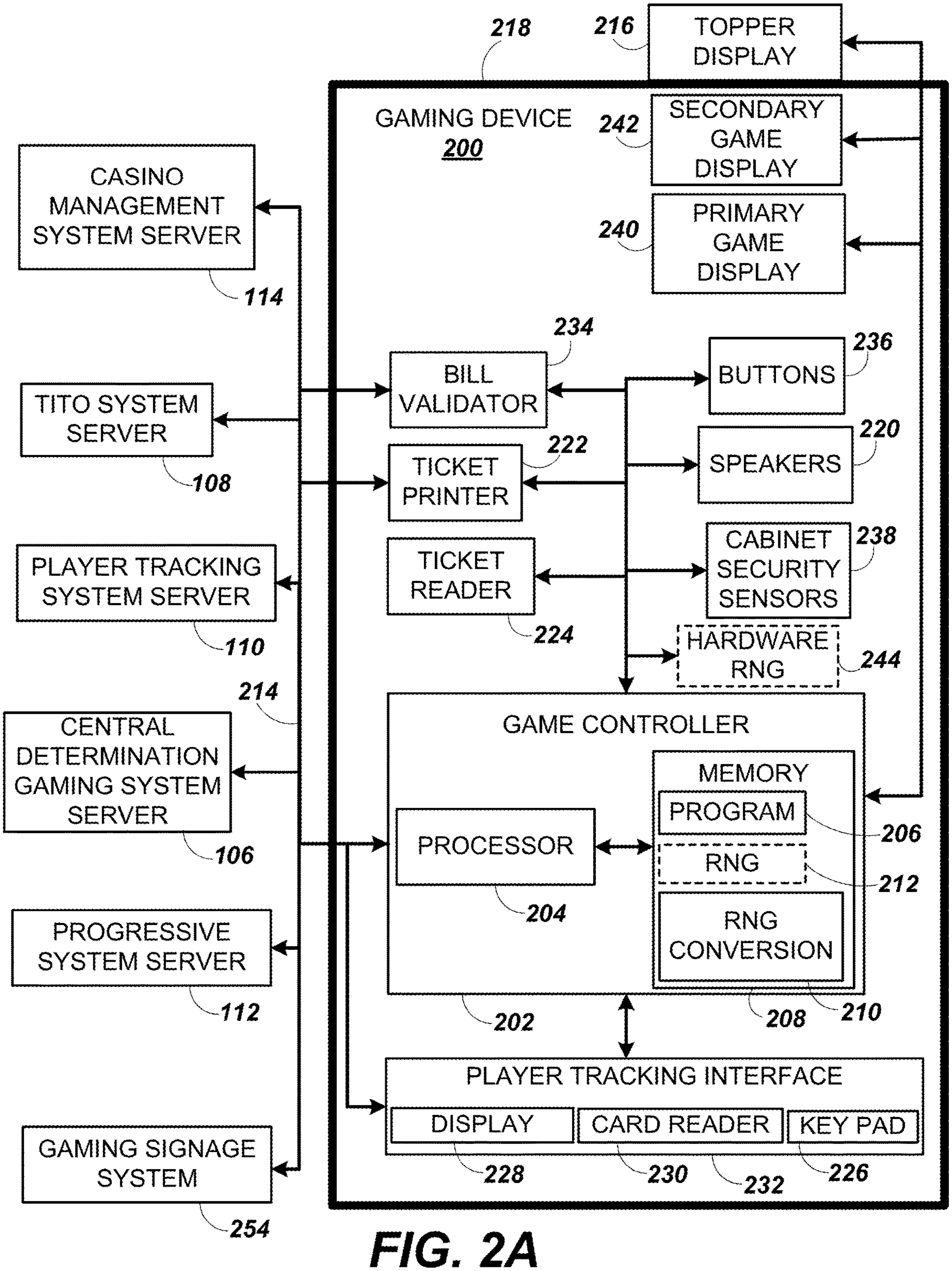
FIG. 2A is a block diagram showing various functional elements of an exemplary EGM.

Many or all the above described components can be controlled by circuitry (e.g., a game controller) housed inside the main cabinet 116 of the gaming device 104A, the details of which are shown in FIG. 2A.

An alternative example gaming device 104B illustrated in FIG. 1 is the Arc™ model gaming device manufactured by Aristocrat® Technologies, Inc. Note that where possible, reference numerals identifying similar features of the gaming device 104A implementation are also identified in the gaming device 104B implementation using the same reference numbers. Gaming device 104B does not include physical reels and instead shows game play functions on main display 128. An optional topper screen 140 may be used as a secondary game display for bonus play, to show game features or attraction activities while a game is not in play, or any other information or media desired by the game designer or operator. In some implementations, the optional topper screen 140 may also or alternatively be used to display progressive jackpot prizes available to a player during play of gaming device 104B.

Example gaming device 104B includes a main cabinet 116 including a main door which opens to provide access to the interior of the gaming device 104B. The main or service door is typically used by service personnel to refill the ticket-out printer 126 and collect bills and tickets inserted into the bill validator 124. The main or service door may also be accessed to reset the machine, verify and/or upgrade the software, and for general maintenance operations.

Another example gaming device 104C shown is the Helix™ model gaming device manufactured by Aristocrat®

Technologies, Inc. Gaming device 104C includes a main display 128A that is in a landscape orientation. Although not illustrated by the front view provided, the main display 128A may have a curvature radius from top to bottom, or alternatively from side to side. In some implementations, main display 128A is a flat panel display. Main display 128A is typically used for primary game play while secondary display 128B is typically used for bonus game play, to show game features or attraction activities while the game is not in play or any other information or media desired by the game designer or operator. In some implementations, example gaming device 104C may also include speakers 142 to output various audio such as game sound, background music, etc.

Many different types of games, including mechanical slot games, video slot games, video poker, video black jack, video pachinko, keno, bingo, and lottery, may be provided with or implemented within the depicted gaming devices 104A-104C and other similar gaming devices. Each gaming device may also be operable to provide many different games. Games may be differentiated according to themes, sounds, graphics, type of game (e.g., slot game vs. card game vs. game with aspects of skill), denomination, number of paylines, maximum jackpot, progressive or non-progressive, bonus games, and may be deployed for operation in Class 2 or Class 3, etc.

FIG. 2A is a block diagram depicting exemplary internal electronic components of a gaming device 200 connected to various external systems. All or parts of the gaming device 200 shown could be used to implement any one of the example gaming devices 104A-X depicted in FIG. 1. As shown in FIG. 2A, gaming device 200 includes a topper display 216 or another form of a top box (e.g., a topper wheel, a topper screen, etc.) that sits above cabinet 218. Cabinet 218 or topper display 216 may also house a number of other components which may be used to add features to a game being played on gaming device 200, including speakers 220, a ticket printer 222 which prints bar-coded tickets or other media or mechanisms for storing or indicating a player's credit value, a ticket reader 224 which reads bar-coded tickets or other media or mechanisms for storing or indicating a player's credit value, and a player tracking interface 232. Player tracking interface 232 may include a keypad 226 for entering information, a player tracking display 228 for displaying information (e.g., an illuminated or video display), a card reader 230 for receiving data and/or communicating information to and from media or a device such as a smart phone enabling player tracking. FIG. 2 also depicts utilizing a ticket printer 222 to print tickets for a TITO system server 108. Gaming device 200 may further include a bill validator 234, player-input buttons 236 for player input, cabinet security sensors 238 to detect unauthorized opening of the cabinet 218, a primary game display 240, and a secondary game display 242, each coupled to and operable under the control of game controller 202.

The games available for play on the gaming device 200 are controlled by a game controller 202 that includes one or more processors 204. Processor 204 represents a general-purpose processor, a specialized processor intended to perform certain functional tasks, or a combination thereof. As an example, processor 204 can be a central processing unit (CPU) that has one or more multi-core processing units and memory mediums (e.g., cache memory) that function as buffers and/or temporary storage for data. Alternatively, processor 204 can be a specialized processor, such as an application specific integrated circuit (ASIC), graphics processing unit (GPU), field-programmable gate array (FPGA), digital signal processor (DSP), or another type of hardware accelerator. In another example, processor 204 is a system on chip (SoC) that combines and integrates one or more general-purpose processors and/or one or more specialized processors. Although FIG. 2A illustrates that game controller 202 includes a single processor 204, game controller 202 is not limited to this representation and instead can include multiple processors 204 (e.g., two or more processors).

FIG. 2A illustrates that processor 204 is operatively coupled to memory 208. Memory 208 is defined herein as including volatile and nonvolatile memory and other types of non-transitory data storage components. Volatile memory is memory that do not retain data values upon loss of power. Nonvolatile memory is memory that do retain data upon a loss of power. Examples of memory 208 include random access memory (RAM), read-only memory (ROM), hard disk drives, solid-state drives, universal serial bus (USB) flash drives, memory cards accessed via a memory card reader, floppy disks accessed via an associated floppy disk drive, optical discs accessed via an optical disc drive, magnetic tapes accessed via an appropriate tape drive, and/or other memory components, or a combination of any two or more of these memory components. In addition, examples of RAM include static random access memory (SRAM), dynamic random access memory (DRAM), magnetic random access memory (MRAM), and other such devices. Examples of ROM include a programmable read-only memory (PROM), an erasable programmable read-only memory (EPROM), an electrically erasable programmable read-only memory (EEPROM), or other like memory device. Even though FIG. 2A illustrates that game controller 202 includes a single memory 208, game controller 202 could include multiple memories 208 for storing program instructions and/or data.

Memory 208 can store one or more game programs 206 that provide program instructions and/or data for carrying out various implementations (e.g., game mechanics) described herein. Stated another way, game program 206 represents an executable program stored in any portion or component of memory 208. In one or more implementations, game program 206 is embodied in the form of source code that includes human-readable statements written in a programming language or machine code that contains numerical instructions recognizable by a suitable execution system, such as a processor 204 in a game controller or other system. Examples of executable programs include: (1) a compiled program that can be translated into machine code in a format that can be loaded into a random access portion of memory 208 and run by processor 204; (2) source code that may be expressed in proper format such as object code that is capable of being loaded into a random access portion of memory 208 and executed by processor 204; and (3) source code that may be interpreted by another executable program to generate instructions in a random access portion of memory 208 to be executed by processor 204.

Alternatively, game programs 206 can be set up to generate one or more game instances based on instructions and/or data that gaming device 200 exchanges with one or more remote gaming devices, such as a central determination gaming system server 106 (not shown in FIG. 2A but shown in FIG. 1). For purpose of this disclosure, the term "game instance" refers to a play or a round of a game that gaming device 200 presents (e.g., via a user interface (UI)) to a player. The game instance is communicated to gaming device 200 via the network 214 and then displayed on gaming device 200. For example, gaming device 200 may execute game program 206 as video streaming software that allows the game to be displayed on gaming device 200. When a game is stored on gaming device 200, it may be loaded from memory 208 (e.g., from a read only memory (ROM)) or from the central determination gaming system server 106 to memory 208.

Gaming devices, such as gaming device 200, are highly regulated to ensure fairness and, in many cases, gaming device 200 is operable to award monetary awards (e.g., typically dispensed in the form of a redeemable voucher). Therefore, to satisfy security and regulatory requirements in a gaming environment, hardware and software architectures are implemented in gaming devices 200 that differ significantly from those of general-purpose computers. Adapting general purpose computers to function as gaming devices 200 is not simple or straightforward because of: (1) the regulatory requirements for gaming devices 200, (2) the harsh environment in which gaming devices 200 operate, (3) security requirements, (4) fault tolerance requirements, and (5) the requirement for additional special purpose componentry enabling functionality of an EGM. These differences require substantial engineering effort with respect to game design implementation, game mechanics, hardware components, and software.

One regulatory requirement for games running on gaming device 200 generally involves complying with a certain level of randomness. Typically, gaming jurisdictions mandate that gaming devices 200 satisfy a minimum level of randomness without specifying how a gaming device 200 should achieve this level of randomness. To comply, FIG. 2A illustrates that gaming device 200 could include an RNG 212 that utilizes hardware and/or software to generate RNG outcomes that lack any pattern. The RNG operations are often specialized and non-generic in order to comply with regulatory and gaming requirements. For example, in a slot game, game program 206 can initiate multiple RNG calls to RNG 212 to generate RNG outcomes, where each RNG call and RNG outcome corresponds to an outcome for a reel. In another example, gaming device 200 can be a Class II gaming device where RNG 212 generates RNG outcomes for creating Bingo cards. In one or more implementations, RNG 212 could be one of a set of RNGs operating on gaming device 200. More generally, an output of the RNG 212 can be the basis on which game outcomes are determined by the game controller 202. Game developers could vary the degree of true randomness for each RNG (e.g., pseudorandom) and utilize specific RNGs depending on game requirements. The output of the RNG 212 can include a random number or pseudorandom number (either is generally referred to as a “random number”).

In FIG. 2A, RNG 212 and hardware RNG 244 are shown in dashed lines to illustrate that RNG 212, hardware RNG 244, or both can be included in gaming device 200. In one implementation, instead of including RNG 212, gaming device 200 could include a hardware RNG 244 that generates RNG outcomes. Analogous to RNG 212, hardware RNG 244 performs specialized and non-generic operations in order to comply with regulatory and gaming requirements. For example, because of regulation requirements, hardware RNG 244 could be a random number generator that securely produces random numbers for cryptography use. The gaming device 200 then uses the secure random numbers to generate game outcomes for one or more game features. In another implementation, the gaming device 200 could include both hardware RNG 244 and RNG 212. RNG 212 may utilize the RNG outcomes from hardware RNG 244 as one of many sources of entropy for generating secure random numbers for the game features.

Another regulatory requirement for running games on gaming device 200 includes ensuring a certain level of RTP. Similar to the randomness requirement discussed above, numerous gaming jurisdictions also mandate that gaming device 200 provides a minimum level of RTP (e.g., RTP of at least 75%). A game can use one or more lookup tables (also called weighted tables) as part of a technical solution that satisfies regulatory requirements for randomness and RTP. In particular, a lookup table can integrate game features (e.g., trigger events for special modes or bonus games; newly introduced game elements such as extra reels, new symbols, or new cards; stop positions for dynamic game elements such as spinning reels, spinning wheels, or shifting reels; or card selections from a deck) with random numbers generated by one or more RNGs, so as to achieve a given level of volatility for a target level of RTP. (In general, volatility refers to the frequency or probability of an event such as a special mode, payout, etc. For example, for a target level of RTP, a higher-volatility game may have a lower payout most of the time with an occasional bonus having a very high payout, while a lower-volatility game has a steadier payout with more frequent bonuses of smaller amounts.) Configuring a lookup table can involve engineering decisions with respect to how RNG outcomes are mapped to game outcomes for a given game feature, while still satisfying regulatory requirements for RTP. Configuring a lookup table can also involve engineering decisions about whether different game features are combined in a given entry of the lookup table or split between different entries (for the respective game features), while still satisfying regulatory requirements for RTP and allowing for varying levels of game volatility.

FIG. 2A illustrates that gaming device 200 includes an RNG conversion engine 210 that translates the RNG outcome from RNG 212 to a game outcome presented to a player. To meet a designated RTP, a game developer can set up the RNG conversion engine 210 to utilize one or more lookup tables to translate the RNG outcome to a symbol element, stop position on a reel strip layout, and/or randomly chosen aspect of a game feature. As an example, the lookup tables can regulate a prize payout amount for each RNG outcome and how often the gaming device 200 pays out the prize payout amounts. The RNG conversion engine 210 could utilize one lookup table to map the RNG outcome to a game outcome displayed to a player and a second lookup table as a pay table for determining the prize payout amount for each game outcome. The mapping between the RNG outcome to the game outcome controls the frequency in hitting certain prize payout amounts.

FIG. 2A also depicts that gaming device 200 is connected over network 214 to player tracking system server 110. Player tracking system server 110 may be, for example, an OASIS® system manufactured by Aristocrat® Technologies, Inc. Player tracking system server 110 is used to track play (e.g. amount wagered, games played, time of play and/or other quantitative or qualitative measures) for individual players so that an operator may reward players in a loyalty program. The player may use the player tracking interface 232 to access his/her account information, activate free play, and/or request various information. Player tracking or loyalty programs seek to reward players for their play and help build brand loyalty to the gaming establishment. The rewards typically correspond to the player’s level of patronage (e.g., to the player’s playing frequency and/or total amount of game plays at a given casino). Player tracking rewards may be complimentary and/or discounted meals, lodging, entertainment and/or additional play. Player tracking information may be combined with other information that is now readily obtainable by a casino management system.

When a player wishes to play the gaming device 200, he/she can insert cash or a ticket voucher through a coin acceptor (not shown) or bill validator 234 to establish a credit balance on the gaming device. The credit balance is used by the player to place wagers on instances of the game and to receive credit awards based on the outcome of winning instances. The credit balance is decreased by the amount of each wager and increased upon a win. The player can add additional credits to the balance at any time. The player may also optionally insert a loyalty club card into the card reader 230. During the game, the player views with one or more UIs, the game outcome on one or more of the primary game display 240 and secondary game display 242. Other game and prize information may also be displayed.

For each game instance, a player may make selections, which may affect play of the game. For example, the player may vary the total amount wagered by selecting the amount bet per line and the number of lines played. In many games, the player is asked to initiate or select options during course of game play (such as spinning a wheel to begin a bonus round or select various items during a feature game). The player may make these selections using the player-input buttons 236, the primary game display 240 which may be a touch screen, or using some other device which enables a player to input information into the gaming device 200.

During certain game events, the gaming device 200 may display visual and auditory effects that can be perceived by the player. These effects add to the excitement of a game, which makes a player more likely to enjoy the playing experience. Auditory effects include various sounds that are projected by the speakers 220. Visual effects include flashing lights, strobing lights or other patterns displayed from lights on the gaming device 200 or from lights behind the information panel 152 (FIG. 1).

When the player is done, he/she cashes out the credit balance (typically by pressing a cash out button to receive a ticket from the ticket printer 222). The ticket may be "cashed-in" for money or inserted into another machine to establish a credit balance for play.

Additionally, or alternatively, gaming devices 104A-104X and 200 can include or be coupled to one or more wireless transmitters, receivers, and/or transceivers (not shown in FIGS. 1 and 2A) that communicate (e.g., Bluetooth® or other near-field communication technology) with one or more mobile devices to perform a variety of wireless operations in a casino environment. Examples of wireless operations in a casino environment include detecting the presence of mobile devices, performing credit, points, comps, or other marketing or hard currency transfers, establishing wagering sessions, and/or providing a personalized casino-based experience using a mobile application. In one implementation, to perform these wireless operations, a wireless transmitter or transceiver initiates a secure wireless connection between a gaming device 104A-104X and 200 and a mobile device. After establishing a secure wireless connection between the gaming device 104A-104X and 200 and the mobile device, the wireless transmitter or transceiver does not send and/or receive application data to and/or from the mobile device. Rather, the mobile device communicates with gaming devices 104A-104X and 200 using another wireless connection (e.g., WiFi® or cellular network). In another implementation, a wireless transceiver establishes a secure connection to directly communicate with the mobile device. The mobile device and gaming device 104A-104X and 200 sends and receives data utilizing the wireless transceiver instead of utilizing an external network. For example, the mobile device would perform digital wallet transactions by directly communicating with the wireless transceiver. In one or more implementations, a wireless transmitter could broadcast data received by one or more mobile devices without establishing a pairing connection with the mobile devices.

Although FIGS. 1 and 2A illustrate specific implementations of a gaming device (e.g., gaming devices 104A-104X and 200), the disclosure is not limited to those implementations shown in FIGS. 1 and 2. For example, not all gaming devices suitable for implementing implementations of the present disclosure necessarily include top wheels, top boxes, information panels, cashless ticket systems, and/or player tracking systems. Further, some suitable gaming devices have only a single game display that includes only a mechanical set of reels and/or a video display, while others are designed for bar counters or tabletops and have displays that face upwards. Gaming devices 104A-104X and 200 may also include other processors that are not separately shown. Using FIG. 2A as an example, gaming device 200 could include display controllers (not shown in FIG. 2A) configured to receive video input signals or instructions to display images on game displays 240 and 242. Alternatively, such display controllers may be integrated into the game controller 202. The use and discussion of FIGS. 1 and 2 are examples to facilitate ease of description and explanation.

Figure 2B:
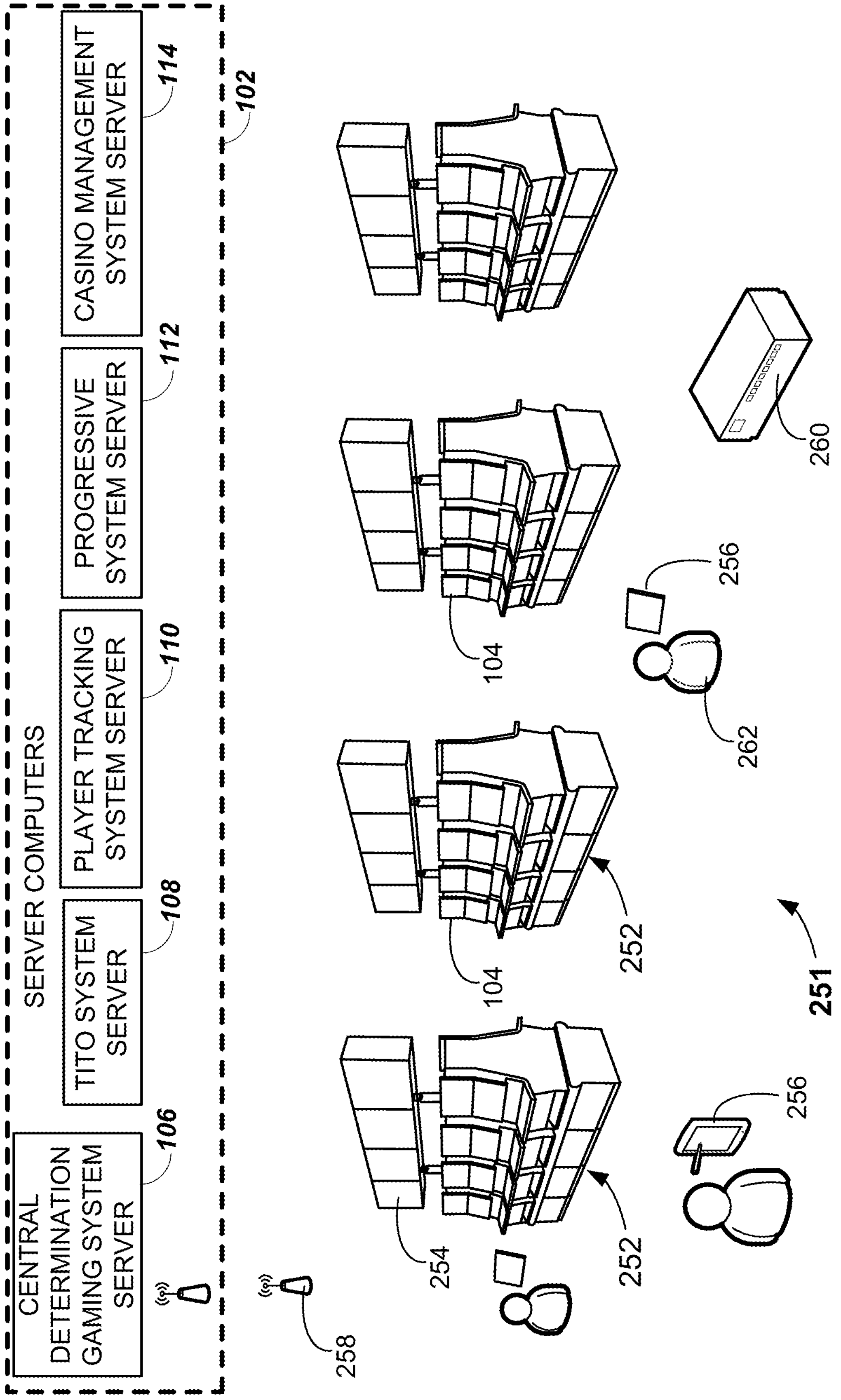
FIG. 2B depicts a casino gaming environment according to one example.

FIG. 2B depicts a casino gaming environment according to one example. In this example, the casino 251 includes banks 252 of EGMs 104. In this example, each bank 252 of EGMs 104 includes a corresponding gaming signage system 254 (also shown in FIG. 2A). According to this implementation, the casino 251 also includes mobile gaming devices 256, which are also configured to present wagering games in this example. The mobile gaming devices 256 may, for example, include tablet devices, cellular phones, smart phones and/or other handheld devices. In this example, the mobile gaming devices 256 are configured for communication with one or more other devices in the casino 251, including but not limited to one or more of the server computers 102, via wireless access points 258.

According to some examples, the mobile gaming devices 256 may be configured for stand-alone determination of game outcomes. However, in some alternative implementations the mobile gaming devices 256 may be configured to receive game outcomes from another device, such as the central determination gaming system server 106, one of the EGMs 104, etc.

Some mobile gaming devices 256 may be configured to accept monetary credits from a credit or debit card, via a wireless interface (e.g., via a wireless payment app), via tickets, via a patron casino account, etc. However, some mobile gaming devices 256 may not be configured to accept monetary credits via a credit or debit card. Some mobile gaming devices 256 may include a ticket reader and/or a ticket printer whereas some mobile gaming devices 256 may not, depending on the particular implementation.

In some implementations, the casino 251 may include one or more kiosks 260 that are configured to facilitate monetary transactions involving the mobile gaming devices 256, which may include cash out and/or cash in transactions. The kiosks 260 may be configured for wired and/or wireless communication with the mobile gaming devices 256. The kiosks 260 may be configured to accept monetary credits from casino patrons 262 and/or to dispense monetary credits to casino patrons 262 via cash, a credit or debit card, via a wireless interface (e.g., via a wireless payment app), via tickets, etc. According to some examples, the kiosks 260 may be configured to accept monetary credits from a casino patron and to provide a corresponding amount of monetary credits to a mobile gaming device 256 for wagering purposes, e.g., via a wireless link such as a near-field communications link. In some such examples, when a casino patron 262 is ready to cash out, the casino patron 262 may select a cash out option provided by a mobile gaming device 256, which may include a real button or a virtual button (e.g., a button provided via a graphical user interface) in some instances. In some such examples, the mobile gaming device 256 may send a "cash out" signal to a kiosk 260 via a wireless link in response to receiving a "cash out" indication from a casino patron. The kiosk 260 may provide monetary credits to the casino patron 262 corresponding to the "cash out" signal, which may be in the form of cash, a credit ticket, a credit transmitted to a financial account corresponding to the casino patron, etc.

In some implementations, a cash-in process and/or a cash-out process may be facilitated by the TITO system server 108. For example, the TITO system server 108 may control, or at least authorize, ticket-in and ticket-out transactions that involve a mobile gaming device 256 and/or a kiosk 260.

Some mobile gaming devices 256 may be configured for receiving and/or transmitting player loyalty information. For example, some mobile gaming devices 256 may be configured for wireless communication with the player tracking system server 110. Some mobile gaming devices 256 may be configured for receiving and/or transmitting player loyalty information via wireless communication with a patron's player loyalty card, a patron's smartphone, etc.

According to some implementations, a mobile gaming device 256 may be configured to provide safeguards that prevent the mobile gaming device 256 from being used by an unauthorized person. For example, some mobile gaming devices 256 may include one or more biometric sensors and may be configured to receive input via the biometric sensor(s) to verify the identity of an authorized patron. Some mobile gaming devices 256 may be configured to function only within a predetermined or configurable area, such as a casino gaming area.

Figure 2C:
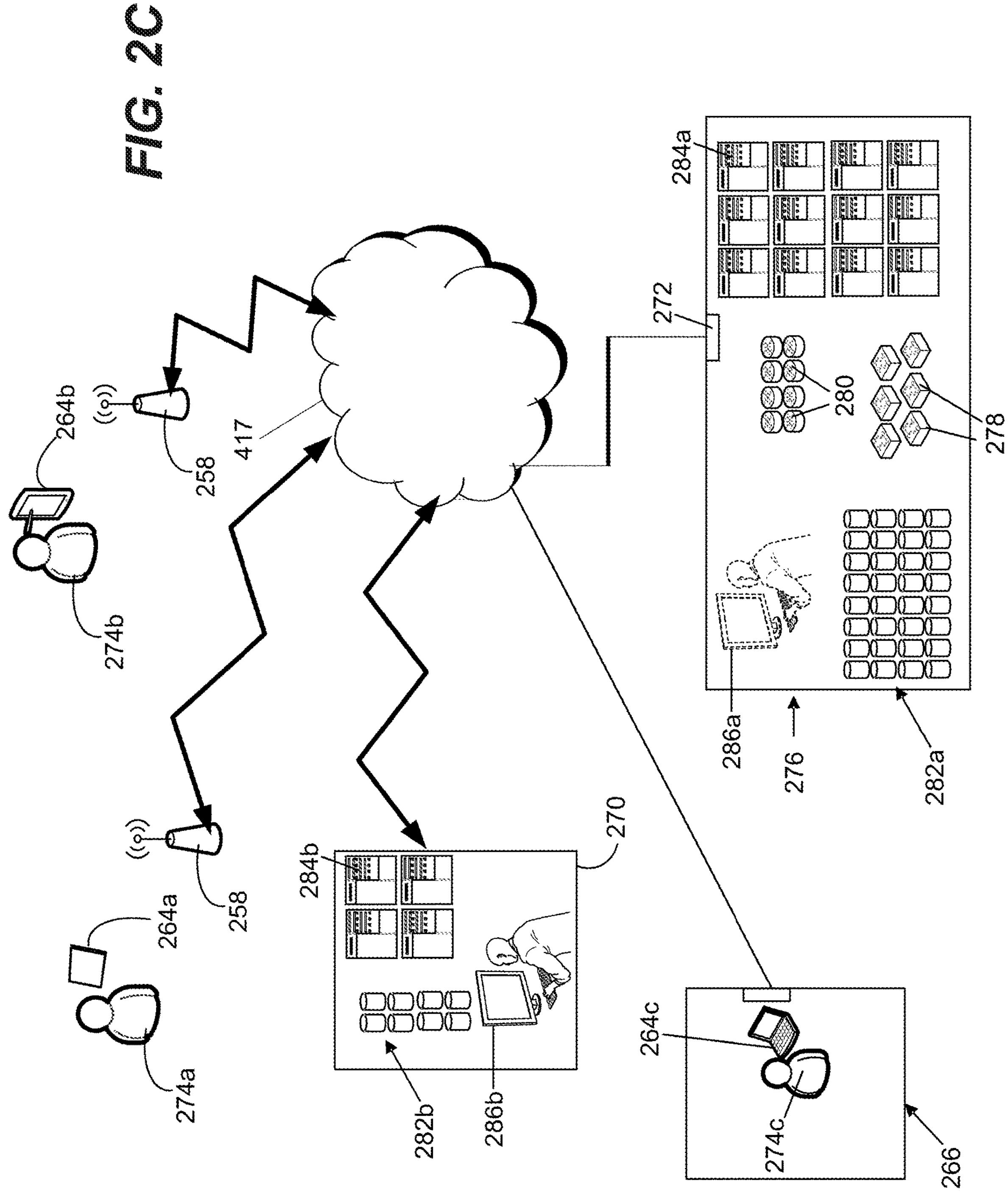
FIG. 2C is a diagram that shows examples of components of a system for providing online gaming according to some aspects of the present disclosure.

FIG. 2C is a diagram that shows examples of components of a system for providing online gaming according to some aspects of the present disclosure. As with other figures presented in this disclosure, the numbers, types and arrangements of gaming devices shown in FIG. 2C are merely shown by way of example. In this example, various gaming devices, including but not limited to end user devices (EUDs) 264*a*, 264*b* and 264*c* are capable of communication via one or more networks 417. The networks 417 may, for example, include one or more cellular telephone networks, the Internet, etc. In this example, the EUDs 264*a* and 264*b* are mobile devices: according to this example the EUD 264*a* is a tablet device and the EUD 264*b* is a smart phone. In this implementation, the EUD 264*c* is a laptop computer that is located within a residence 266 at the time depicted in FIG. 2C. Accordingly, in this example the hardware of EUDs is not specifically configured for online gaming, although each EUD is configured with software for online gaming. For example, each EUD may be configured with a web browser. Other implementations may include other types of EUD, some of which may be specifically configured for online gaming.

In this example, a gaming data center 276 includes various devices that are configured to provide online wagering games via the networks 417. The gaming data center 276 is capable of communication with the networks 417 via the gateway 272. In this example, switches 278 and routers 280 are configured to provide network connectivity for devices of the gaming data center 276, including storage devices 282*a*, servers 284*a* and one or more workstations 570*a*. The servers 284*a* may, for example, be configured to provide access to a library of games for online game play. In some examples, code for executing at least some of the games may initially be stored on one or more of the storage devices 282*a*. The code may be subsequently loaded onto a server 284*a* after selection by a player via an EUD and communication of that selection from the EUD via the networks 417. The server 284*a* onto which code for the selected game has been loaded may provide the game according to selections made by a player and indicated via the player's EUD. In other examples, code for executing at least some of the games may initially be stored on one or more of the servers 284*a*. Although only one gaming data center 276 is shown in FIG. 2C, some implementations may include multiple gaming data centers 276.

In this example, a financial institution data center 270 is also configured for communication via the networks 417. Here, the financial institution data center 270 includes servers 284*b*, storage devices 282*b*, and one or more workstations 286*b*. According to this example, the financial institution data center 270 is configured to maintain financial accounts, such as checking accounts, savings accounts, loan accounts, etc. In some implementations one or more of the authorized users 274*a*-274*c* may maintain at least one financial account with the financial institution that is serviced via the financial institution data center 270.

According to some implementations, the gaming data center 276 may be configured to provide online wagering games in which money may be won or lost. According to some such implementations, one or more of the servers 284*a* may be configured to monitor player credit balances, which may be expressed in game credits, in currency units, or in any other appropriate manner. In some implementations, the server(s) 284*a* may be configured to obtain financial credits from and/or provide financial credits to one or more financial institutions, according to a player's "cash in" selections, wagering game results and a player's "cash out" instructions. According to some such implementations, the server(s) 284*a* may be configured to electronically credit or debit the account of a player that is maintained by a financial institution, e.g., an account that is maintained via the financial institution data center 270. The server(s) 284*a* may, in some examples, be configured to maintain an audit record of such transactions.

In some alternative implementations, the gaming data center 276 may be configured to provide online wagering games for which credits may not be exchanged for cash or the equivalent. In some such examples, players may purchase game credits for online game play, but may not "cash out" for monetary credit after a gaming session. Moreover, although the financial institution data center 270 and the gaming data center 276 include their own servers and storage devices in this example, in some examples the financial institution data center 270 and/or the gaming data center 276 may use offsite "cloud-based" servers and/or storage devices. In some alternative examples, the financial institution data center 270 and/or the gaming data center 276 may rely entirely on cloud-based servers.

One or more types of devices in the gaming data center 276 (or elsewhere) may be capable of executing middleware, e.g., for data management and/or device communication.

Authentication information, player tracking information, etc., including but not limited to information obtained by EUDs 264 and/or other information regarding authorized users of EUDs 264 (including but not limited to the authorized users 274*a*-274*c*), may be stored on storage devices 282 and/or servers 284. Other game-related information and/or software, such as information and/or software relating to leaderboards, players currently playing a game, game themes, game-related promotions, game competitions, etc., also may be stored on storage devices 282 and/or servers 284. In some implementations, some such game-related software may be available as "apps" and may be downloadable (e.g., from the gaming data center 276) by authorized users.

In some examples, authorized users and/or entities (such as representatives of gaming regulatory authorities) may obtain gaming-related information via the gaming data center 276. One or more other devices (such EUDs 264 or devices of the gaming data center 276) may act as intermediaries for such data feeds. Such devices may, for example, be capable of applying data filtering algorithms, executing data summary and/or analysis software, etc. In some implementations, data filtering, summary and/or analysis software may be available as "apps" and downloadable by authorized users.

Figure 3:
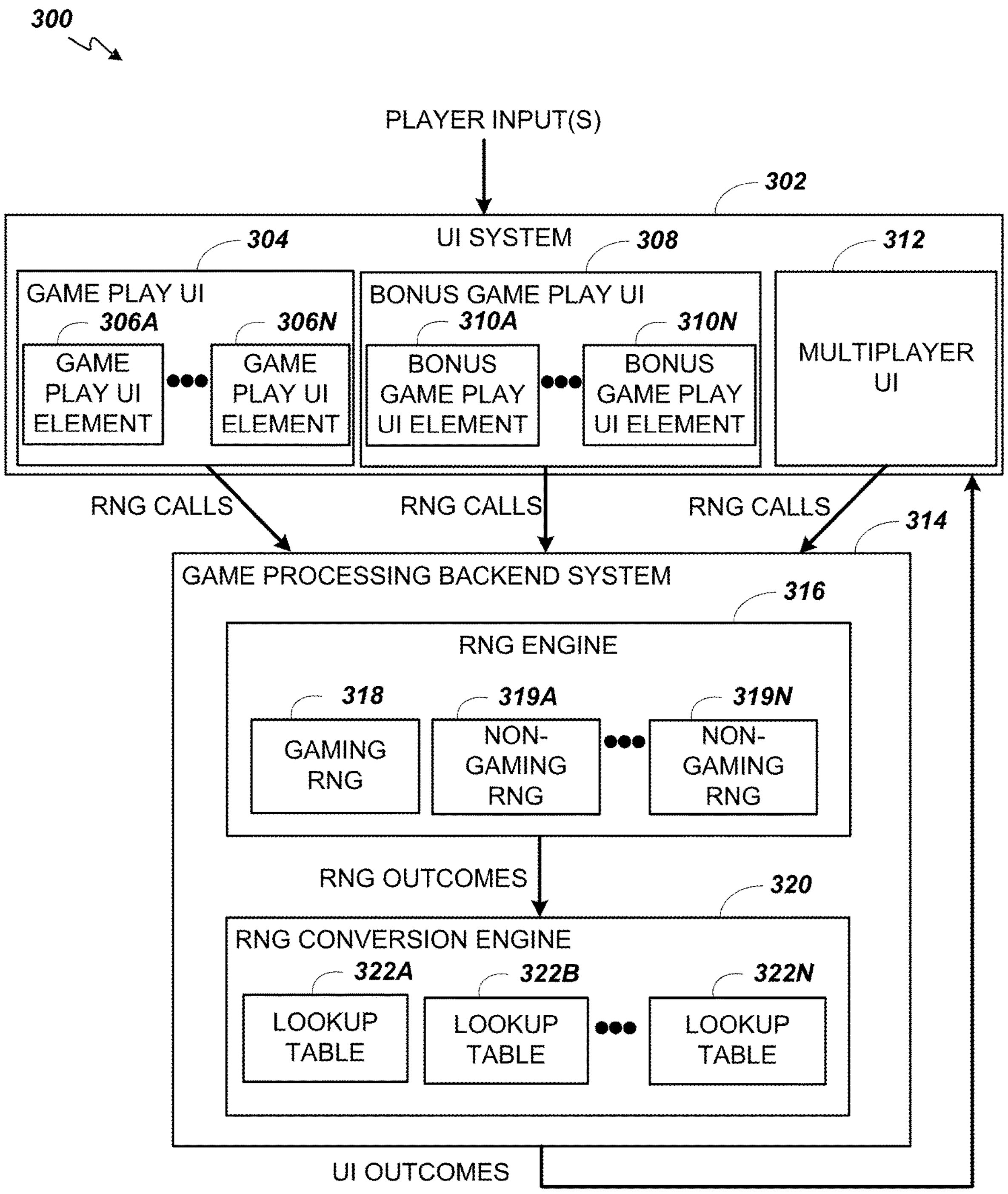
FIG. 3 illustrates, in block diagram form, an implementation of a game processing architecture algorithm that implements a game processing pipeline for the play of a game in accordance with various implementations described herein.

FIG. 3 illustrates, in block diagram form, an implementation of a game processing architecture 300 that implements a game processing pipeline for the play of a game in accordance with various implementations described herein. As shown in FIG. 3, the gaming processing pipeline starts with having a UI system 302 receive one or more player inputs for the game instance. Based on the player input(s), the UI system 302 generates and sends one or more RNG calls to a game processing backend system 314. Game processing backend system 314 then processes the RNG calls with RNG engine 316 to generate one or more RNG outcomes. The RNG outcomes are then sent to the RNG conversion engine 320 to generate one or more game outcomes for the UI system 302 to display to a player. The game processing architecture 300 can implement the game processing pipeline using a gaming device, such as gaming devices 104A-104X and 200 shown in FIGS. 1 and 2, respectively. Alternatively, portions of the gaming processing architecture 300 can implement the game processing pipeline using a gaming device and one or more remote gaming devices, such as central determination gaming system server 106 shown in FIG. 1.

The UI system 302 includes one or more UIs that a player can interact with. The UI system 302 could include one or more game play UIs 304, one or more bonus game play UIs 308, and one or more multiplayer UIs 312, where each UI type includes one or more mechanical UIs and/or graphical UIs (GUIs). In other words, game play UI 304, bonus game play UI 308, and the multiplayer UI 312 may utilize a variety of UI elements, such as mechanical UI elements (e.g., physical "spin" button or mechanical reels) and/or GUI elements (e.g., virtual reels shown on a video display or a virtual button deck) to receive player inputs and/or present game play to a player. Using FIG. 3 as an example, the different UI elements are shown as game play UI elements 306A-306N and bonus game play UI elements 310A-310N.

The game play UI 304 represents a UI that a player typically interfaces with for a base game. During a game instance of a base game, the game play UI elements 306A-306N (e.g., GUI elements depicting one or more virtual reels) are shown and/or made available to a user. In a subsequent game instance, the UI system 302 could transition out of the base game to one or more bonus games. The bonus game play UI 308 represents a UI that utilizes bonus game play UI elements 310A-310N for a player to interact with and/or view during a bonus game. In one or more implementations, at least some of the game play UI element 306A-306N are similar to the bonus game play UI elements 310A-310N. In other implementations, the game play UI element 306A-306N can differ from the bonus game play UI elements 310A-310N.

FIG. 3 also illustrates that UI system 302 could include a multiplayer UI 312 purposed for game play that differs or is separate from the typical base game. For example, multiplayer UI 312 could be set up to receive player inputs and/or presents game play information relating to a tournament mode. When a gaming device transitions from a primary game mode that presents the base game to a tournament mode, a single gaming device is linked and synchronized to other gaming devices to generate a tournament outcome. For example, multiple RNG engines 316 corresponding to each gaming device could be collectively linked to determine a tournament outcome. To enhance a player's gaming experience, tournament mode can modify and synchronize sound, music, reel spin speed, and/or other operations of the gaming devices according to the tournament game play. After tournament game play ends, operators can switch back the gaming device from tournament mode to a primary game mode to present the base game. Although FIG. 3 does not explicitly depict that multiplayer UI 312 includes UI elements, multiplayer UI 312 could also include one or more multiplayer UI elements.

Based on the player inputs, the UI system 302 could generate RNG calls to a game processing backend system 314. As an example, the UI system 302 could use one or more application programming interfaces (APIs) to generate the RNG calls. To process the RNG calls, the RNG engine 316 could utilize gaming RNG 318 and/or non-gaming RNGs 319A-319N. Gaming RNG 318 could corresponds to RNG 212 or hardware RNG 244 shown in FIG. 2A. As previously discussed with reference to FIG. 2A, gaming RNG 318 often performs specialized and non-generic operations that comply with regulatory and/or game requirements. For example, because of regulation requirements, gaming RNG 318 could correspond to RNG 212 by being a cryptographic RNG or pseudorandom number generator (PRNG) (e.g., Fortuna PRNG) that securely produces random numbers for one or more game features. To securely generate random numbers, gaming RNG 318 could collect random data from various sources of entropy, such as from an operating system (OS) and/or a hardware RNG (e.g., hardware RNG 244 shown in FIG. 2A). Alternatively, non-gaming RNGs 319A-319N may not be cryptographically secure and/or be computationally less expensive. Non-gaming RNGs 319A-319N can, thus, be used to generate outcomes for non-gaming purposes. As an example, non-gaming RNGs 319A-319N can generate random numbers for generating random messages that appear on the gaming device.

The RNG conversion engine 320 processes each RNG outcome from RNG engine 316 and converts the RNG outcome to a UI outcome that is feedback to the UI system 302. With reference to FIG. 2A, RNG conversion engine 320 corresponds to RNG conversion engine 210 used for game play. As previously described, RNG conversion engine 320 translates the RNG outcome from the RNG 212 to a game outcome presented to a player. RNG conversion engine 320 utilizes one or more lookup tables 322A-322N to regulate a prize payout amount for each RNG outcome and how often the gaming device pays out the derived prize payout amounts. In one example, the RNG conversion engine 320 could utilize one lookup table to map the RNG outcome to a game outcome displayed to a player and a second lookup table as a pay table for determining the prize payout amount for each game outcome. In this example, the mapping between the RNG outcome and the game outcome controls the frequency in hitting certain prize payout amounts. Different lookup tables could be utilized depending on the different game modes, for example, a base game versus a bonus game.

After generating the UI outcome, the game processing backend system 314 sends the UI outcome to the UI system 302. Examples of UI outcomes are symbols to display on a video reel or reel stops for a mechanical reel. In one example, if the UI outcome is for a base game, the UI system 302 updates one or more game play UI elements 306A-306N, such as symbols, for the game play UI 304. In another example, if the UI outcome is for a bonus game, the UI system could update one or more bonus game play UI elements 310A-310N (e.g., symbols) for the bonus game play UI 308. In response to updating the appropriate UI, the player may subsequently provide additional player inputs to initiate a subsequent game instance that progresses through the game processing pipeline.

Roulette type games typically involve a wheel divided into 36 or a number of segments. In some versions, a ball is spun and players are able to place bets as to which a pocket adjacent to one of the segments the ball will fall into. Alternatively, in electronic versions, a stop position corresponding to one of the segments is randomly determined.

Regardless, roulette type games may be required (such as by regulation, law, and so on) to maintain a particular RTP, such as 0.94. This means that, subject to the size of bets that are placed, the roulette type games may be very limited as to the awards that can be made for various game outcomes. Large awards (such as one or more jackpots) substantially out of proportion to the bets placed may be prohibited by RTP constraints due to the odds available. However, large awards substantially out of proportion to the bets placed provide more interest for players due to the chase involved, even when odds of winning are substantially lower.

To overcome this issue, a bonus game may be configured to be triggerable from a base game. The bonus game may involve selection of a winner between two opponents using a segmented wheel. Different jackpots and awards may be configured according to the odds of triggering the bonus game, selecting the opponents, selecting which of the opponents is the winner and which is the loser, selecting an order of the opponents (such as a home and away or visitor team), and so on. The highest jackpot may be configured for triggering the bonus game and selecting the opponents in their precise order, including the winner and loser, as this may correspond to the lowest compound odds of occurring.

By way of illustration, the base game may correspond to spinning of a first wheel divided into 36 segments listing various National Football League ("NFL") teams (and/or other teams or opponents, such as baseball teams, soccer teams, rugby teams, lacrosse teams, hockey teams, boxers, tennis players, politicians, and so on) and a bonus segment. A player may be able to place a bet on one of the NFL teams and a random number generator ("RNG") may be used to select a wheel stop position. If the players team is selected, the player may be awarded a base game award. If another team is selected, the player may not be provided the base game award. However, if the bonus segment is selected, a bonus game may be triggered where the player has the opportunity to win one or more bonus game awards and/or jackpots. Such bonus game awards and/or jackpots may be larger than the base game award without violating RTP as the odds of winning are lower. For example, the player may be able to select a winner and a loser in a particular order (such as the Steelers as the home team and the Raiders as the visitor team where the Steelers win). The RNG may then be used to select a home team, a visitor team, and a stop position for a second wheel divided into a number of segments for each of the home and visitor teams (which may aggregate to the same area of the second wheel such that each team has an equal probability of winning, different areas of the second wheel such that the home team or the visitor team has a greater chance of winning (such as 60%, 70%, or the like), and so on). If the bonus game results match the player's picks exactly in the winner, the loser, and their specific order, the player may be awarded a highest bonus game award or jackpot. This may maintain RTP because this bonus game result has the lowest odds of occurring. Various configurations are possible and contemplated without departing from the scope of the present disclosure.

Alternatively, the player may be able to select a number of NFL teams and may win if any of those teams is selected for the bonus game, wins or loses the bonus game, and so on. Similarly, the player may be able to select a particular team to lose without picking a winner. Regardless, the bonus game awards or jackpots available in such situations may be lower than a highest bonus game award or jackpot as the odds of winning are higher than picking the exact winner and loser in their specific order. Various configurations are possible and contemplated without departing from the scope of the present disclosure.

Figure 4:
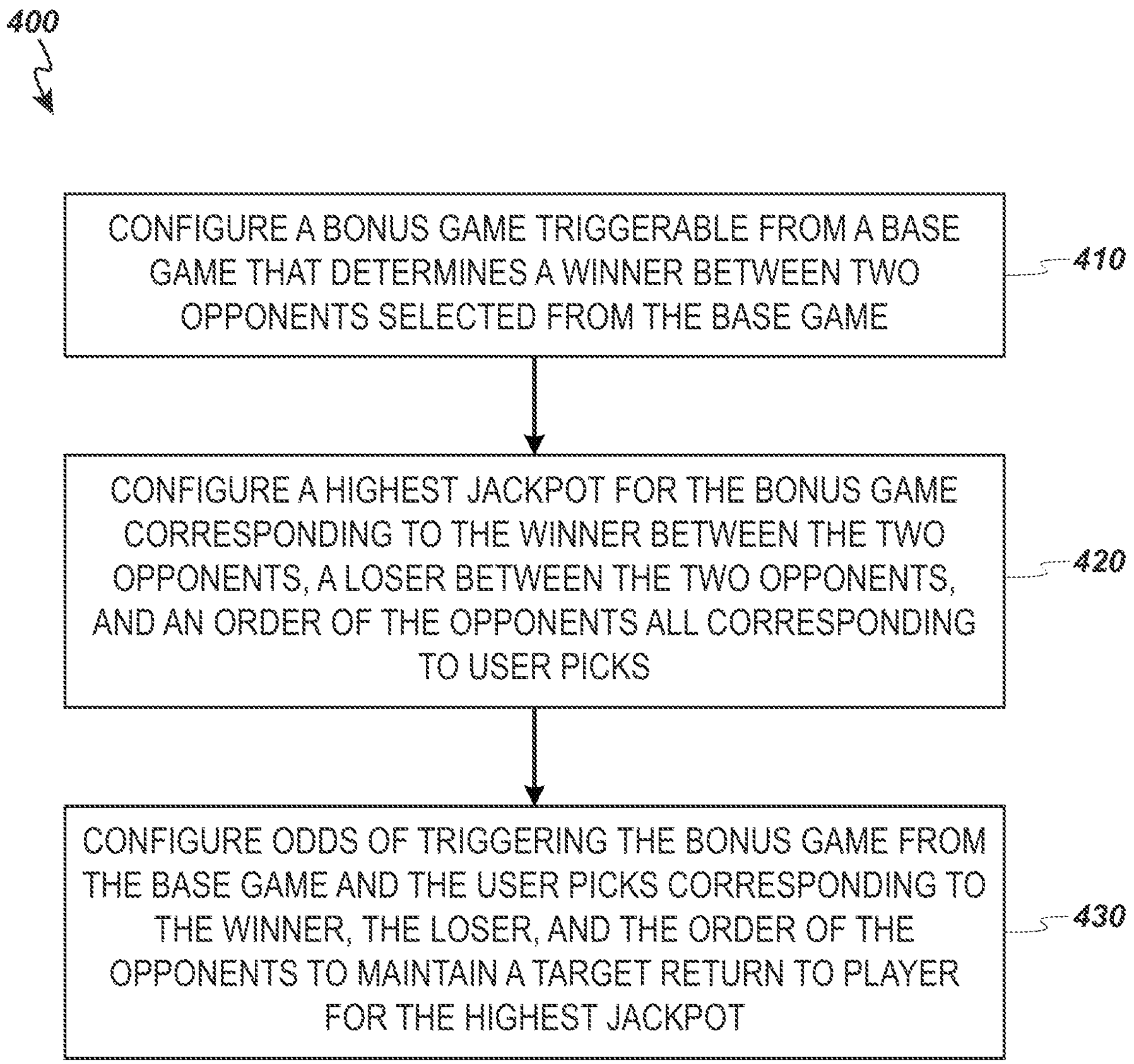
FIG. 4 depicts a flow chart illustrating an example method for configuring a dynamic wheel or other type of game to maintain RTP. The method may be performed by one or more of the devices depicted in FIGS. 1-3.

By way of illustration, FIG. 4 depicts a flow chart illustrating an example method 400 for configuring a dynamic wheel or other type of game to maintain RTP. The method 400 may be performed by one or more of the devices depicted in FIGS. 1-3.

At operation 410, an electronic device (such as one or more of the devices depicted in FIGS. 1-3) may configure a bonus game triggerable from a base game that determines a winner between two opponents selected from the base game. The base game and/or the bonus game may be playable via the UI system 302 of FIG. 3.

For example, the base game may correspond to spinning of a first wheel (which may be presented via the UI system 302 of FIG. 3) divided into 36 segments listing various National Football League ("NFL") teams (and/or other teams or opponents, such as baseball teams, soccer teams, rugby teams, lacrosse teams, hockey teams, boxers, tennis players, politicians, and so on) and a bonus segment. A player may be able to place a bet on one of the NFL teams (such as via the UI system 302 of FIG. 3) and a RNG may be used to select a wheel stop position. If the player's team is selected, the player may be awarded a base game award. If another team is selected, the player may not be provided the base game award. However, if the bonus segment is selected, a bonus game may be triggered. For example, the player may be able to select a winner and a loser in a particular order (such as the Steelers as the home team and the Raiders as the visitor team where the Steelers win). The RNG may then be used to select a home team, a visitor team, and a stop position for a second wheel divided into a number of segments for each of the home and visitor teams (which may also be presented via the UI system 302 of FIG. 3). The player may then be awarded a bonus game award or jackpot depending on the bonus game results. Various configurations are possible and contemplated without departing from the scope of the present disclosure.

At operation 420, the electronic device may configure a highest jackpot for the bonus game corresponding to the winner between the two opponents, a loser between the two opponents, and an order of the two opponents all corresponding to user (or player) picks. For example, the highest jackpot may be configured in the example discussed above for the bonus game results matching the player's picks exactly in the winner, the loser, and their specific order. Other jackpots or other bonus game results may be configured for bonus game results matching some but not all of the player's picks in the winner, the loser, or their specific order. By way of another example, other jackpots or other bonus game results may be configured in other situations, such as when the player picks any of a number of teams to be the winner or loser, when the player picks a particular team to lose, when the player picks a winner and a loser but does not specify their specific order, and so on. Various configurations are possible and contemplated without departing from the scope of the present disclosure.

At operation 430, the electronic device may configure odds of triggering the bonus game from the base game and the user picks corresponding to the winner, the loser, and the order of the two opponents to maintain a RTP for the highest jackpot. For example, the odds of triggering the bonus game from the base game and the user picks corresponding to the winner, the loser, and the order of the two opponents may be sufficiently low that a RTP of 0.94 is maintained. The odds of other base game and/or bonus game awards may also be configured to maintain the target RTP. Various configurations are possible and contemplated without departing from the scope of the present disclosure.

In various examples, this example method 400 may be implemented as a group of interrelated software modules or components that perform various functions discussed herein. These software modules or components may be executed within a cloud network and/or by one or more computing devices, such as one or more of the devices depicted in FIGS. 1-3.

Although the example method 400 is illustrated and described as including particular operations performed in a particular order, it is understood that this is an example. In various implementations, various orders of the same, similar, and/or different operations may be performed without departing from the scope of the present disclosure.

For example, operation 420 is illustrated and described as configuring a highest jackpot for the bonus game corresponding to the winner between the two opponents, a loser between the two opponents, and an order of the two opponents all corresponding to user (or player) picks. However, it is understood that this is an example. In various implementations, various other jackpots and/or other bonus game awards and/or other base game awards may be configured. Various configurations are possible and contemplated without departing from the scope of the present disclosure.

Figure 5A:
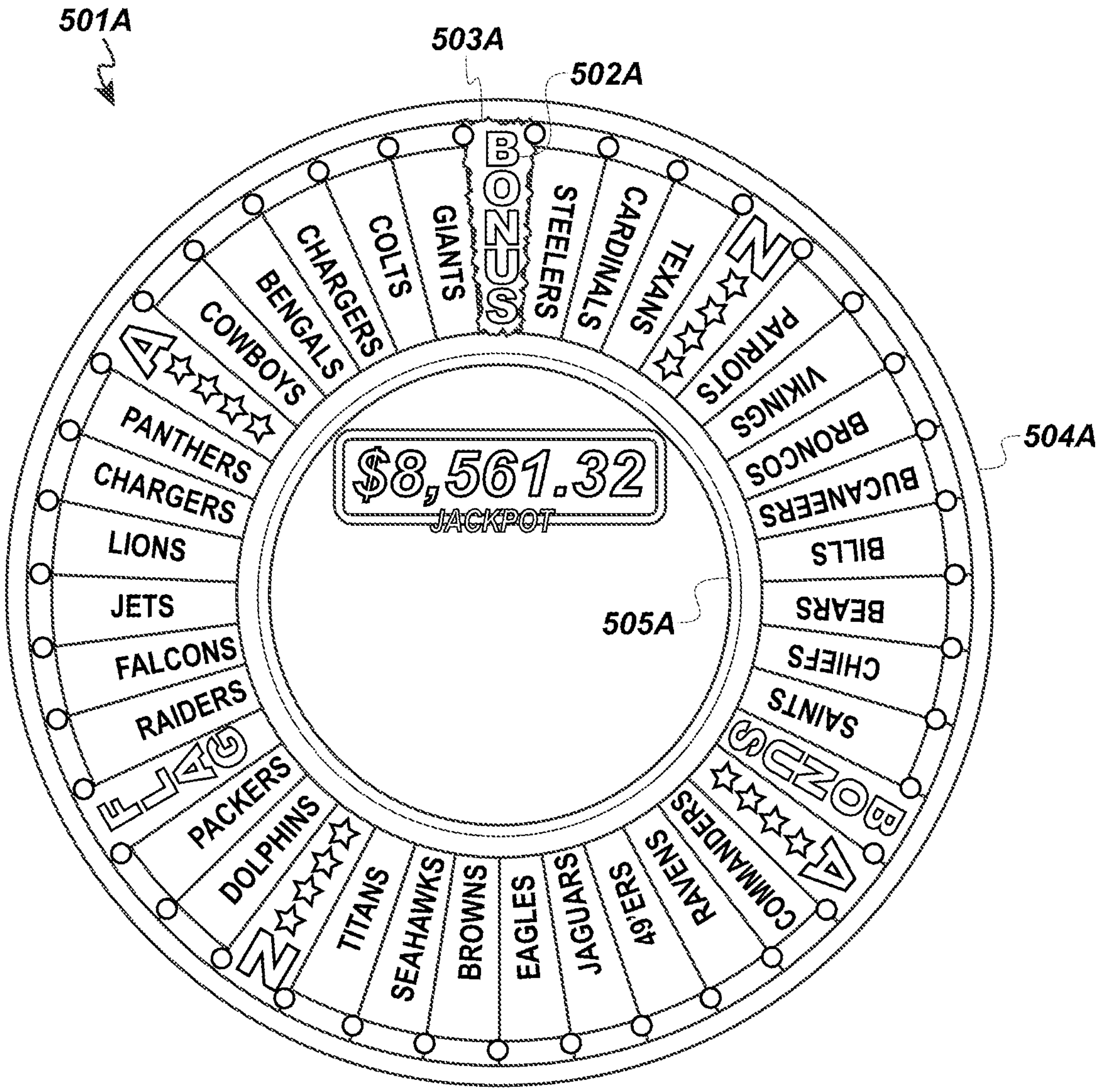
FIG. 5A depicts a first screen showing a base game of a dynamic wheel game.

By way of example of such a game as is discussed above with respect to FIG. 4, FIG. 5A depicts a first screen 501A showing a base game of a dynamic wheel game (which may also be presented via the UI system 302 of FIG. 3). The base game may correspond to spinning of an outer wheel 504A that is positioned around an inner wheel 505A and is divided into 36 segments listing various National Football League ("NFL") teams (and/or other teams or opponents, such as baseball teams, soccer teams, rugby teams, lacrosse teams, hockey teams, boxers, tennis players, politicians, and so on) and a bonus segment. A player may be able to place a bet on one of the NFL teams (such as via the UI system 302 of FIG. 3) and a RNG may be used to select a wheel stop position. The outer wheel 504A may be spun and the wheel stop position may be shown by a base game indicator 503A. If the player's team is selected, the player may be awarded a base game award. If another team is selected, the player may not be provided the base game award. However, if the bonus segment 502A is selected, a bonus game may be triggered where the player has the opportunity to win one or more bonus game awards and/or jackpots. For example, the player may be able to select (such as via the UI system 302 of FIG. 3) a winner and a loser in a particular order (such as the Steelers as the home team and the Raiders as the visitor team where the Steelers win).

Figure 5B:
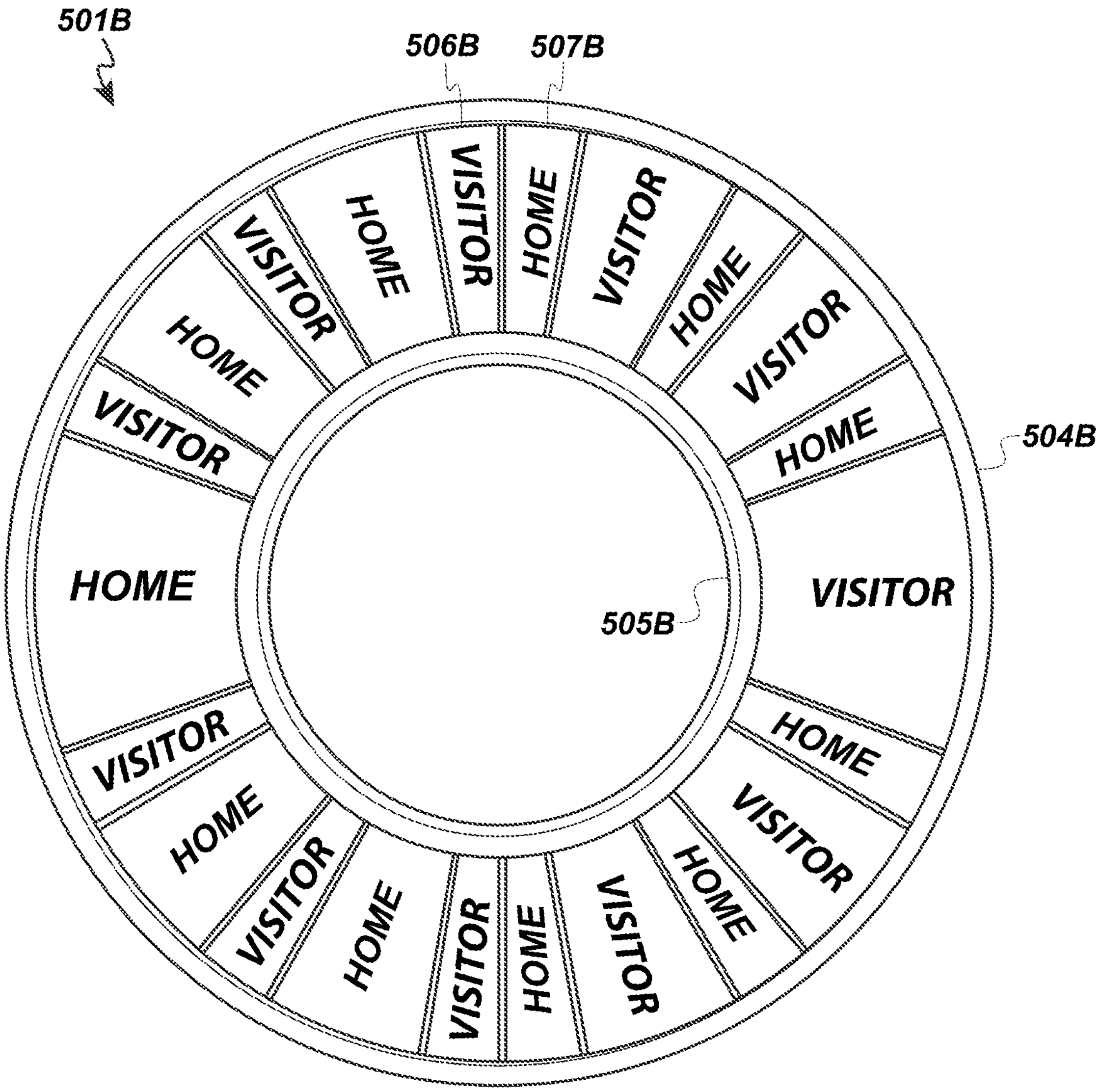
FIG. 5B depicts a second screen showing an opponent selection of a bonus game of the dynamic wheel game.

The RNG may then be used to select a home team and a visitor team. For example, FIG. 5B depicts a second screen 501B showing an opponent selection of a bonus game of the dynamic wheel game (which may also be presented via the UI system 302 of FIG. 3). As shown, the outer wheel 504B and inner wheel 505B have been modified such that the outer wheel 504B is divided into a number of segments for each of a home and visitor team (home segments 507B and away segments 506B) (which may aggregate to the same area of the outer wheel 504B such that each team has an equal probability of winning, different areas of the second wheel such that the home team or the visitor team has a greater chance of winning (such as 60%, 70%, or the like), and so on). As shown, the home segments 507B and the away segments 506B respectively include "Home" and "Visitor" text as teams have not yet been chosen.

Figure 5C:
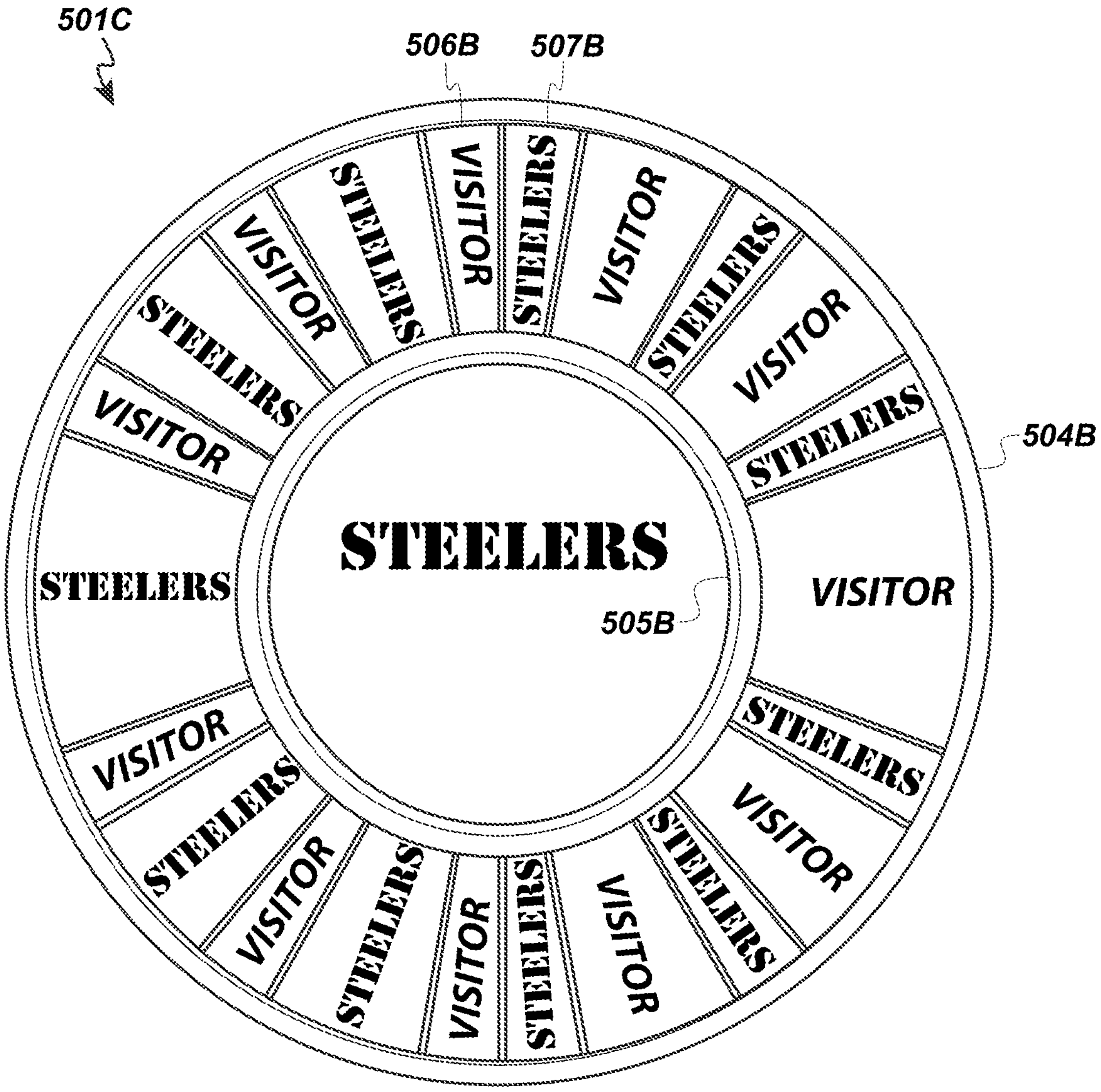
FIG. 5C depicts a third screen showing the opponent selection after a home team is selected.

FIG. 5C depicts a third screen 501C showing the opponent selection after a home team is selected (which may also be presented via the UI system 302 of FIG. 3). The "Home" text has been removed from the home segment 507B and now shows the name of the selected home team, the "Steelers."

Figure 5D:
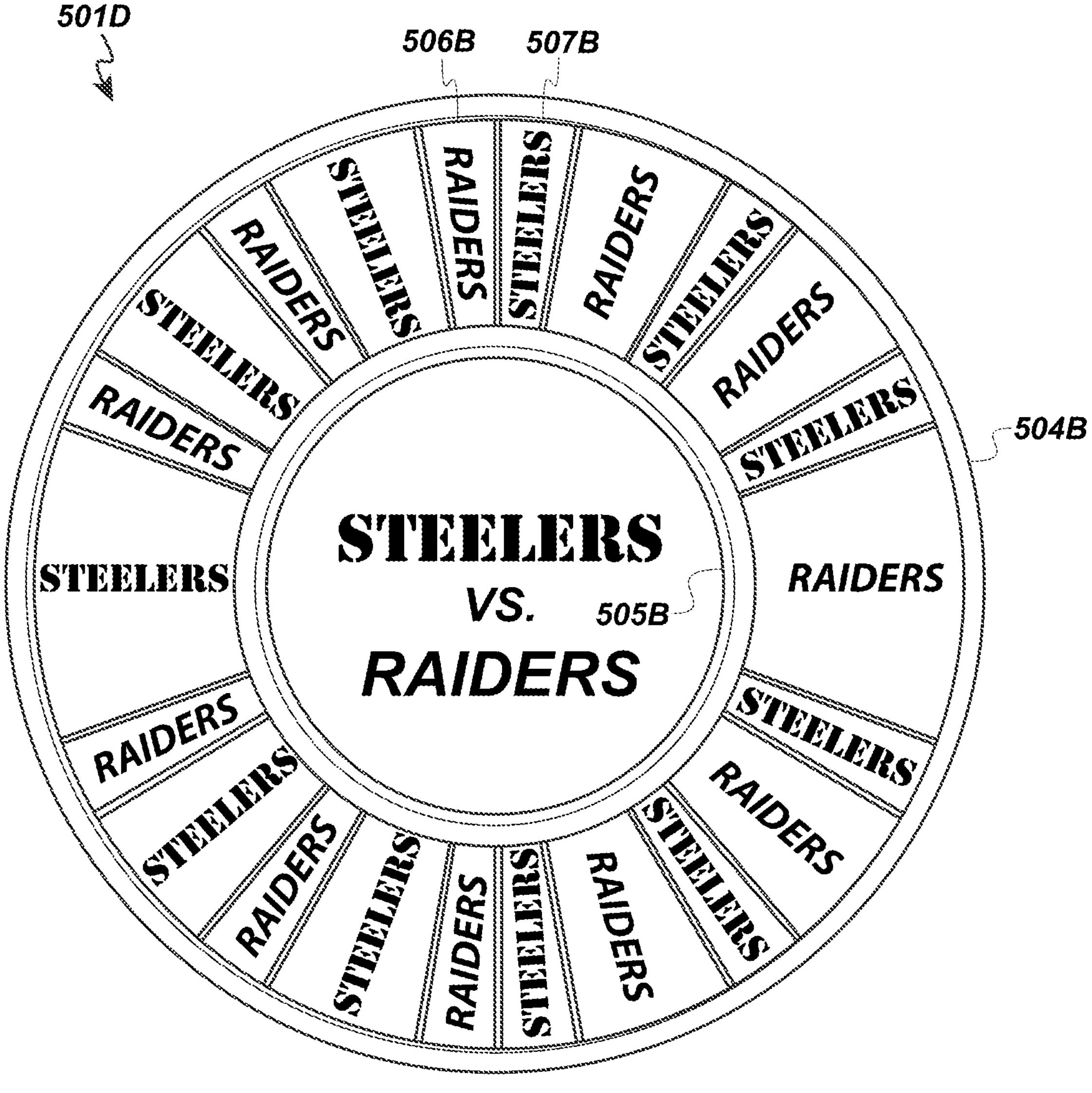
FIG. 5D depicts a fourth screen showing the opponent selection after a visitor team is selected.

FIG. 5D depicts a fourth screen 501D showing the opponent selection after a visitor team is selected (which may also be presented via the UI system 302 of FIG. 3). The "Visitor" text has been removed from the away segment 506B and now shows the name of the selected visitor team, the "Raiders."

Figure 5E:
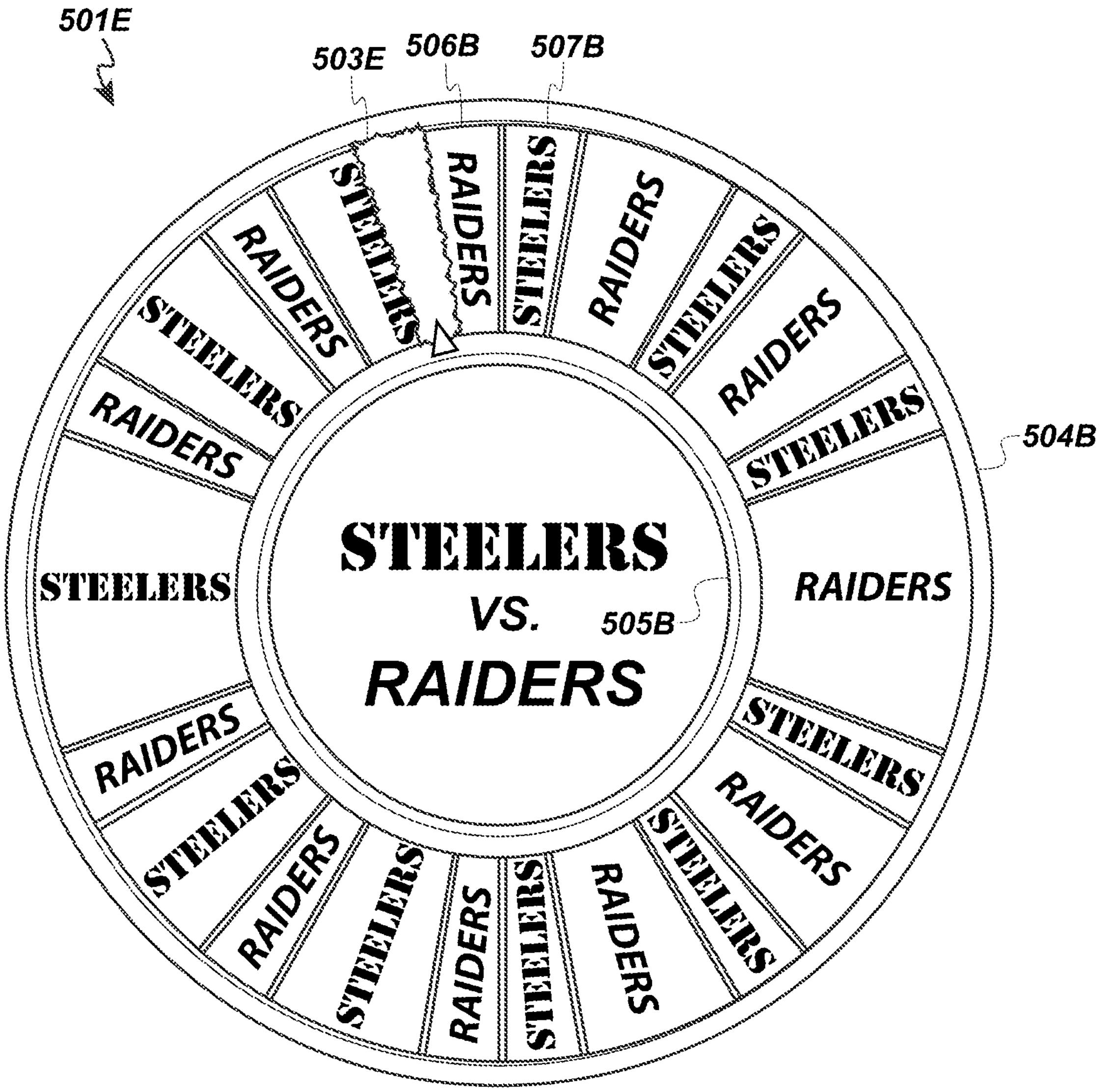
FIG. 5E depicts a fifth screen showing a game result of the bonus game.

The RNG may then be used to select a stop position that corresponds to the result of the bonus game. For example, the inner wheel 505B may be spun until a bonus game indicator indicates one of the home segments 507B or away segments 506B. FIG. 5E depicts a fifth screen 501E showing a game result of the bonus game including the bonus game indicator 503E. As shown, each the home segments 507B or away segments 506B may include multiple wheel stop positions. If the bonus game results match the player's picks exactly in the winner, the loser, and their specific order, the player may be awarded a highest bonus game award or jackpot.

FIGS. 5A-5E illustrate a number of user interface improvements to wheel games. In some implementations, base games and bonus games use completely different interfaces. However, by using the outer wheels 504A, 504B and/or the inner wheels 505A, 505B for the base and bonus games, enough similarity between the base game and bonus game interfaces is present to minimize player confusion moving between base and bonus games. This also saves space on user interfaces, minimizes user interfaces that need to be stored or generated, and so on.

Further, by having the outer wheels 504A, 504B and/or the inner wheels 505A, 505B have some differences between the base and bonus games, the player is better able to visually distinguish between base and bonus games over base and bonus games that may use identical interfaces.

In this example, the outer wheel 504A, 504B is used for both the bonus and base games while the outer wheel 504A is spun during the base game and the inner wheel 505B is spun during the bonus game. In other examples, either the outer wheel 504A, the outer wheel 504B, and/or the inner wheel 505A, 505B may be spun in either the base or the bonus game, the home segments 507B and/or the visitor segments 506B may be included in the outer wheel 504A, the outer wheel 504B and/or the inner wheel 505A, 505B, and so on. Various configurations are possible and contemplated without departing from the scope of the present disclosure. Examples of such embodiments are discussed below with respect to FIGS. 10A-10C.

In various embodiments, different wheel layouts may be selected for use in one or more wheel games. The wheel layouts may be selected for use in the one or more wheel games in a way that maintains a target RTP.

Figure 6:
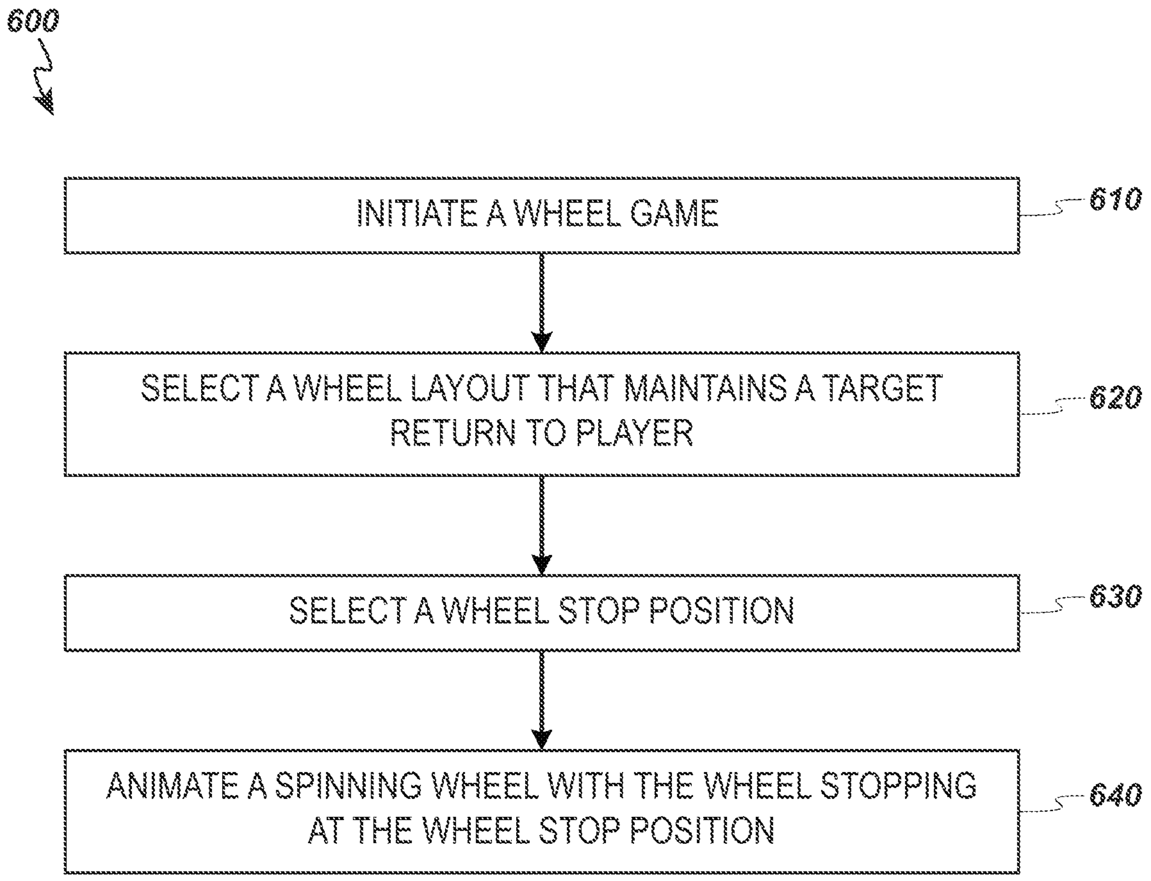
FIG. 6 depicts a flow chart illustrating an example method for selecting a wheel layout for a dynamic wheel or other type of game to maintain RTP. The method may be performed by one or more of the devices depicted in FIGS. 1-3.

For example, FIG. 6 depicts a flow chart illustrating an example method 600 for selecting a wheel layout for a dynamic wheel or other type of game to maintain RTP. The method 600 may be performed by one or more of the devices depicted in FIGS. 1-3.

At operation 610, an electronic device (such as one or more of the devices depicted in FIGS. 1-3) may initiate a wheel game. The wheel game may be the wheel game discussed above with respect to FIGS. 4-5E.

At operation 620, the electronic device may select a wheel layout that maintains a target RTP. For example, wheel layouts of a set of wheel layouts may be divided into a number of segments for each of a home and visitor team. The individual segments for each of the home and visitor team may aggregate to the same area of a respective wheel layout such that each team has an equal probability of winning, different areas of the respective wheel layout such that the home team or the visitor team has a greater chance of winning (such as 60%, 70%, or the like), and so on. Each time a wheel layout is needed, one may be selected from the set of wheel layouts in a way that maintains RTP.

In some implementations, one or more wheel layouts of a set of wheel layouts may have a different first probability that the home team will win and a different second probability that the visitor team will win. Wheel layouts may be selected over time such that selection of a wheel layout that benefits the home team will be compensated for by a later selection for a later wheel game of a wheel layout that correspondingly benefits the visitor team.

For example, wheel layouts may be weighted (such as a weighted table of wheel layouts) such that certain wheel layouts are selected more often and others are selected less often. The probability of the home or visitor team winning over a number of wheel games with wheel layouts selected according to the weights may balance out such that the target RTP is maintained.

By way of another example, there may be an equal probability of each wheel layout being selected each time that one is selected. However, the total set of wheel layouts may be designed such that over a number of wheel games with wheel layouts selected randomly the target RTP is maintained. Various configurations are possible and contemplated without departing from the scope of the present disclosure.

In other implementations, all of the wheel layouts may have the same first probability that the home team will win and the same second probability that the visitor team will win. Various configurations are possible and contemplated without departing from the scope of the present disclosure.

At operation 630, the electronic device may select a wheel stop position. The wheel stop position may be selected using an RNG. In the example discussed above with the individual segments, each segment of the selected wheel layout may correspond to one or more stop positions. In various such examples, wheel segments may be weighted such that the wheel is selected to be some segments more often and other segments less often. Various configurations are possible and contemplated without departing from the scope of the present disclosure.

At operation 640, the electronic device may animate a spinning wheel with the wheel stopping at the wheel stop position. By way of example, the spinning wheel may be presented via the UI system 302 of FIG. 3.

In various examples, this example method 600 may be implemented as a group of interrelated software modules or components that perform various functions discussed herein. These software modules or components may be executed within a cloud network and/or by one or more computing devices, such as one or more of the devices depicted in FIGS. 1-3.

Although the example method 600 is illustrated and described as including particular operations performed in a particular order, it is understood that this is an example. In various implementations, various orders of the same, similar, and/or different operations may be performed without departing from the scope of the present disclosure.

For example, operation 620 is illustrated and described as selecting a wheel layout that maintains a target RTP. However, it is understood that this is an example. In various implementations, the selection of the wheel layout may not affect RTP. Various configurations are possible and contemplated without departing from the scope of the present disclosure.

By way of another example, operation 620 is illustrated and described as the electronic device selecting a wheel layout. However, it is understood that this is an example. In some implementations, the electronic device may receive a data message from a server or other computing device (such as the game processing backend system 314 of FIG. 3) that indicates which wheel layout to use and the electronic device may use a stored wheel layout responsive to the indication included in the data message. By way of example, groupings of different segments may be provided in a data array, table, or other list that may be sent to the electronic device form the server or other computing device could read the data encapsulated in the data message to dynamically populate a wheel. Various configurations are possible and contemplated without departing from the scope of the present disclosure.

Figure 7:
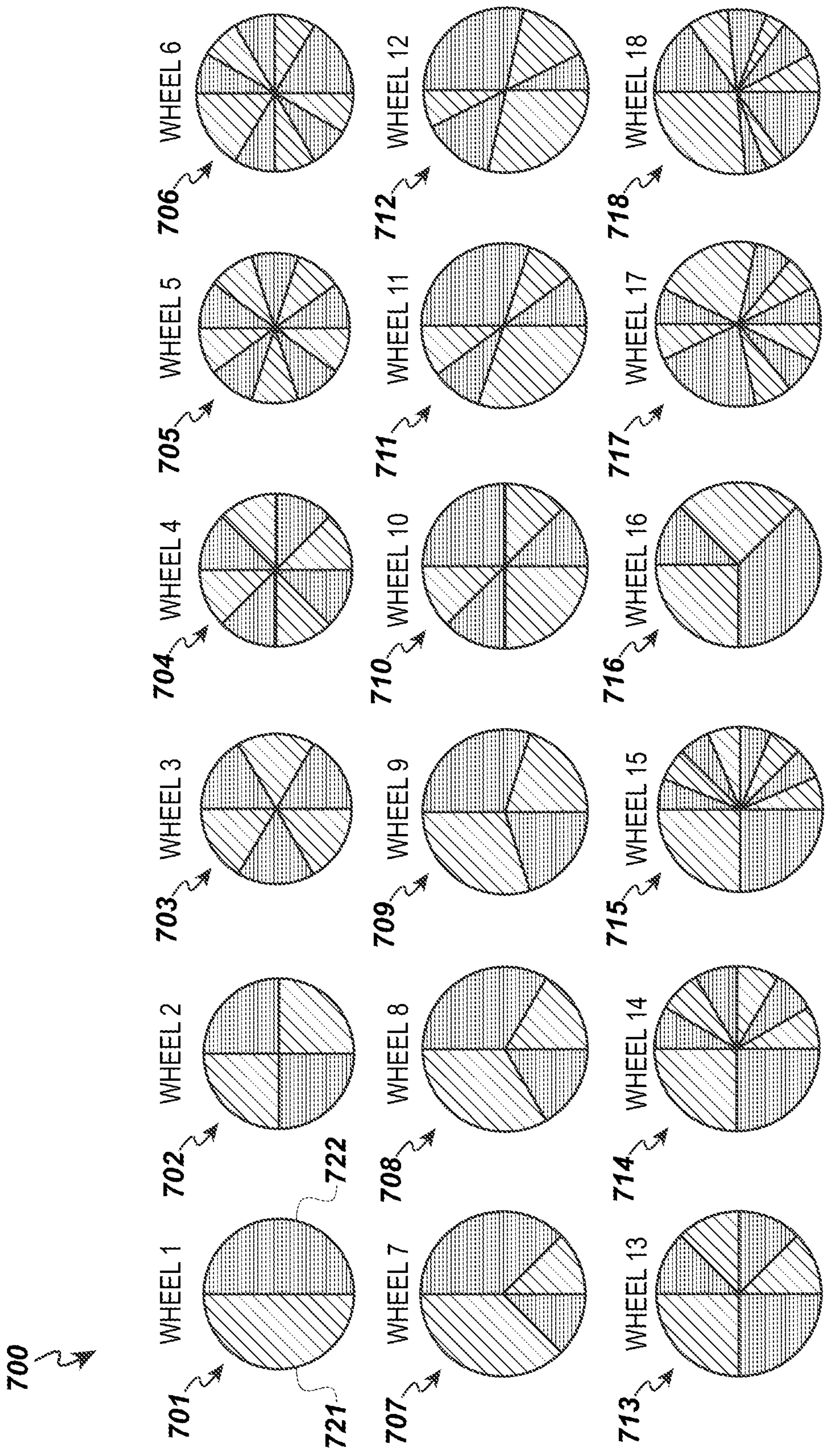
FIG. 7 depicts an example set of wheel layouts. One or more of these example wheel layouts may be selected by the method of FIG. 6.

FIG. 7 depicts an example set 700 of wheel layouts 701-718. One or more of these example wheel layouts 701-718 may be selected by the method 600 of FIG. 6. The individual segments for each of the home and visitor team 721, 722 in the example set of wheel layouts 701-718 may aggregate to the same area of a respective wheel layout 701-718 such that each team has an equal probability of winning, different areas of the respective wheel layout 701-718 such that the home team or the visitor team has a greater chance of winning (such as 60%, 70%, or the like), and so on.

In various embodiments, one or more wheels may be displayed on a main screen associated with play of a game via multiple electronic gaming machines. Selections from the multiple electronic gaming machines may be used to alter game results on the main screen and/or the multiple electronic gaming machines, RTP, provide customized outputs to the main screen and/or the multiple electronic gaming machines, and so on.

Figure 8:
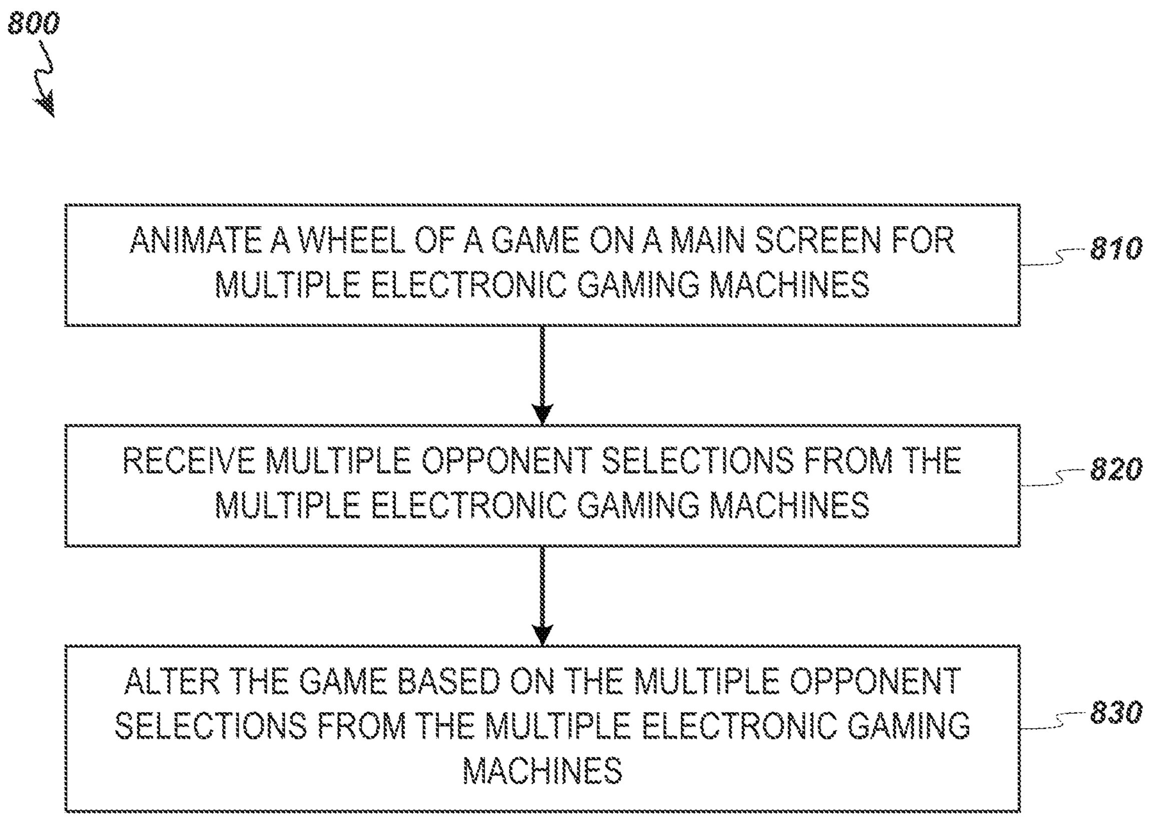
FIG. 8 depicts a flow chart illustrating an example method for operating a dynamic wheel or other type of game. The method may be performed by one or more of the devices depicted in FIGS. 1-3.

For example, FIG. 8 depicts a flow chart illustrating an example method 800 for operating a dynamic wheel or other type of game to maintain RTP. The method 800 may be performed by one or more of the devices depicted in FIGS. 1-3.

At operation 810, an electronic device (such as one or more of the devices depicted in FIGS. 1-3) may animate a wheel of a game on a main screen for multiple electronic gaming machines. For example, a wheel of a roulette type game may be presented on a main screen (such as via the UI system 302 of FIG. 3) and multiple electronic gaming machines may be usable by one or more players (such as via the UI system 302 of FIG. 3) to play the roulette type game.

At operation 820, the electronic device may receive multiple opponent selections from the multiple electronic gaming machines. By way of example, the multiple opponent selections may be received via the UI system 302 of FIG. 3.

At operation 830, the electronic device may alter the game based on the multiple opponent selections from the multiple electronic gaming machines. Output generated by and/or using such alterations may be presented via the UI system 302 of FIG. 3.

By way of a first example, a dynamic wheel game may include a wheel divided into a number of segments that each correspond to one of two opponents. The electronic device may randomly select a home team, a visitor team, and a wheel stop position to determine a winner between the home team and the visitor team. Players may place bets on the outcome of this dynamic wheel game, but bets placed (such as who will be the home team, who will be the visitor team, who will be the winner, and so on) could change the target RTP if a large number of people all bet the same way on the same game. The electronic device may modify the selected home team and/or visitor team based on the bets. By way of illustration, the electronic device may change the home team to the Steelers when a large number of players bet the Steelers to win and/or be the home team in order to maximize player engagement. By way of another illustration, the electronic device may change the visitor team to the Jets when a large number of players bet the Jets to lose and/or be the visitor team in order to maximize player engagement. In some situations, this may potentially change the odds used to calculate RTP and the electronic device may compensate for such (such as by lowering potential awards, decreasing the size and/or number of segments for the Steelers, and so on) in order to maintain the target RTP. Various configurations are possible and contemplated without departing from the scope of the present disclosure.

By way of a second example, the electronic device may determine that players are betting more on the Steelers than other teams. The electronic device may cause the main screen or the multiple electronic gaming machines to present output based on this determination. By way of illustration, lights, displays, and/or other output devices may be altered to display Steeler colors. By way of another illustration, an audio file may be played that says: "Looks like this is Steeler country!" Various configurations are possible and contemplated without departing from the scope of the present disclosure.

By way of a third example, the electronic device may determine that a large number of players are all betting on the same combination of home and visitor teams. This may change the RTP as the odds calculated for the game may not assume that large numbers of players may all bet the same way. In response, the electronic device may take action to compensate for this change in order to maintain RTP. By way of illustration, the electronic device may reduce the likelihood that the RNG will be used to select the home and visitor teams in the order bet by the large number of players in a corresponding proportion that the number of players all betting the same way changed the RTP. This may compensate, maintaining the target RTP.

In various examples, this example method 800 may be implemented as a group of interrelated software modules or components that perform various functions discussed herein. These software modules or components may be executed within a cloud network and/or by one or more computing devices, such as one or more of the devices depicted in FIGS. 1-3.

Although the example method 800 is illustrated and described as including particular operations performed in a particular order, it is understood that this is an example. In various implementations, various orders of the same, similar, and/or different operations may be performed without departing from the scope of the present disclosure.

For example, the method 800 is illustrated and described as altering the game based on multiple opponent selections from the multiple electronic gaming machines. However, it is understood that this is an example. In various implementations, the game may be altered based on other selections from the multiple electronic gaming machines. In some implementations, similar techniques may be used in the context of a single electronic gaming machine, such as an electronic gaming machine that changes the probability of opponent selection based on numbers of times individual teams won in a base game. Various configurations are possible and contemplated without departing from the scope of the present disclosure.

Figure 9:
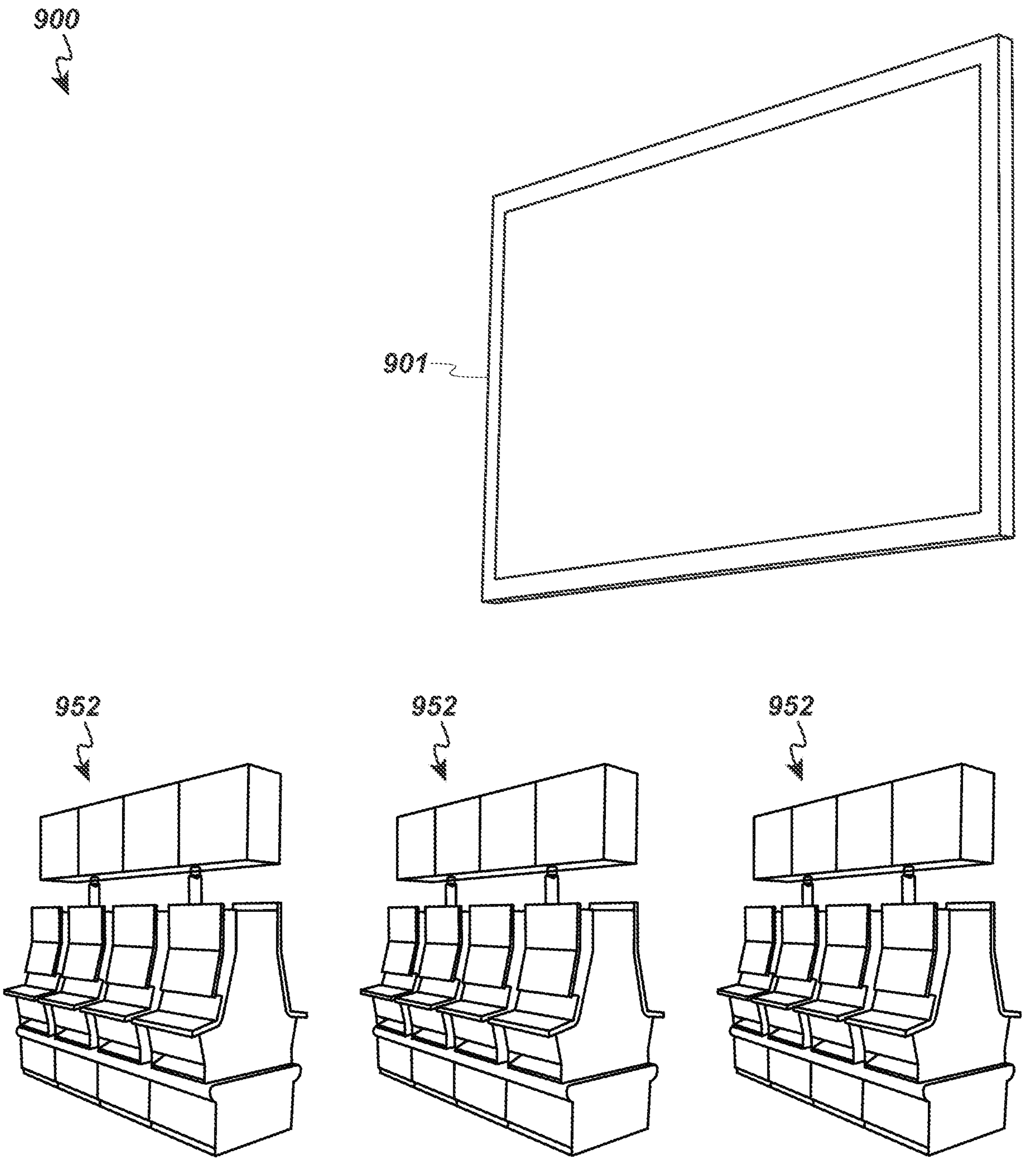
FIG. 9 depicts of a configuration of a main screen and multiple gaming machines that may be used together as part of a dynamic wheel or other type of game.

FIG. 9 depicts of a configuration 900 of a main screen 901 and multiple electronic gaming machines 952 that may be used together as part of a dynamic wheel or other type of game. This configuration 900 may be used with the method 800 of FIG. 8.

For example, a wheel of a roulette type game may be presented on the main screen 901 (such as via the UI system 302 of FIG. 3). The multiple electronic gaming machines 952 may be usable by one or more players (such as via the UI system 302 of FIG. 3) to play the roulette type game. By way of illustration, the multiple electronic gaming machines 952 may present interfaces that allow one or more players to place bets on the roulette type game. Results of spinning of the wheel may be shown on the main screen 901 (and/or the multiple electronic gaming machines 952). Individual player results corresponding to the individual bets and the results of spinning of the wheel shown on the main screen 901 may be respectively presented by individual ones of the multiple electronic gaming machines 952.

In some implementations, the wheel on the main screen 901 may include pointers and/or other indicators corresponding to each of the individual players such that the individual players do not need to take turns. In other implementations, the wheel on the main screen 901 may be dedicated to one of the individual players at a time and may switch between individual players corresponding to one or more turns. In still other implementations, the wheel on the main screen 901 may display results that impact all of the individual players but may not display information specific to any of the individual players. Various configurations are possible and contemplated without departing from the scope of the present disclosure.

However, it is understood that this configuration 900 is an example. Other configurations may be used without departing from the scope of the present disclosure. By way of illustration, in some implementations, the main screen 901 may be located remotely from the multiple electronic gaming machines 952 and/or one or more of the multiple electronic gaming machines 952 may be located remotely from one or more other of the multiple electronic gaming machines 952. Various configurations are possible and contemplated without departing from the scope of the present disclosure.

Figure 10A:
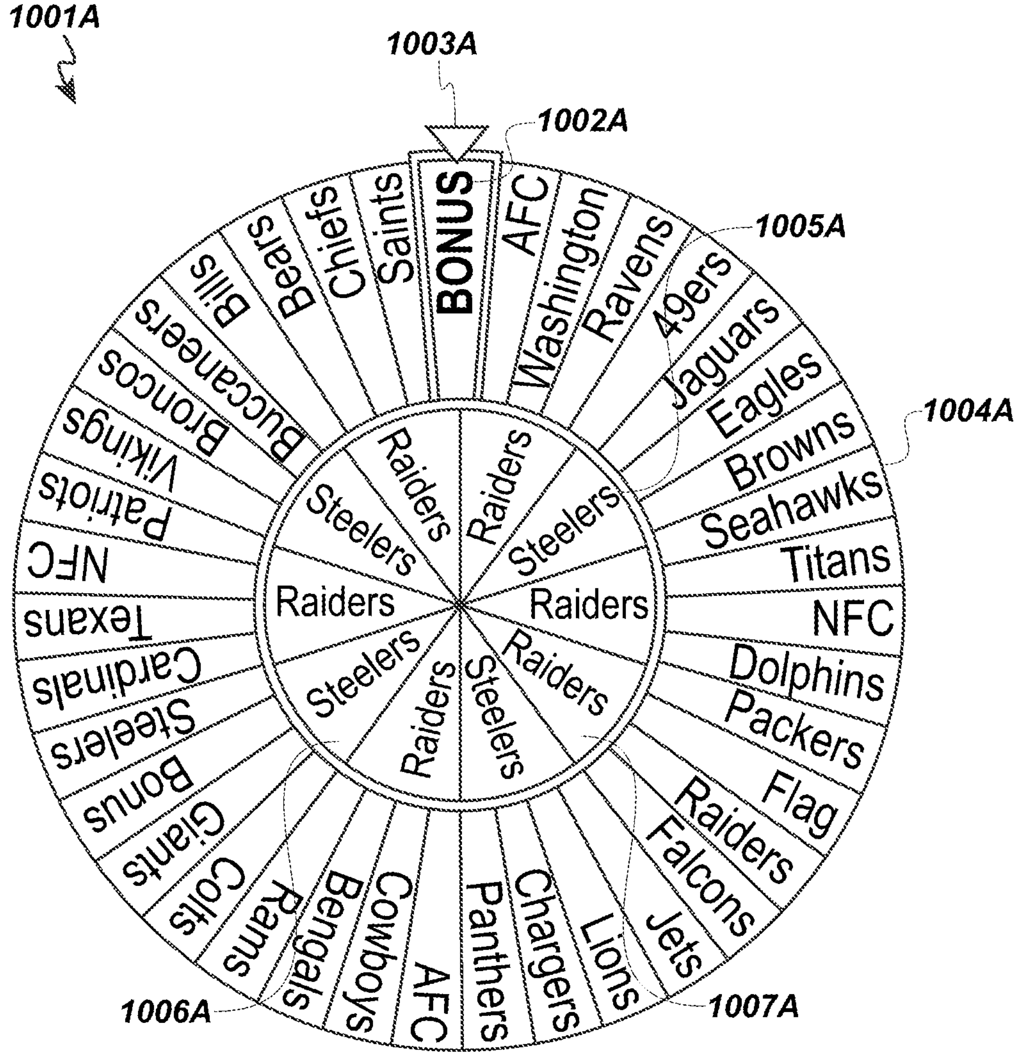
FIG. 10A depicts a first screen of a dynamic wheel game with a different configuration than that of FIGS. 5A-5E.

FIG. 10A depicts a first screen 1001A of a dynamic wheel game (which may be presented via the UI system 302 of FIG. 3) with a different configuration than that of FIGS. 5A-5E. Similar to FIGS. 5A-5E, the dynamic wheel game may include an outer wheel 1004A and an inner wheel 1005A and a first opponent segment 1006A and a second opponent segment 10007A. Also similar to FIGS. 5A-5E, the dynamic wheel game may include a bonus game triggerable from a base game when a base game indicator 1003A selects a bonus segment 1002A. By way of contrast with FIGS. 5A-5E, the dynamic wheel game may keep the outer wheel 1004A the same between the base game and the bonus game and may instead configure the inner wheel 1005A with a number of segments for each of a home and visitor team.

Figure 10B:
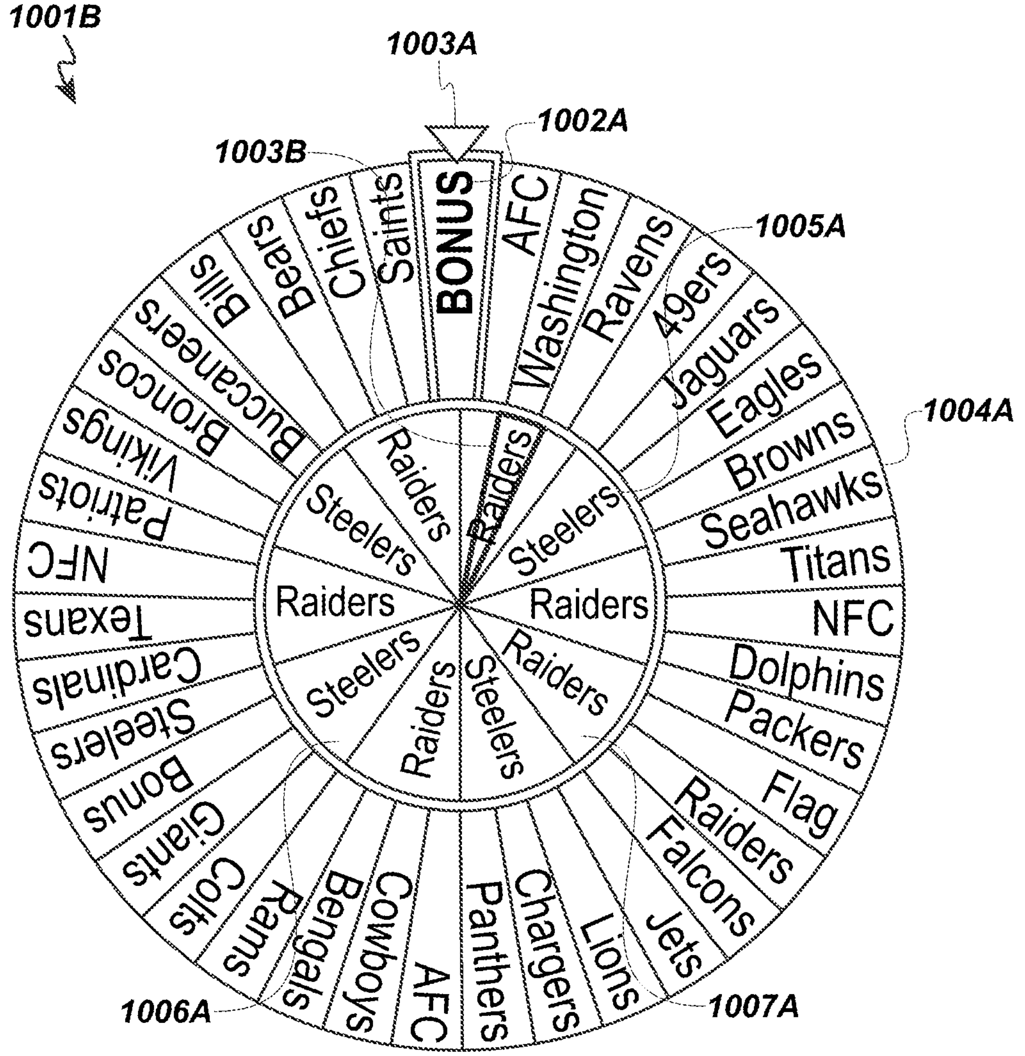
FIG. 10B depicts a first example second screen of the dynamic wheel game of FIG. 10A.

FIG. 10B depicts a first example second screen 1001B of the dynamic wheel game of FIG. 10A (which may be presented via the UI system 302 of FIG. 3). In this first example second screen 1001B of the dynamic wheel game of FIG. 10A, a bonus game indicator 1003B may be used to indicate a stop position. In some examples, the inner wheel 1005A may be spun while the bonus game indicator 1003B remains in place. In other examples, the inner wheel 1005A may be remain in place while the bonus game indicator 1003B rotates. Various configurations are possible and contemplated without departing from the scope of the present disclosure.

Figure 10C:
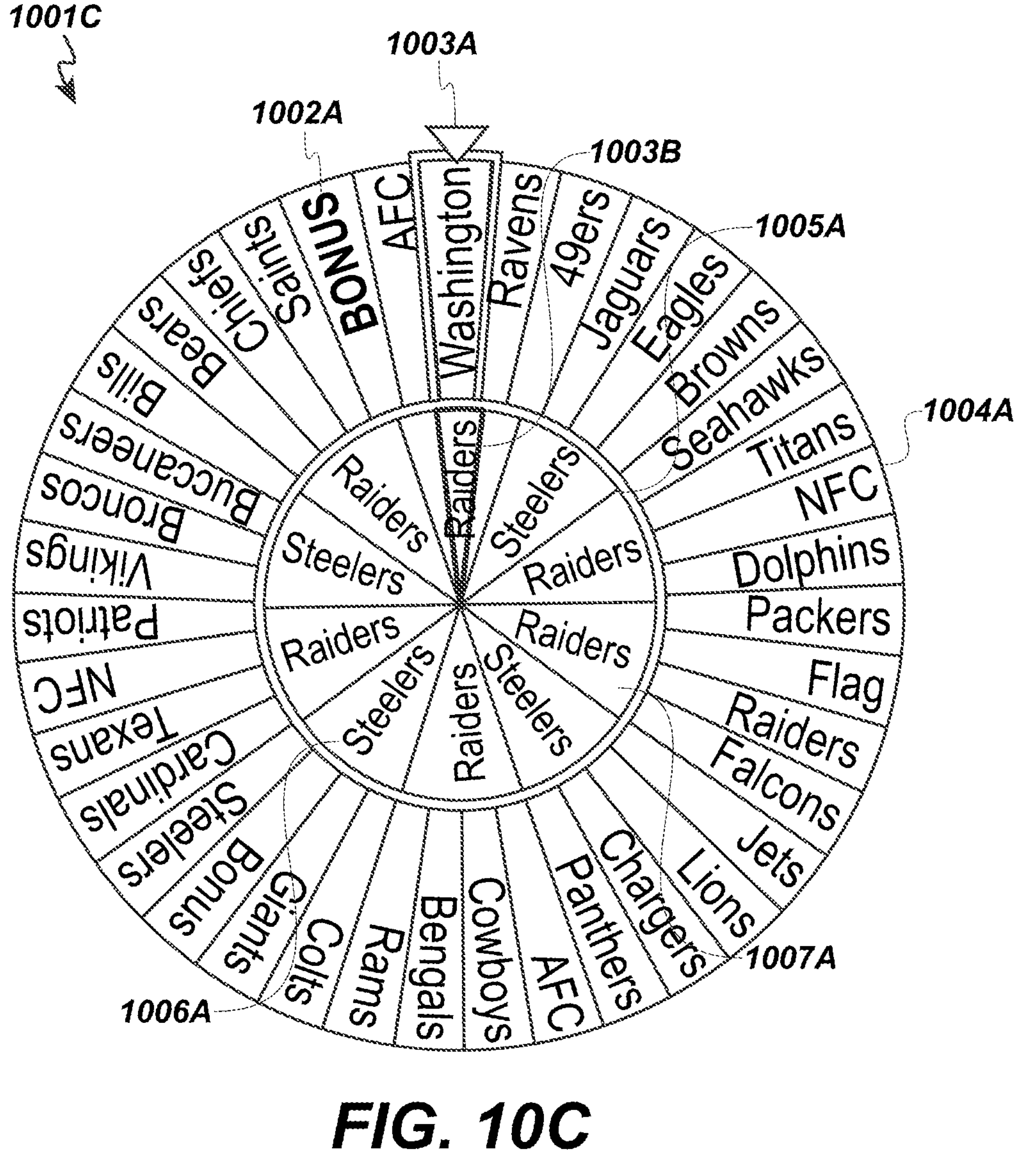
FIG. 10C depicts a second example second screen of the dynamic wheel game of FIG. 10A.

FIG. 10C depicts a second example second screen 1001C of the dynamic wheel game of FIG. 10A (which may be presented via the UI system 302 of FIG. 3). In this second example second screen 1001C of the dynamic wheel game of FIG. 10A, a combination of the base game indicator 1003A and the bonus game indicator 1003B may be used to indicate the stop position. As shown, the combination of the base game indicator 1003A and the bonus game indicator 1003B may rotate while the outer wheel 1004A and the inner wheel 1005A remain in place. In other implementations, the inner wheel 1005A may rotate while the combination of the base game indicator 1003A and the bonus game indicator 1003B remains in place. In other implementations, the inner wheel 1005A and the outer wheel 1004A may rotate while the combination of the base game indicator 1003A and the bonus game indicator 1003B remains in place. Various configurations are possible and contemplated without departing from the scope of the present disclosure.

A number of the above embodiments discuss wheel games involving a wheel divided into a number of segments for each of two opponents, such as a home team and a visitor team. However, this wheel presented via a user interface (via the UI system 302 of FIG. 3) may be confusing to players regarding exactly how much of the wheel corresponds to each opponent, given the multi-segment, split up configuration. In order to improve such a user interface, a first wheel may be presented that has one segment for the first opponent and a second segment for the second opponent. This first wheel may be animated transitioning into a second wheel as each of the segments splits into multiple segments and moves around to its respective final place on the second wheel.

In some implementations, the two segments before transitioning and the multiple segments after transitioning may occupy the same portion of their respective wheels. However, in other implementations, the space occupied may change, which may change the probability regarding which team will be the winner. In such implementations, one or more actions may be taken to prevent the change in probability from changing a target RTP.

By way of illustration, the change in probability for a first wheel transition favoring a first of two opponents may be balanced out by another change in probability for a second wheel transition favoring a second of two opponents. By changes in probability over a number of games compensating for individual game changes in probability, the target RTP may be maintained. By way of another illustration, other game odds and/or awards and/or jackpots may be altered to compensate for the change in probability. Various configurations are possible and contemplated without departing from the scope of the present disclosure.

Figure 11:
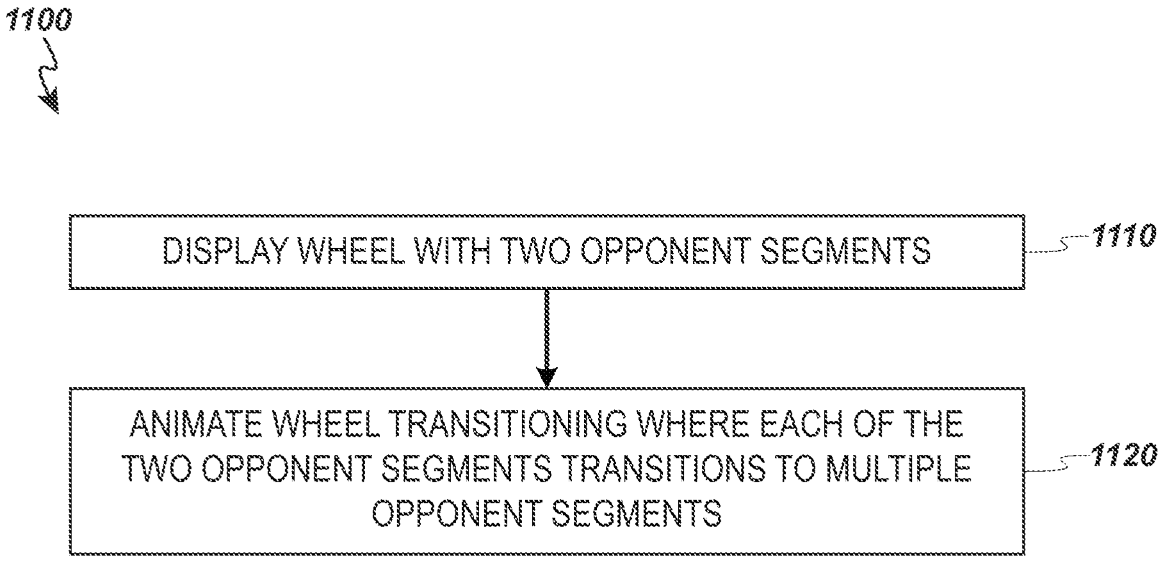
FIG. 11 depicts a flow chart illustrating an example method for operating a dynamic wheel type of game that includes a wheel layout transition. The method may be performed by one or more of the devices depicted in FIGS. 1-3.

For example, FIG. 11 depicts a flow chart illustrating an example method 1100 for operating a dynamic wheel type of game that includes a wheel layout transition. The method 1100 may be performed by one or more of the devices depicted in FIGS. 1-3.

At operation 1110, an electronic device (such as one or more of the devices depicted in FIGS. 1-3) may display a wheel with two opponent segments (such as via the UI system 302 of FIG. 3). Such a wheel maybe one or more of the wheels discussed above with respect to FIGS. 4-10.

At operation 1120, the electronic device may animate the wheel (such as via the UI system 302 of FIG. 3) transitioning where each of the two opponent segments transitions to multiple opponent segments. For example, the wheel after transition may resemble one or more of the wheel configurations of FIG. 7.

In various examples, this example method 1100 may be implemented as a group of interrelated software modules or components that perform various functions discussed herein. These software modules or components may be executed within a cloud network and/or by one or more computing devices, such as one or more of the devices depicted in FIGS. 1-3.

Although the example method 1100 is illustrated and described as including particular operations performed in a particular order, it is understood that this is an example. In various implementations, various orders of the same, similar, and/or different operations may be performed without departing from the scope of the present disclosure.

For example, operation 1120 illustrates and describes animation of the wheel transitioning. However, it is understood that this is an example. In various implementations, the first wheel with two segments may be replaced by a second wheel with the multiple segments without any animation being displayed. Various configurations are possible and contemplated without departing from the scope of the present disclosure.

Figure 12A:
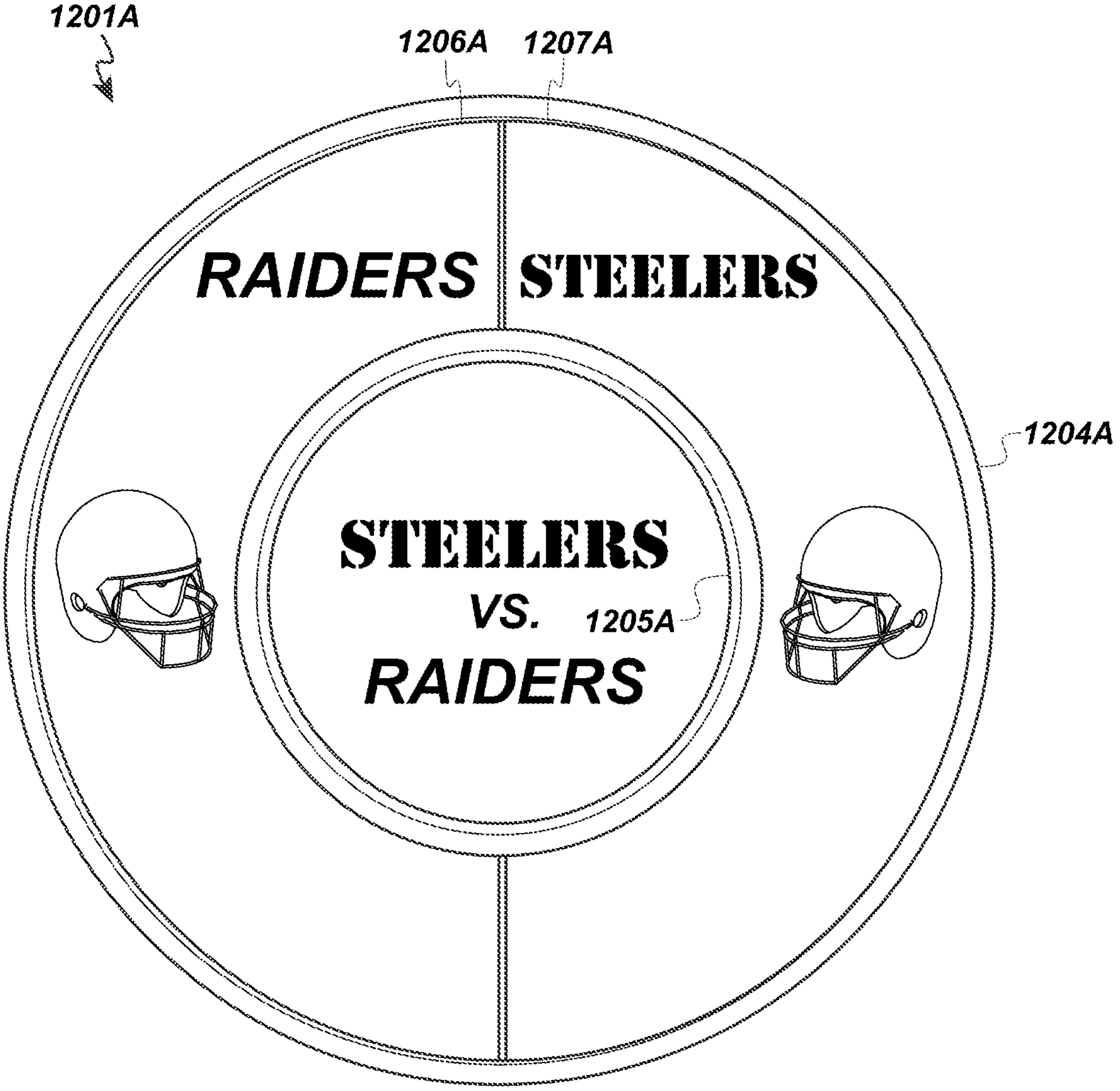
FIG. 12A depicts an example first wheel layout of a first example wheel layout transition. The first example wheel layout transition may be used with the method of FIG. 11.

FIG. 12A depicts an example first wheel layout 1201A of a first example wheel layout transition. The first example wheel layout transition may be used with the method of FIG. 11.

The first wheel layout 1201A includes an inner wheel 1205A and an outer wheel 1204A. The outer wheel 1204A displays a first opponent segment 1206A and a second opponent segment 1207A.

Figure 12B:
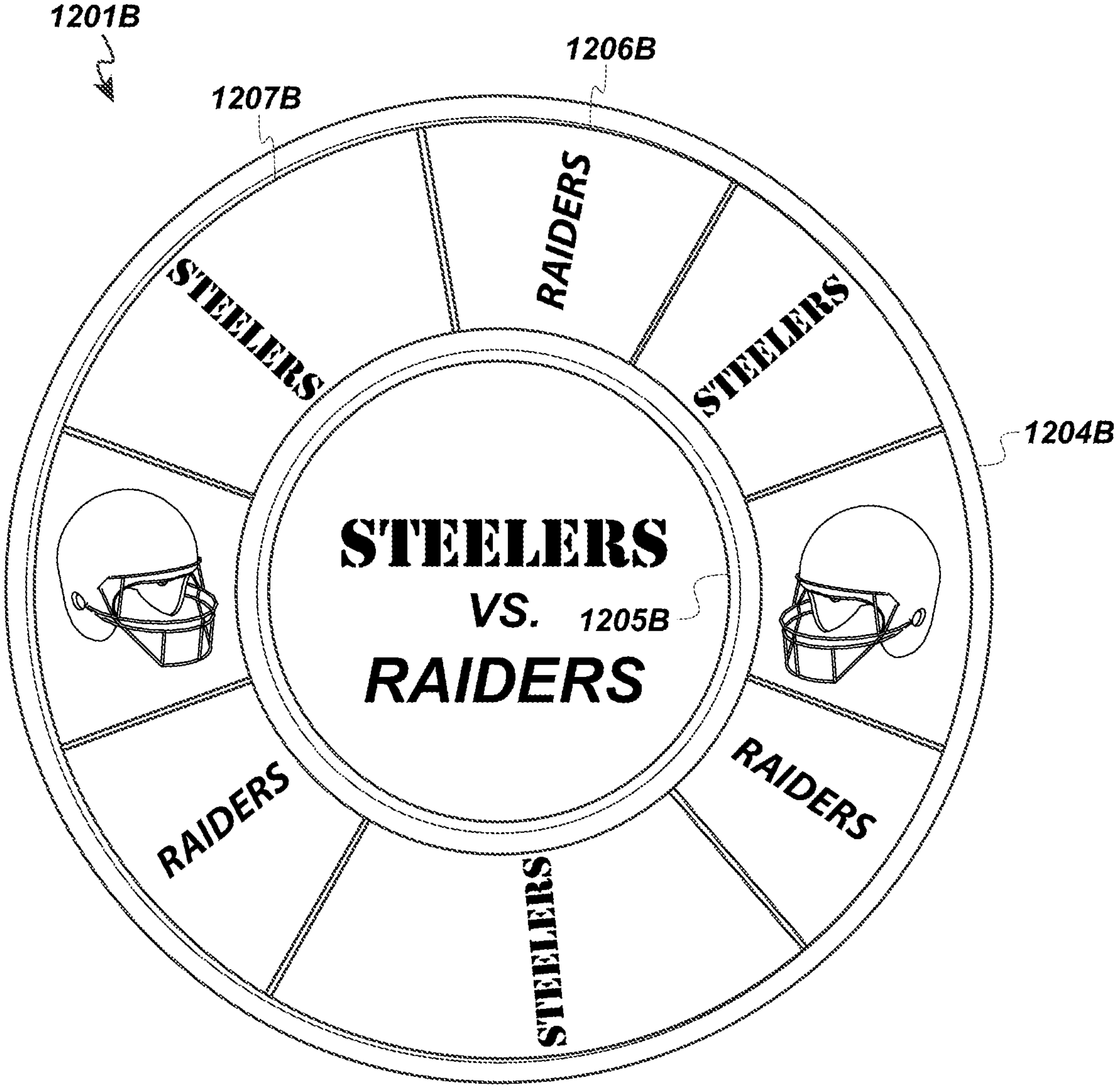
FIG. 12B depicts an example second wheel layout of the first example wheel layout transition.

FIG. 12B depicts an example second wheel layout 1201B of the first example wheel layout transition. As shown, the inner wheel 1205B remains the same while the first opponent segment 1206A and the second opponent segment 1207A of the outer wheel 1204A are replaced by being split into multiple first opponent segments 1206B and second opponent segments 1207B rearranged in various positions on the outer wheel 1204B.

Figure 13A:
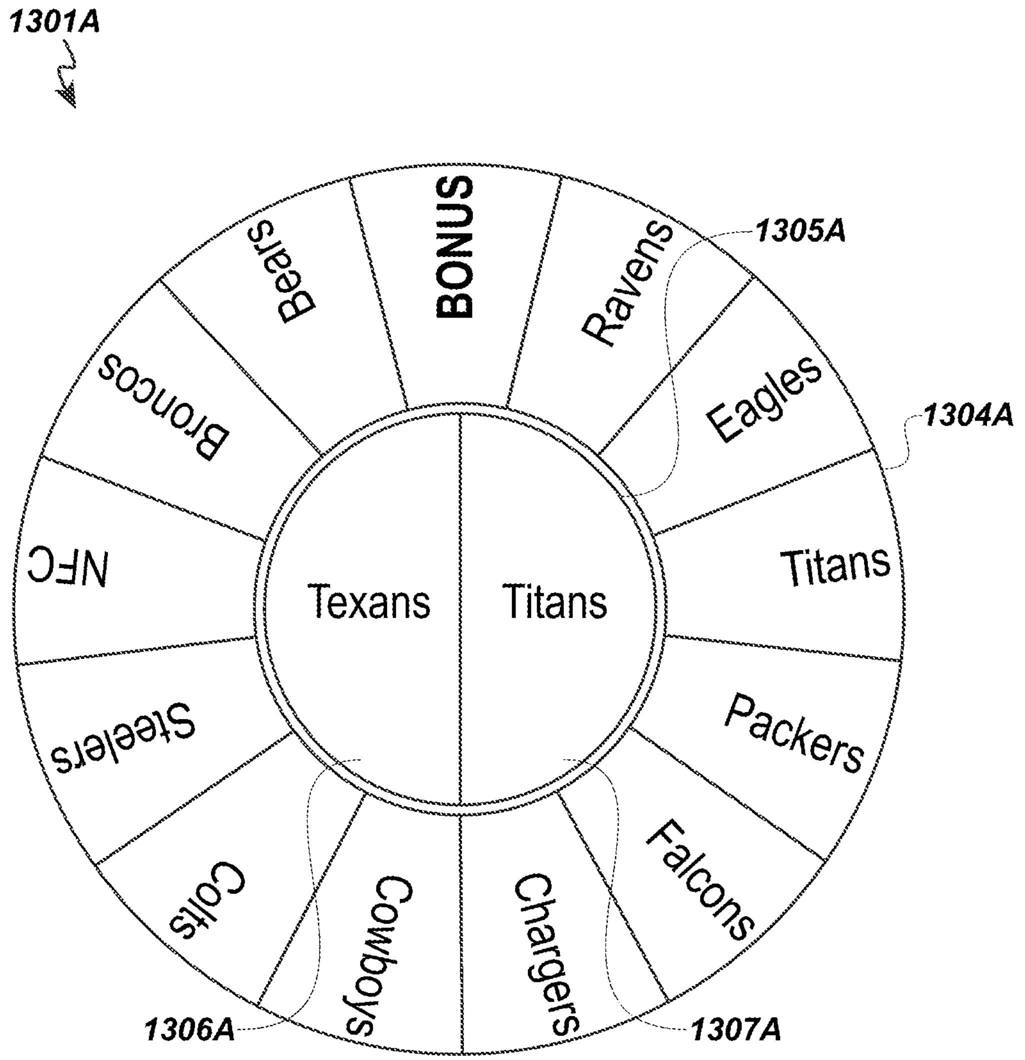
FIG. 13A depicts an example first wheel layout of a second example wheel layout transition. The second example wheel layout transition may be used with the method of FIG. 11.

FIG. 13A depicts an example first wheel layout 1301A of a first example wheel layout transition. The first example wheel layout transition may be used with the method of FIG. 11.

The first wheel layout 1301A includes an inner wheel 1305A and an outer wheel 1304A. The inner wheel 1305A displays a first opponent segment 1306A and a second opponent segment 1307A.

Figure 13B:
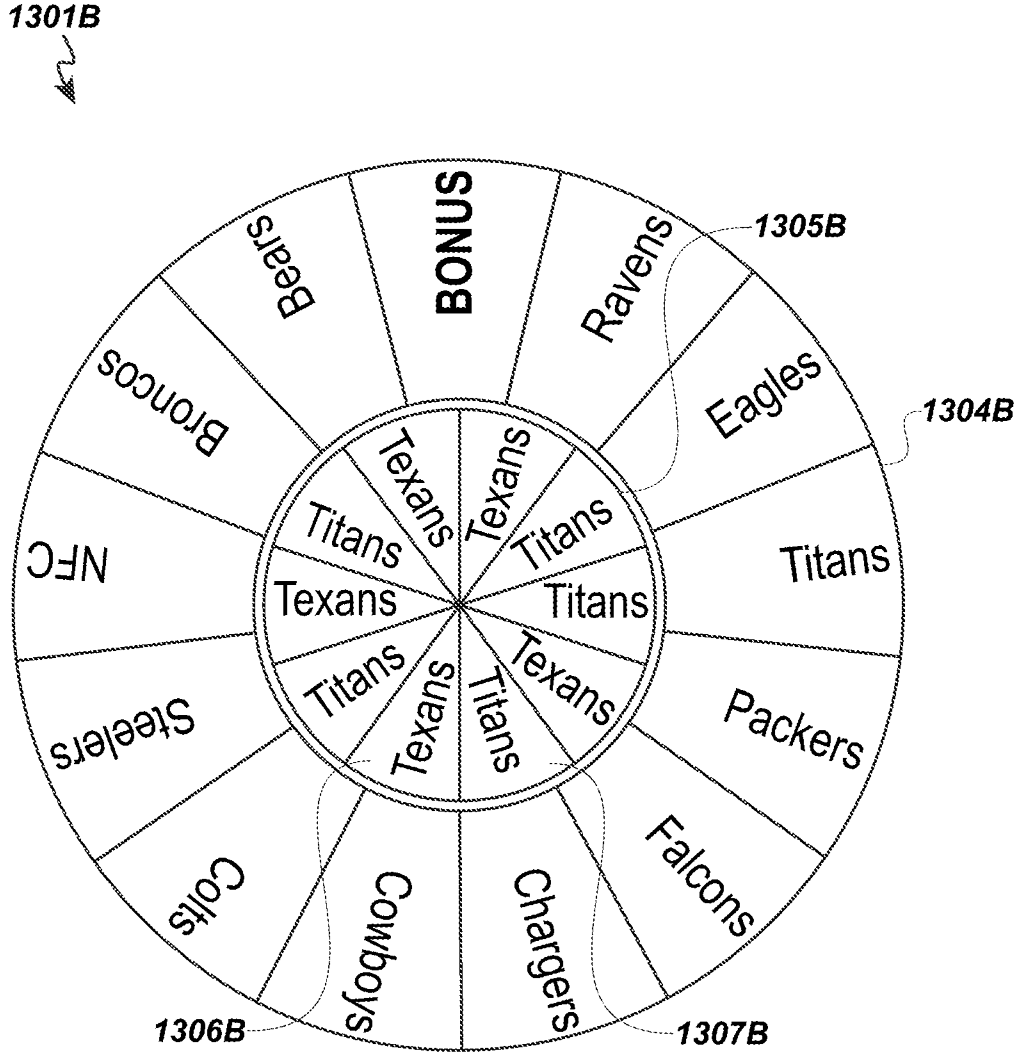
FIG. 13B depicts an example second wheel layout of the second example wheel layout transition.

FIG. 13B depicts an example second wheel layout 1301B of the first example wheel layout transition. As shown, the outer wheel 1304B remains the same while the first opponent segment 1306A and the second opponent segment 1307A of the inner wheel 1305A of FIG. 13A are replaced by being split into multiple first opponent segments 1306B and second opponent segments 1307B rearranged in various positions on the inner wheel 1305B.

It may be desirable to be able to change one or more wheel layouts in response to player requests. Such changes may improve the chase for the player as the player may be able to increase the chances that a favorite team will win, a hated team will lose, and so on. However, such changes may alter the odds of a potential outcome from the game, thus potentially violating a target RTP and/or one or more regulations and/or laws. In order to maintain RTP, various techniques may be used to compensate for the effects of such changes.

Figure 14:
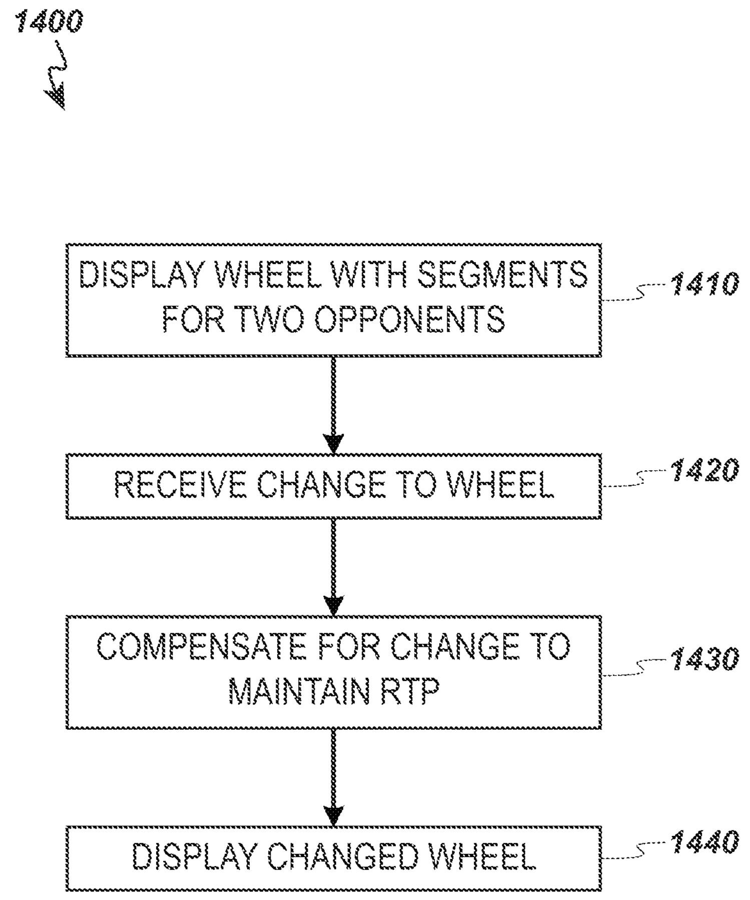
FIG. 14 depicts a flow chart illustrating an example method for compensating for player-selected probability changes to maintain return to player for a dynamic wheel type of game. The method may be performed by one or more of the devices depicted in FIGS. 1-3.

For example, FIG. 14 depicts a flow chart illustrating an example method 1400 for compensating for player-selected probability changes to maintain return to player for a dynamic wheel type of game. The method 1400 may be performed by one or more of the devices depicted in FIGS. 1-3.

At operation 1410, an electronic device (such as one or more of the devices depicted in FIGS. 1-3) may display (such as via the UI system 302 of FIG. 3) a wheel with segments (or slices) for two opponents. The wheel may be one or more of the wheels discussed above with respect to FIGS. 4-13B.

At operation 1420, the electronic device may receive a change to the wheel (such as via the UI system 302 of FIG. 3). The change may be received from a player (such as via the UI system 302 of FIG. 3). The change may alter the target RTP.

For example, the change may increase the portion of the wheel dedicated to one of the opponents (such as by increasing the size of one or more segments, changing the number of segments, and so on), decrease the portion of the wheel dedicated to one of the opponents, replace one or more of the opponents, and so on. By way of illustration, a player may request a change to increase the likelihood that the player's favorite team will win, decrease the likelihood that the player's favorite team's rival will lose, replace one of the opponents with the player's favorite team, replace one of the opponents with the player's favorite team's rival, and so on. The player may make one or more additional and/or side bets in order to make the change.

At operation 1430, the electronic device may compensate for the change to maintain RTP. For example, the side bet may be sufficient in size to maintain a target RTP despite the change. By way of another example, side bets for changes over a number of games that result in losing game results (or a portion thereof) may be placed into a pot where funds from which are used to maintain a target RTP despite the changes over the number of games. In yet another example, one or more game awards and/or jackpots may be reduced to proportionally compensate for an increased chance of winning corresponding to the change. Various configurations are possible and contemplated without departing from the scope of the present disclosure.

At operation 1440, the electronic device may display the changed wheel (such as via the UI system 302 of FIG. 3). The wheel may then be spun and may be stopped at a stop position to determine a game result.

In various examples, this example method 1400 may be implemented as a group of interrelated software modules or components that perform various functions discussed herein. These software modules or components may be executed within a cloud network and/or by one or more computing devices, such as one or more of the devices depicted in FIGS. 1-3.

Although the example method 1400 is illustrated and described as including particular operations performed in a particular order, it is understood that this is an example. In various implementations, various orders of the same, similar, and/or different operations may be performed without departing from the scope of the present disclosure.

For example, the above illustrates and describes receiving the change after displaying the wheel. However, it is understood that this is an example. In various implementations, the change may be received before the wheel is displayed. Various configurations are possible and contemplated without departing from the scope of the present disclosure.

One issue with dynamic wheel type games and other games that simulate play or sporting and/or other events is that the simulation of the play of the sporting and/or other events is not as dynamic as actual play of the sporting and/or other events. Even when different sets of opponents and scores are used to simulate the play of the sporting and/or other events, the play is still not as dynamic as actual play of the sporting and/or other events due the simplification in how the play is represented, the lesser number of happenstances that may occur during the simulation as opposed to the play, and so on. This may cause the user interface for the dynamic wheel type games and other games to be unsatisfying for players. However, the present disclosure provides an improved user interface that is more dynamic by providing output that is dependent upon one or more parameters and/or conditions of the game. In some embodiments, an engine evaluates one or more parameters and/or conditions, selects one or more audio and/or visual outputs based on the evaluation, and outputs the audio and/or visual output.

Figure 15:
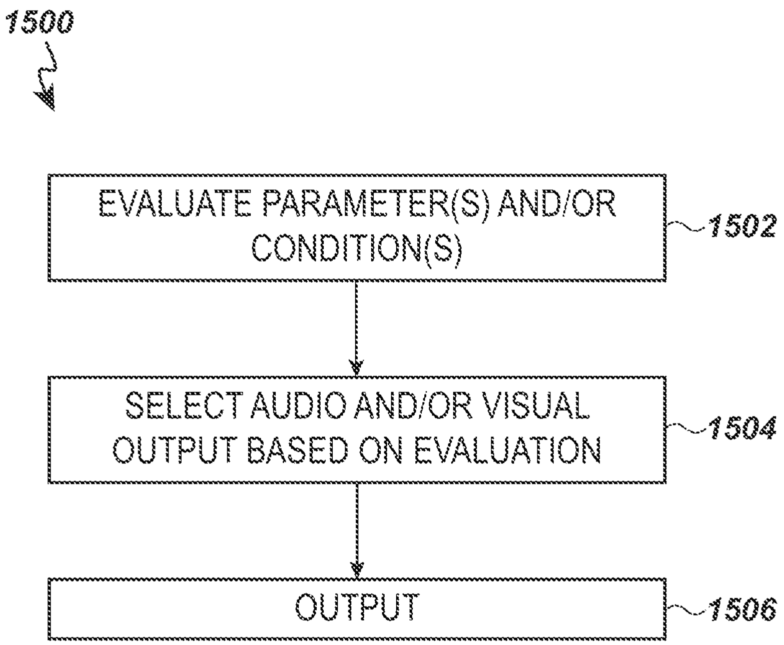
FIG. 15 depicts a first example method for providing output dependent upon one or more parameters and/or conditions of a dynamic wheel type game. The method may be performed by one or more of the devices depicted in FIGS. 1-3.

For example, FIG. 15 depicts a first example method 1500 for providing output dependent upon one or more parameters and/or conditions of a dynamic wheel type game. The method 1500 may be performed by one or more of the devices depicted in FIGS. 1-3.

At operation 1502, an electronic device (such as one or more of the devices depicted in FIGS. 1-3) may evaluate one or more parameters and/or conditions of a game. The electronic device may evaluate the one or more parameters and/or conditions by monitoring the one or more parameters and/or conditions as they change, by polling to obtain data relating to changes to the one or more parameters and/or conditions, and so on. The electronic device may evaluate the one or more parameters and/or conditions via an engine, such as a rules engine, an artificial intelligence engine, a machine learning engine, and so on. The game may be a dynamic wheel type game, such as one discussed above with respect to FIGS. 4-14. The parameters and/or conditions may be any kind of parameters and/or conditions, such as a number of players that select a particular opponent, how close a game outcome was to another outcome, distribution of segments on a wheel, bet values made by players, which opponent is the home team, which opponent is the away team, whether or not an opponent a player bet on was unsuccessful, player bet levels, accumulation of player selections, player selections matching a game outcome, whether or not a game outcome was a rare outcome based on distribution of wheel segments or other games states, historical game data, real life historical sport data, and so on.

At operation 1504, the electronic device may select one or more audio and/or visual outputs based on the evaluation. For example, one or more audio and/or visual outputs may include an audio file, a video file, a combination of an audio file and a video file, a set of audio files, and so on.

At operation 1506, the electronic device may provide the selected output, such as via the UI system 302 of FIG. 3. For example, the electronic device may provide the output by playing one or more audio files via one or more speakers, playing one or more video files via one or more display devices, and so on. This may improve a game user interface as the electronic device may provide a more dynamic experience than other games that may provide output corresponding to game play and/or particular game outcomes.

By way of example, the electronic device may provide an audio announcement when a threshold number of players select a particular opponent in a game. By way of illustration, the electronic device may provide an audio announcement stating "the stadium is full of Steelers fans today" when more than ten of a group of players select the Steelers.

In another example, the electronic device may provide an audio and/or visual announcement using historical game data. By way of illustration, the Packers and the Jets may have been involved in a number of previous game instances where the Packers won most often. Using this data, the electronic device may present an animation on a display announcing that "the Jets are back for another shot at the Packers."

By way of another example, the electronic device may acknowledge when a game outcome is a near miss or a close call. By way of illustration, a wheel game may involve a number of segments on a wheel corresponding to two opponents. The segments may be different sizes and the game outcome may correspond to a small slice corresponding to the Panthers adjacent to a large slice corresponding to the Broncos. As such, the electronic device may play audio stating "close call for the Panthers" or "near miss for the Broncos."

In yet another example, the electronic device may analyze the distribution of such segments of a wheel game and adjust audio and/or visual outputs accordingly. By way of illustration, segments of such a wheel game may involve a higher probability that the Falcons will beat the Chiefs than the Chiefs will beat the Falcons. As such, the electronic device may present an animation on a display stating that it looks like the odds are against the Chiefs today.

By way of yet another example, the electronic device may provide an audio and/or visual celebration when a rare outcome occurs, such as when an outcome is rare based on a distribution of wheel segments and/or other game states. By way of illustration, a first segment associated with a 1% probability of being selected and associated with the Patriots may be adjacent a number of other segments with a total probability of 60% of being selected and associated with the Jaguars. In such a situation, the electronic device may respond to the selection of the first segment by playing an audio file of an announcer screaming "the Jaguars pull off the impossible!"

Conversely, the electronic device may provide an audio and/or visual celebration when a common outcome occurs, such as when an outcome is common based on a distribution of wheel segments and/or other game states. By way of illustration, a first segment associated with a 1% probability of being selected and associated with the Patriots may be adjacent a number of other segments with a total probability of 60% of being selected and associated with the Jaguars. In such a situation, the electronic device may respond to the selection of the one or the other segments by playing an audio file of an announcer screaming "it's a blowout for the Patriots!"

In still another example, the electronic device may compare the one or more parameters and/or conditions to real life historical sport data. By way of illustration, the electronic device may be able to access a database of real life historical sport data, compare the real life historical sport data to current game data, and select one or more outputs accordingly, such as determining that two opponents last met in Superbowl XIV and correspondingly playing an audio file of an announcer saying "it's Superbowl XIV all over again."

By way of yet another example, the electronic device may initiate audio and/or visual events based on player bets. By way of illustration, a player may put a maximum bet on the Patriots and the electronic device may respond by saying "the Patriots have a high roller in the stands!" or "there's a super Patriots fan in the stands!"

In yet another example, the electronic device may initiate audio and/or visual events by monitoring player behavior. By way of illustration, chairs associated with electronic gaming machines may include one or more sensors that register whether or not a player is seated. The electronic device may poll the sensors, determine when players stand from the chairs, and state "the fans have taken to their feet!" In another illustration, the electronic device may track the opponent bet on by the player who stood, determine that the opponent is the Cowboys, provide audio stating "the Cowboys section takes to its feet!"

The audio and/or visual outputs may correspond to individual audio and/or visual files. However, in other implementations, the electronic device may combine multiple audio and/or visual files to generate the output. By way of illustration, audio files may be recorded for different parts of a sentence corresponding to different events that may happen to different opponents as well as one or more ways of stating the opponents. In such a situation, the audio files corresponding to the particular event that has happened may be combined with the audio file for the opponent to generate the output.

For example, audio for a number of sentence beginnings may be recorded, such as "Looks like we have some," "Looks like we have a lot of," "Lots of folks betting on the," "Lots of folks betting against the," "The," and so. Audio for a number of ways of saying different opponents may also be recorded, such as a team name (like the "49ers"), a city ("San Francisco"), a nickname ("9ers"), a location/conference ("Northeast"), a combination of the previous (the "San Francisco 49ers"), and so on. Further, a number of sentence middles, ends, and/or times may be recorded, such as "fans here," "won last time. Can they do it again?," "are on a winning streak," "have won twice in a row," "today," "tonight," and so on. These may be assembled into a composite output, such as "Looks like we have some 49ers fans here tonight."

The above discussed audio and/or visual output may be combined as well. By way of illustration, one or more introduction video clips may be stored of each opponent playing. A combination introduction for a game where a first opponent plays a second opponent may be generated by combining an introduction video clip for the first opponent with an instruction video clip for the second opponent. Various configurations are possible and contemplated without departing from the scope of the present disclosure.

This compound assembly of outputs from components may improve the operation of the electronic device by reducing the amount of storage space required to store audio and/or visual outputs that will be provided while improving the user interface by increasing the ability of the game to be dynamic. However, storage of individual audio and/or visual outputs that are not combined in this way may improve electronic device operation by reducing processor and/or other resources required by assembling outputs from multiple components on the fly. Various configurations are possible and contemplated without departing from the scope of the present disclosure.

In various examples, this example method 1500 may be implemented as a group of interrelated software modules or components that perform various functions discussed herein. These software modules or components may be executed within a cloud network and/or by one or more computing devices, such as one or more of the devices depicted in FIGS. 1-3.

Although the example method 1500 is illustrated and described as including particular operations performed in a particular order, it is understood that this is an example. In various implementations, various orders of the same, similar, and/or different operations may be performed without departing from the scope of the present disclosure.

For example, the method 1500 is illustrated and described as the electronic device performing all of the operations. However, it is understood that this is an example. In some implementations, the electronic device may evaluate the one or more parameters and/or conditions, select the audio and/or visual output based on the evaluation, and signal another electronic device to actually output the selected audio and/or visual output. Various configurations are possible and contemplated without departing from the scope of the present disclosure.

FIG. 16 depicts a chart 1600 or table of parameter/condition sets 1601 and associated audio and/or visual outputs 1602 that may be used by the method 1500 of FIG. 15. A rules engine may evaluate the chart 1600, find that a parameter/condition set 1601 matches a current situation, and provide the audio and/or visual output 1602 that corresponds to the parameter/condition set 1601 that matches the current situation.

By way of example, a rules engine may evaluate the chart 1600 and find that a parameter/condition set 1601 associated with a threshold number of players (such as twenty) selecting either one of the Broncos and the Dolphins matches a current situation. As such, the rules engine may provide corresponding audio and/or visual output 1602 stating "the fans are really divided between the Broncos and the Dolphins on this one."

In various implementations, the electronic device may have the option of selecting between multiple outputs in a given situation. In such an implementation, the electronic device may select different of the multiple outputs (such as randomly and/or based on various criteria, such as whether or not a player participated in previous game instances) in different situations to increase the dynamic nature of the game.

For example, a player may participate in multiple game instances. If the same output was selected each time, the game would seem less dynamic to the player. However, if different outputs were selected each time, the game would seem more dynamic to the player as different outputs would be provided rather than the same output multiple times.

Figure 17:
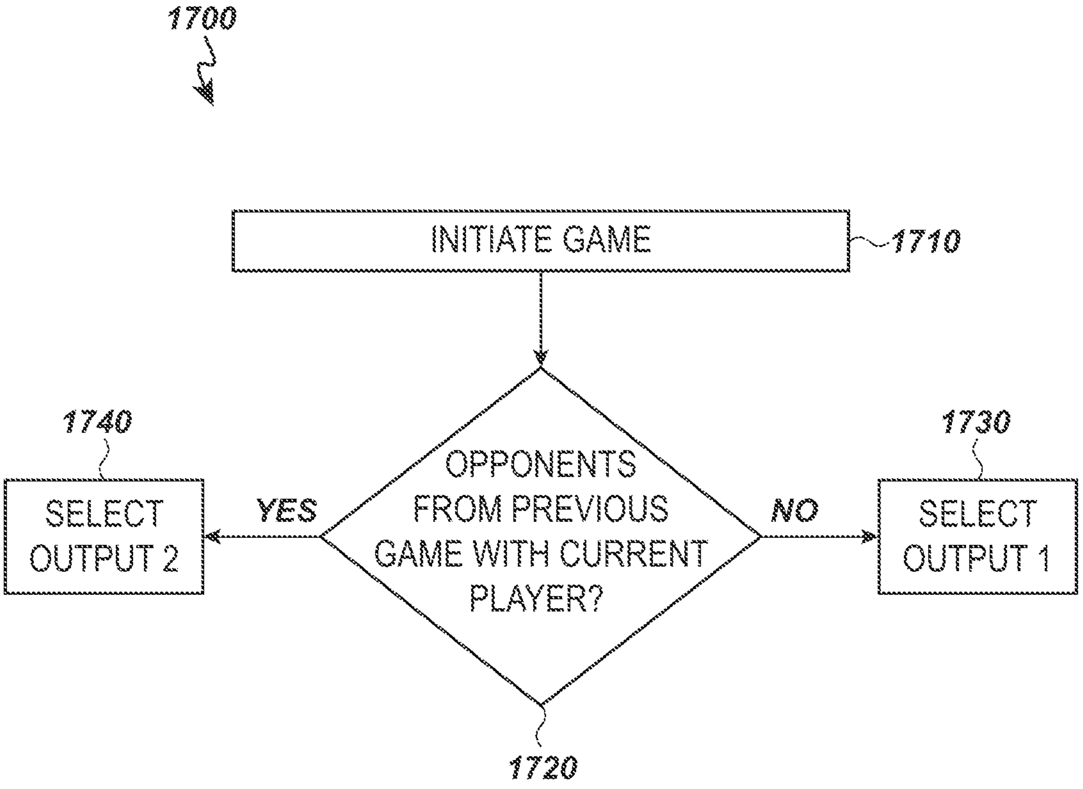
FIG. 17 depicts a second example method for providing output dependent upon one or more parameters and/or conditions of a dynamic wheel type game. The method may be performed by one or more of the devices depicted in FIGS. 1-3.

By way of illustration, FIG. 17 depicts a second example method 1700 for providing output dependent upon one or more parameters and/or conditions of a dynamic wheel type game. The method 1700 may be performed by one or more of the devices depicted in FIGS. 1-3.

At operation 1710, an electronic device (such as one or more of the devices depicted in FIGS. 1-3) may initiate a game, such as via the UI system 302 of FIG. 3. The game may be a wheel type game, which may involve one or more of the wheels discussed above with respect to FIGS. 4-13B.

At operation 1720, the electronic device may determine whether or not opponents of the game are the same as a previous game with one of the current players. If not, the flow may proceed to operation 1730 where a first output is selected. Otherwise, the flow may proceed to operation 1740 where a second output is selected.

The electronic device may then present the output, such as via one or more speakers, displays, and so on. Various configurations are possible and contemplated without departing from the scope of the present disclosure.

By way of illustration, the first output may be a first introduction sequence for an opponent where the opponent intercepts a pass and runs it in for a touchdown while the second output may be a second introduction sequence for the opponent where the opponent makes a field goal. The electronic device may default to showing the first introduction sequence for the opponent unless one of the players participated in a previous game instance where the first instruction sequence of the opponent intercepting a pass and running it in for a touchdown was already shown. However, if one of the players participated in a previous game instance where the first instruction sequence of the opponent intercepting a pass and running it in for a touchdown was already shown, the electronic device may instead show the second introduction sequence for the opponent where the opponent makes a field goal. Various configurations are possible and contemplated without departing from the scope of the present disclosure.

In various examples, this example method 1700 may be implemented as a group of interrelated software modules or components that perform various functions discussed herein. These software modules or components may be executed within a cloud network and/or by one or more computing devices, such as one or more of the devices depicted in FIGS. 1-3.

Although the example method 1700 is illustrated and described as including particular operations performed in a particular order, it is understood that this is an example. In various implementations, various orders of the same, similar, and/or different operations may be performed without departing from the scope of the present disclosure.

For example, the method 1700 is illustrated and described as selecting between the first and second outputs based on whether or not the opponents are from a previous game with a current player. However, it is understood that this is an example. In other implementations, multiple possible outputs may be selected according to a variety of other criteria, such as a current time, an output generated by an RNG, and so on. Various configurations are possible and contemplated without departing from the scope of the present disclosure.

Another issue with dynamic wheel type games and other games that simulate play of sporting and/or other events is that one or more user interfaces presented include one or more colors that represent one or more opponents, but the colors selected may be similar. Presentation of similar colors to represent different opponents may impair user interfaces by making players unable to tell what on a display represents one opponent and what represents another. However, the present disclosure provides an improved user interface that selects an alternate opponent color for output upon determining that selected opponent colors are similar. In various embodiments, opponents may be determined, colors for the opponents may be retrieved, a determination may be made whether or not the colors are similar, and if the colors are determined to be similar, retrieves an alternate color.

Figure 18:
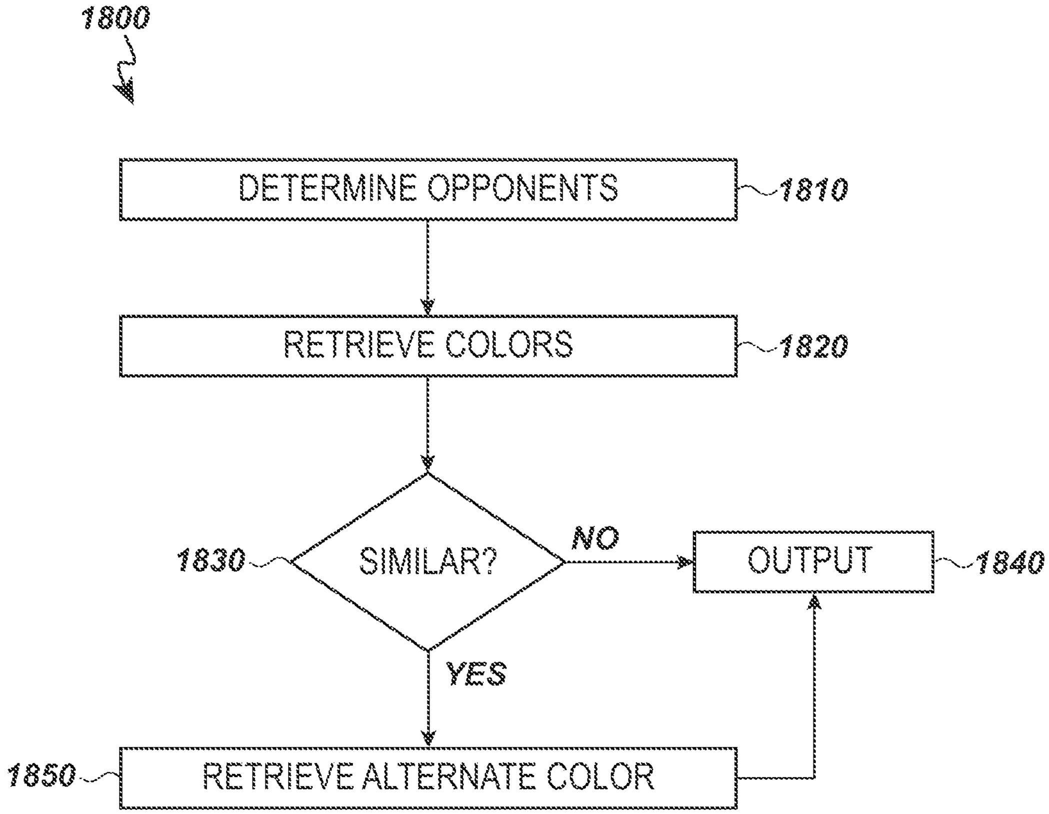
FIG. 18 depicts an example method for selecting alternate opponent colors upon determining similarity to the colors of another opponent for a dynamic wheel type game. The method may be performed by one or more of the devices depicted in FIGS. 1-3.

For example, FIG. 18 depicts an example method 1800 for selecting alternate opponent colors upon determining similarity to the colors of another opponent for a dynamic wheel type game. The method 1800 may be performed by one or more of the devices depicted in FIGS. 1-3.

At operation 1810, an electronic device (such as one or more of the devices depicted in FIGS. 1-3) may determine opponents. For example, opponents may be selected for a dynamic wheel type game like the one discussed above with respect to FIGS. 5B-5E.

At operation 1820, the electronic device may retrieve colors associated with the opponents. For example, the electronic device may access a chart or table that associates one or more colors with one or more opponents. By way of illustration, the chart or table may associate the Steelers with black, gold, and white.

At operation 1830, the electronic device may determine whether or not the colors retrieved for the two opponents are similar. If not, the flow may proceed to operation 1840 where the electronic device may provide output using the colors, such as via the UI system 302 of FIG. 3. Otherwise, the flow may proceed to operation 1850 where the electronic device may retrieve an alternate color for one of the colors before the flow proceeds to 1840 and the electronic device provides the output using one of the colors for which an alternate was not retrieved and the alternate color.

By way of example, the colors may be orange and tangerine. The electronic device may determine that orange and tangerine are similar, retrieve an alternate color for the opponent associated with tangerine, which may be green, and provide output using orange and green.

By way of another example, the colors may be orange and black. The electronic device may determine that orange and black are not similar and provide output using orange and black.

By way of yet another example, the colors may be black and black. The electronic device may determine that black and black are similar (in fact identical), retrieve an alternate color for the opponent associated with black, which may be silver, and provide output using silver and black.

For example, the electronic device may convert the colors to RGB (and/or other color model) values (such as orange, which has RGB values of red=255, green=165, blue–0) (and/or the colors retrieved may be RGB values and no conversion may be necessary), compute a distance between the RGB values using a formula like the three-dimensional Cartesian distance formula (AB=the square root of ((X2–X2)^2+(Y2–Y2)^2+(Z2–Z2)^2) or the distance between RGB1 and RGB2 being the square root of ((R2–R2)^2+(G2–G2)^2+(B2–B2)^2)), and determine whether that distance is less than a color similarity threshold (such as 8). If so, the colors may be determined to be similar.

However, it is understood that this is an example. In other implementations, a modified version of the three-dimensional Cartesian distance formula may be used. For example, ((X2–X2)^2+(Y2–Y2)^2+(Z2–Z2)^2 may be compared to a threshold without taking the square root of ((X2–X2)^2+(Y2–Y2)^2+(Z2–Z2)^2. Various configurations are possible and contemplated without departing from the scope of the present disclosure.

In various examples, the color similarity threshold may be determined by having people view different colors, determine whether or not the people can distinguish between the colors, and set the thresholds based on what colors the people could distinguish between and which the people could not. In some examples, different color similarity thresholds may be set for different modes, such as different color similarity thresholds for red/green colorblind (and/or other types of colorblind) people than for people who are not red/green colorblind. Various configurations are possible and contemplated without departing from the scope of the present disclosure.

In various examples, this example method 1800 may be implemented as a group of interrelated software modules or components that perform various functions discussed herein. These software modules or components may be executed within a cloud network and/or by one or more computing devices, such as one or more of the devices depicted in FIGS. 1-3.

Although the example method 1800 is illustrated and described as including particular operations performed in a particular order, it is understood that this is an example. In various implementations, various orders of the same, similar, and/or different operations may be performed without departing from the scope of the present disclosure.

For example, operation 1830 is illustrated and described as determining whether or not the colors are similar. However, it is understood that this is an example. In some implementations, the electronic device may determine whether a three-dimensional Cartesian distance between the colors is within a threshold without considering whether or not this means that the colors are similar. Various configurations are possible and contemplated without departing from the scope of the present disclosure.

FIG. 19 depicts a chart 1900 or table of opponents 1901 with associated primary 1902 and alternate 1903 colors. For example, team 1 is associated with true red 5 and gold. The method 1800 may use such a chart for retrieving the colors. Various configurations are possible and contemplated without departing from the scope of the present disclosure.

Figure 20:
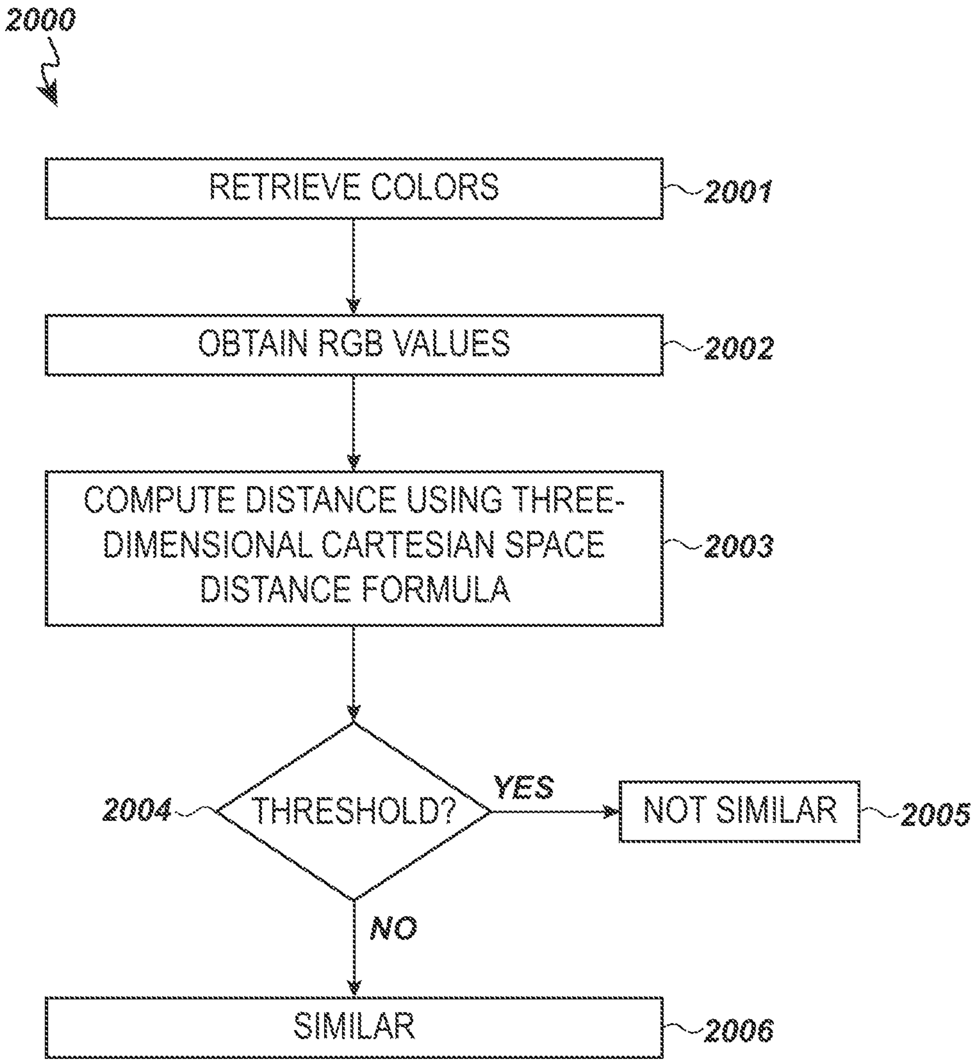
FIG. 20 depicts an example method for determining similarity between opponent colors for a dynamic wheel type game. The method may be performed by one or more of the devices depicted in FIGS. 1-3.

FIG. 20 depicts an example method 2000 for determining similarity between opponent colors for a dynamic wheel type game. The method 2000 may be performed by one or more of the devices depicted in FIGS. 1-3. The method 2000 may be used as part of the method 1800 to determine whether or not colors are similar.

At operation 2001, an electronic device (such as one or more of the devices depicted in FIGS. 1-3) may retrieve colors. At operation 2002, the electronic device may obtain RGB values for the colors. At operation 2003, the electronic device may compute a distance between the colors using a three-dimensional Cartesian space distance formula.

For example, the formula may be AB=the square root of ((X2–X2)^2+(Y2–Y2)^2+(Z2–Z2)^2). Substituting the two RGB values for the two colors yields the distance between RGB1 and RGB2 being the square root of ((R2−R2)^2+(G2−G2)^2+(B2−B2)^2)).

At operation 2004, the electronic device may determine whether or not the distance is greater than a color similarity threshold, such as 8. In various examples, the color similarity threshold may be determined by having people view different colors, determine whether or not the people can distinguish between the colors, and set the thresholds based on what colors the people could distinguish between and which the people could not. In some examples, different color similarity thresholds may be set for different modes, such as different color similarity thresholds for red/green colorblind (and/or other types of colorblind) people than for people who are not red/green colorblind. Various configurations are possible and contemplated without departing from the scope of the present disclosure. If so, flow may proceed to operation 2005 where the electronic device may determine that the colors are not similar. Otherwise, the flow may proceed to operation 2006 where the electronic device may determine that the colors are similar.

In various examples, this example method 2000 may be implemented as a group of interrelated software modules or components that perform various functions discussed herein. These software modules or components may be executed within a cloud network and/or by one or more computing devices, such as one or more of the devices depicted in FIGS. 1-3.

Although the example method 2000 is illustrated and described as including particular operations performed in a particular order, it is understood that this is an example. In various implementations, various orders of the same, similar, and/or different operations may be performed without departing from the scope of the present disclosure.

For example, the method 2000 is illustrated and described as retrieving colors and then obtaining RGB values for the colors. However, it is understood that this is an example. In various implementations, retrieving the colors may retrieve the RGB values and a separate operation of obtaining RGB values for the colors may be omitted. Various configurations are possible and contemplated without departing from the scope of the present disclosure.

By way of another example, the method 2000 is illustrated and described as using RGB values. However, it is understood that this is an example. In various implementations, color model values other than RGB values may be used without departing from the scope of the present disclosure.

Yet another issue with dynamic wheel type games and other wheel type games is that there may be a disconnect between animating spinning of a wheel responsive to user touch input and animating spinning of the wheel to arrive at a wheel stop position corresponding to a game outcome. For example, a player may touch and slide the wheel on a display to start the wheel spinning. The wheel may then be animated spinning responsive to the player's user touch input to mimic spinning of a physical wheel. However, the wheel does not stop arrive at a wheel stop position responsive to the player's user touch input as the outcome of the game may be controlled, such as where a wheel stop position is randomly determined using a random number generator that produces numbers related to wheel stop positions. Animation of the wheel spinning to the wheel stop position may involve determining a current wheel position and then animating the wheel from the current wheel position to the determined wheel stop position. However, if the wheel is currently spinning responsive to the player's user touch input, the wheel will have spun past the current wheel position by the time the animation of the wheel spinning to the wheel stop position start. This may impair the user interface by causing the spinning of the wheel to jerk upon switching over from animating spinning of the wheel responsive to the user touch input and animating spinning of the wheel to the wheel stop position. The present disclosure improves the user interface by controlling switchover from animating spinning of the wheel responsive to the user touch input and animating spinning of the wheel to the wheel stop position to prevent a perceptible jerk. In a number of embodiments, user touch input may be received, a first script may animate a wheel responsive to the user touch input, an initial wheel speed may be determined according to the user touch input, the wheel may be stopped, and a second script may animate the wheel spinning at the initial wheel speed and stopping at a determined stop position. As the second script may animate the wheel a fraction of a second after the wheel is stopped, any jerk between the animation performed by the first script and the animation performed by the second script may be visually imperceptible.

Figure 21A:
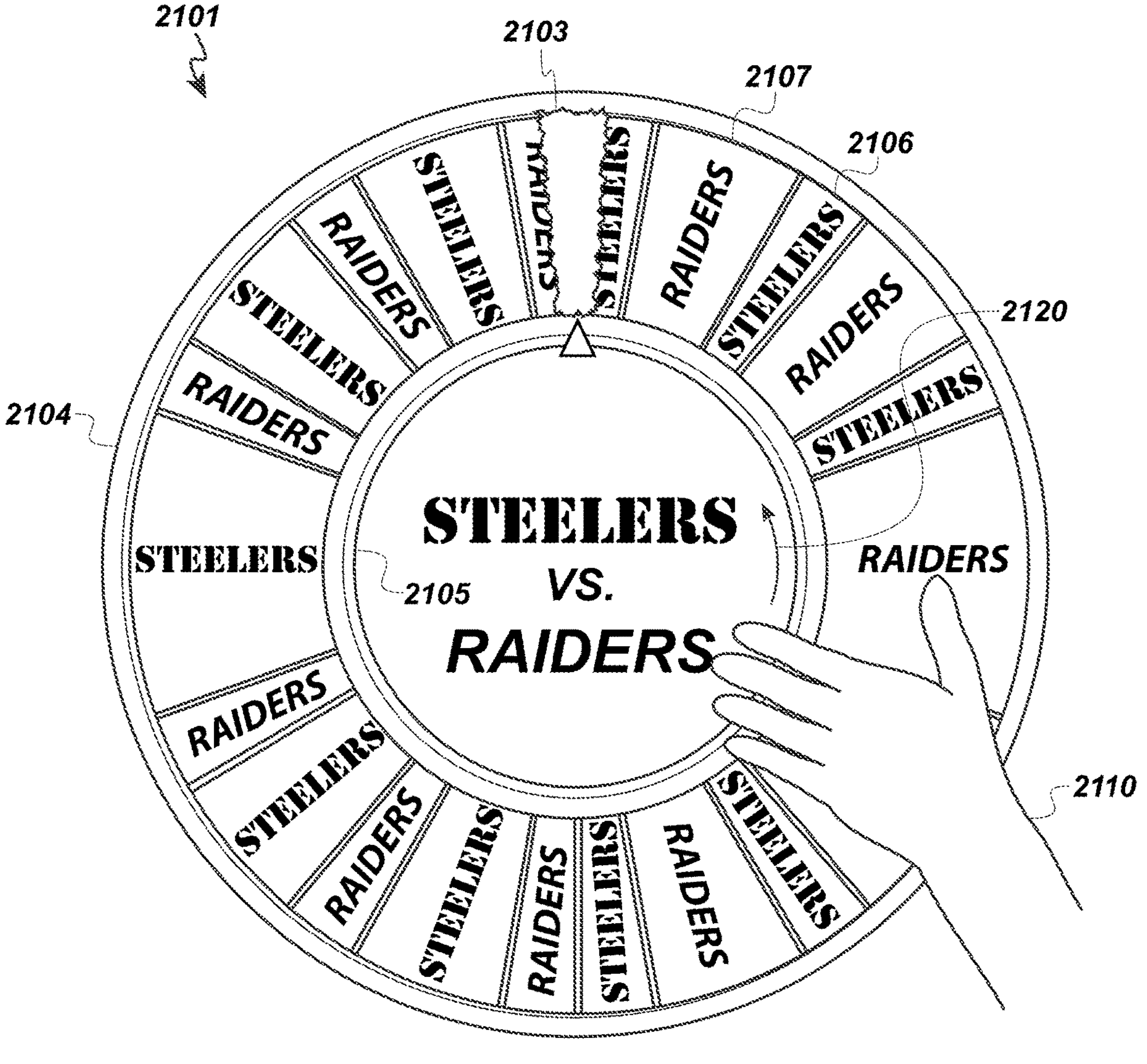
FIG. 21A depicts a player providing user touch input to move a wheel of a dynamic wheel type game.

For example, FIG. 21A depicts a player 2110 providing user touch input on a touch screen display to move a wheel of a dynamic wheel type game 2101. The dynamic wheel type game 2101 may involve an outer wheel 2104 that includes first segments 2106 for a first opponent and second segments 2107 for a second opponent. An indicator 2103 may be connected to an inner wheel 2105. The player 2110 may be able to move the inner wheel 2105 in a direction 2120 (and/or in an opposite direction) via user touch input and thus the indicator 2103.

Figure 21B:
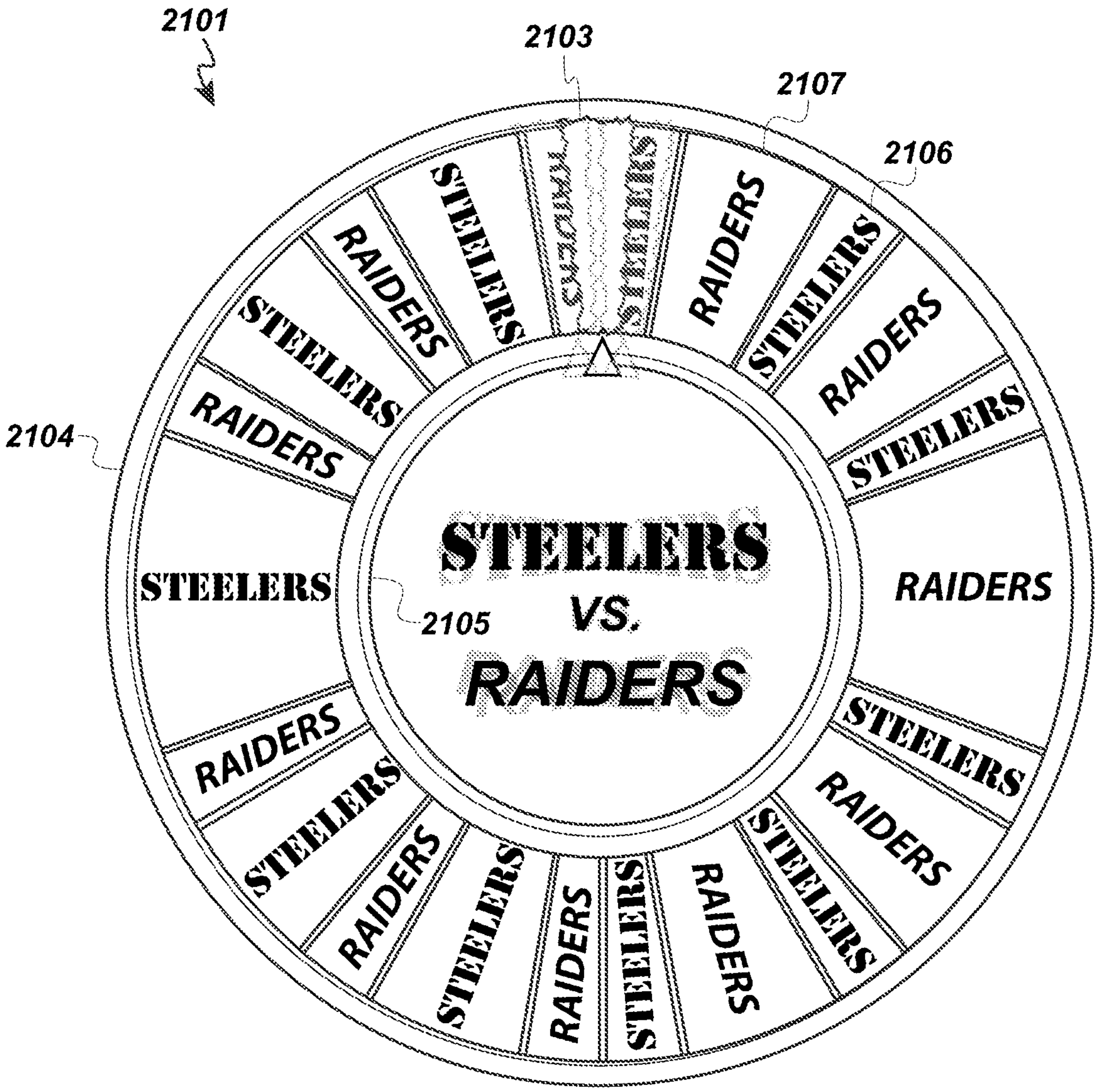
FIG. 21B depicts the wheel of the dynamic wheel type game illustrated in FIG. 21A spinning after the player provides the user touch input.

FIG. 21B depicts the wheel of the dynamic wheel type game 2101 illustrated in FIG. 21A spinning after the player 2110 provides the user touch input. As shown, the inner wheel 2105 and the indicator 2103 are animated as spinning in response to the user touch input.

Figure 21C:
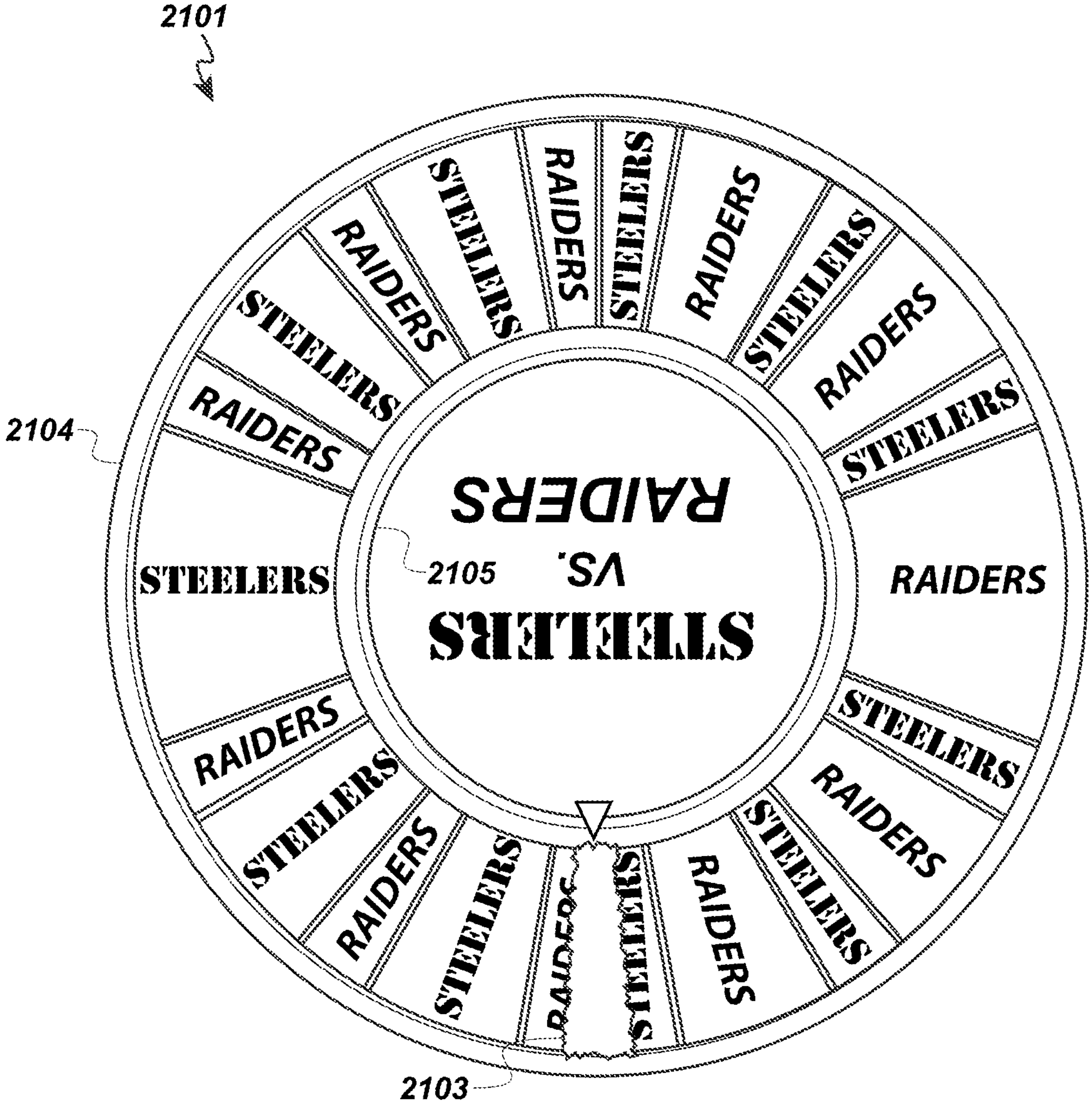
FIG. 21C depicts the wheel of the dynamic wheel type game illustrated in FIG. 21B after the wheel has been stopped at a stop position.

FIG. 21C depicts the wheel of the dynamic wheel type game 2101 illustrated in FIG. 21B after the wheel has been stopped at a stop position. As shown, the inner wheel 2105 and the indicator 2103 have been controlled to stop at a predetermined stop position.

Animation of the inner wheel 2105 and the indicator 2103 being animated to move in response to the user touch input and then being animated to be controlled to stop at the predetermined stop position may be performed according to a method such as the example method 2200 below and/or a process flow such as the example process flow described below with respect to FIG. 23. These methods and process flows will now be described in detail.

Figure 22:
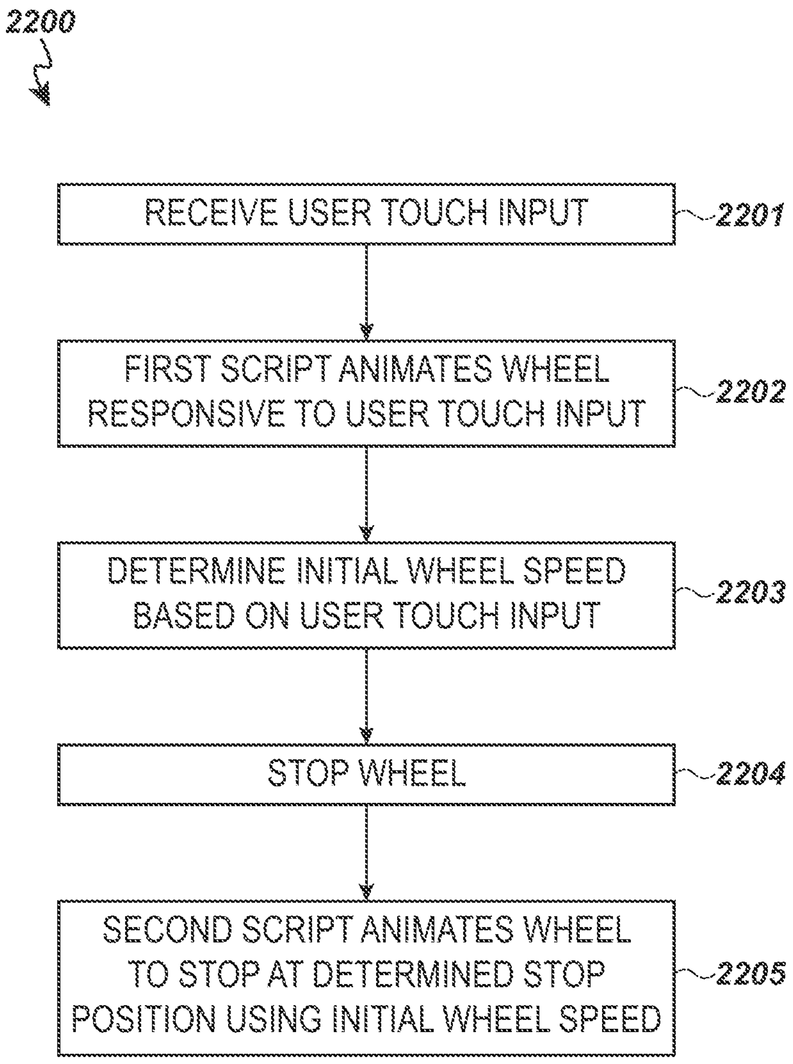
FIG. 22 depicts an example method for switching wheel movement between user touch input and a controlled outcome for a dynamic wheel type game. The method may be performed by one or more of the devices depicted in FIGS. 1-3.

FIG. 22 depicts an example method 2200 for switching wheel movement between user touch input and a controlled outcome for a dynamic wheel type game. The method 2200 may be performed by one or more of the devices depicted in FIGS. 1-3.

At operation 2201, an electronic device (such as one or more of the devices depicted in FIGS. 1-3) may receive user touch input (such as via the UI system 302 of FIG. 3). The user touch input may correspond to touching and sliding to move a wheel displayed on a display, such as a wheel of a dynamic wheel type game (such as is discussed above with respect to FIGS. 5B-5E).

At operation 2202, the electronic device may use a first script to animate the wheel responsive to the user touch input (such as via the UI system 302 of FIG. 3). For example, the first script may use the Unity engine or other physics engines to animate the wheel responsive to the user touch input. The Unity engine may simulate physics in virtual objects on displays to ensure that the objects correctly accelerate and respond to collisions, gravity, and various other forces as physical versions of the objects would in the real world.

At operation 2203, the electronic device may determine an initial wheel speed based on the user touch input. For example, the user touch input may be converted to a torque value and the initial wheel speed may be determined from the torque value.

At operation 2204, the electronic device may stop the wheel. The electronic device may use an adapter interface to stop the wheel.

At operation 2205, the electronic device may use a second script to animate the wheel to stop at a determined stop position using the initial wheel speed (such as via the UI system 302 of FIG. 3). In other words, the second script may animate the wheel moving (starting at the initial wheel speed) from a current, stopped position to the determined stop position. The electronic device may determine the determined stop position using one or more RNGs.

In various examples, this example method 2200 may be implemented as a group of interrelated software modules or components that perform various functions discussed herein. These software modules or components may be executed within a cloud network and/or by one or more computing devices, such as one or more of the devices depicted in FIGS. 1-3.

Although the example method 2200 is illustrated and described as including particular operations performed in a particular order, it is understood that this is an example. In various implementations, various orders of the same, similar, and/or different operations may be performed without departing from the scope of the present disclosure.

For example, the method 2200 is illustrated and described as using a first script and a second script. However, it is understood that this is an example. In various implementations, mechanisms other than scripts may be used. Various configurations are possible and contemplated without departing from the scope of the present disclosure.

Figure 23:
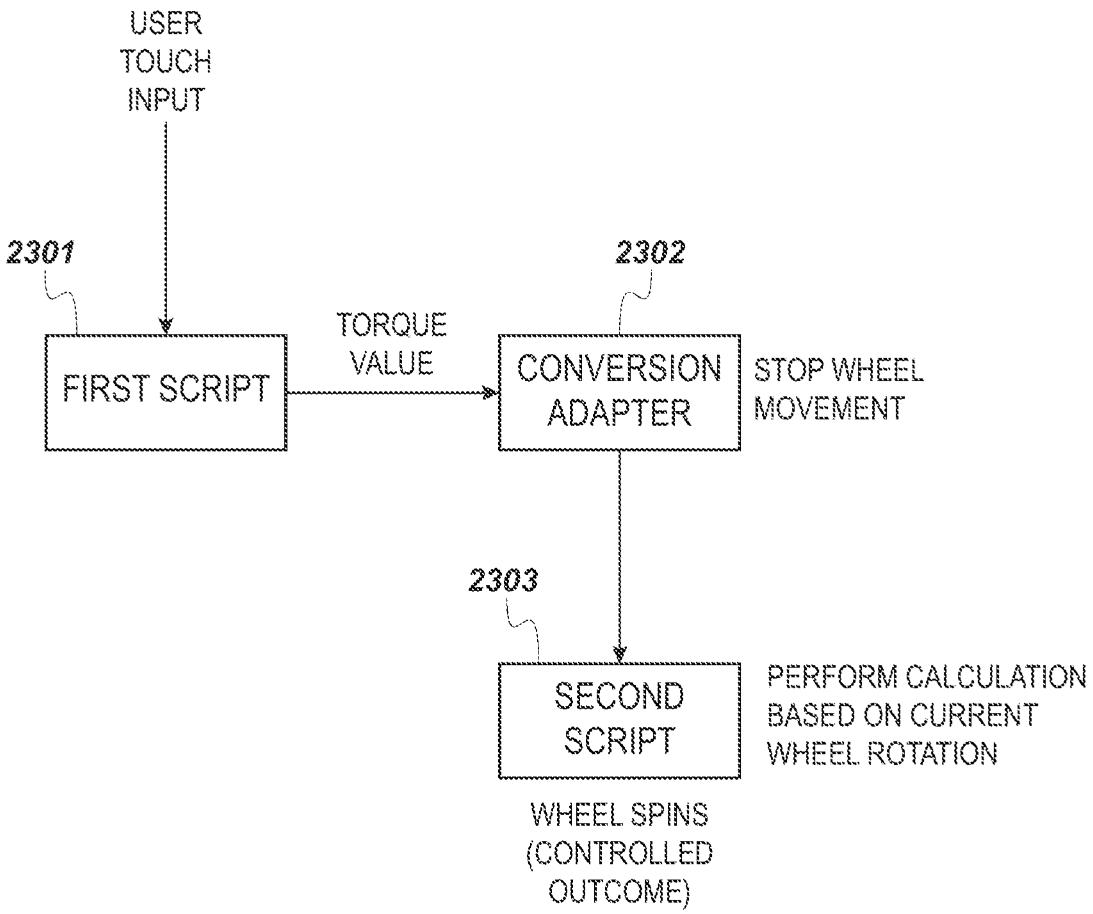
FIG. 23 depicts an example process flow for switching wheel movement between user touch input and a controlled outcome for a dynamic wheel type game. The process flow may be used in the context of the method of FIG. 22.

FIG. 23 depicts an example process flow for switching wheel movement between user touch input and a controlled outcome for a dynamic wheel type game. The process flow may be used in the context of the method of FIG. 22.

As shown, user touch input may be provided to the first script 2301. The first script 2301 may determine a torque value from the user touch input and provide such to a conversion adapter 2302. The conversion adapter 2302 may stop the wheel movement. The conversion adapter 2302 may also provide the torque value to a second script 2303. The second script 2303 may perform calculations based on a current wheel rotation to control the wheel to move to a controlled outcome stop position (which may be determined using an RNG). As the conversion adapter 2302 stopped the wheel, the current wheel rotation may be zero. The second script 2303 may then spin the wheel starting at an initial wheel speed corresponding to the torque value until the wheel stops at the controlled outcome stop position.

FIG. 23 illustrates the conversion adapter 2302 stopping the wheel after the wheel is animated to move by the first script 2301 and before the wheel is animated to move by the second script 2303. However, the time between the stopping of the wheel and animation of the wheel by the second script 2303 may be such that the stop is visually imperceptible to players. Various configurations are possible and contemplated without departing from the scope of the present disclosure.

Figure 24:
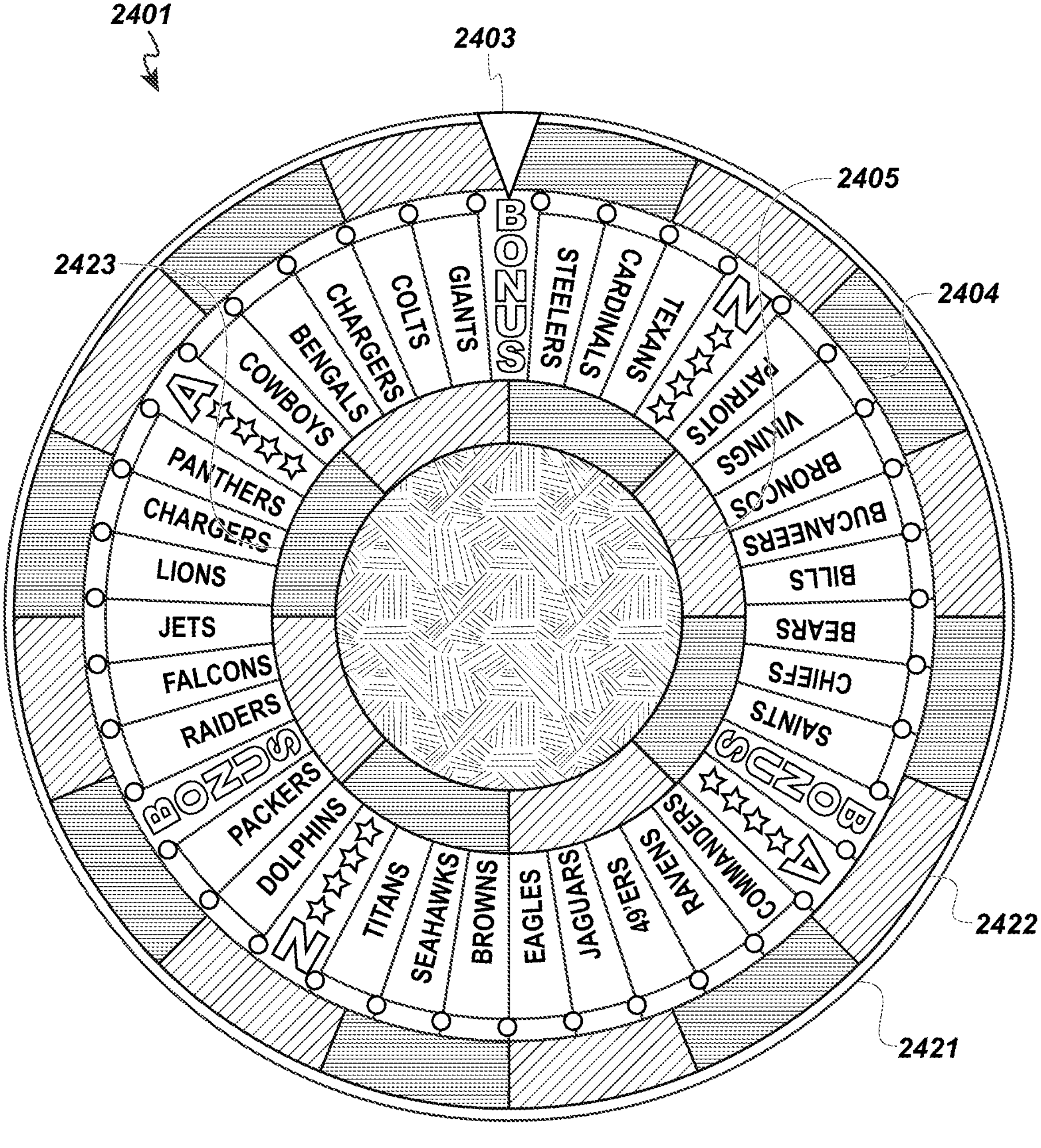
FIG. 24 depicts a wheel for a dynamic wheel type game.

FIG. 24 depicts a wheel 2401 for a dynamic wheel type game. The wheel 2401 may be formed of multiple displays (and/or other components) that may be operable to display various portions of the wheel 2401. For example, the wheel 2401 may include an LED matrix operable to display team segments of an outer wheel 2404 as well as an LCD operable to display an inner wheel 2405. The wheel 2401 may also include an indicator 2403 or pointer, an outer ring 2422, an inner ring 2423, and/or edge lighting 2421.

However, it is understood that this is an example. In other implementations, other configurations may be used without departing from the scope of the present disclosure.

Figure 25:
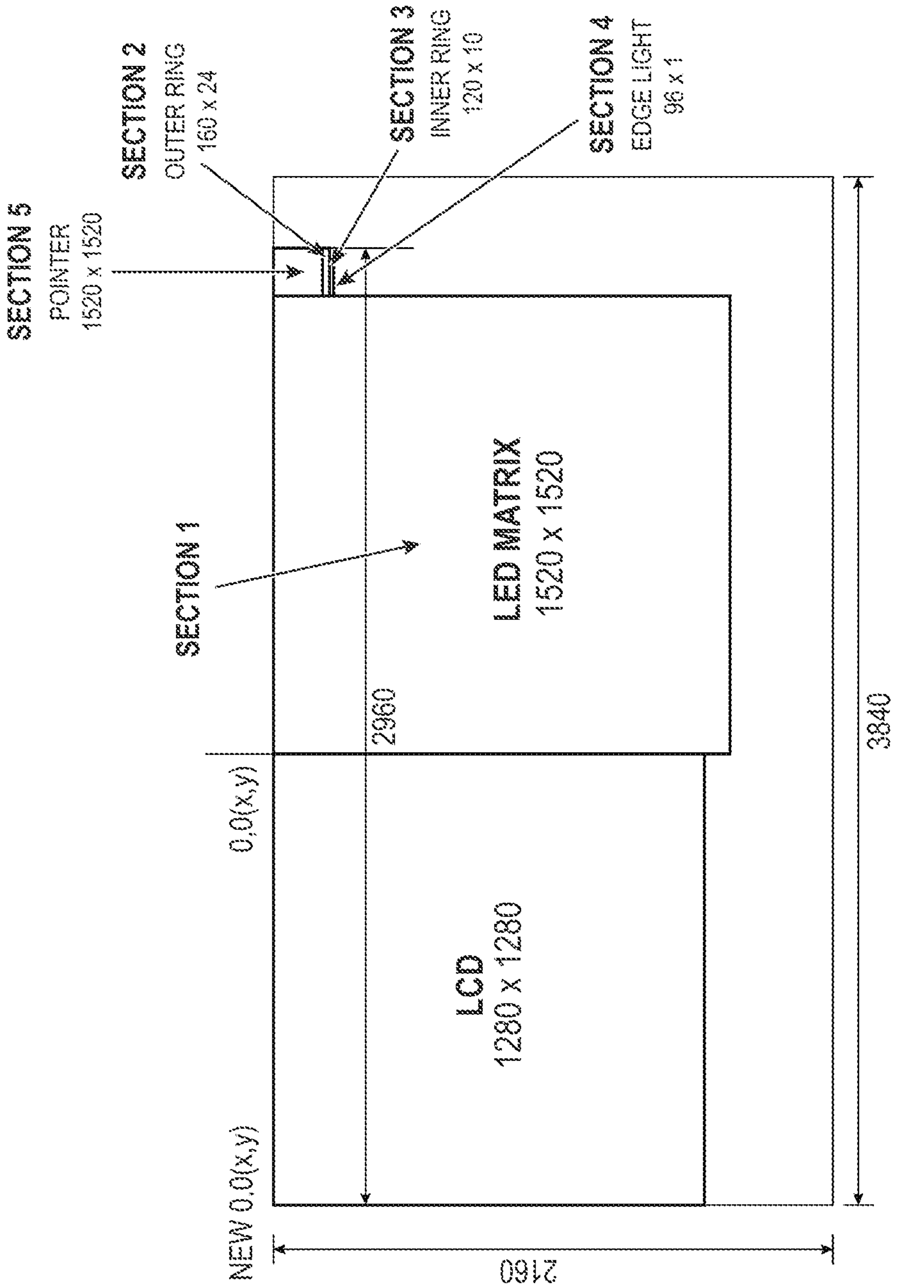
FIG. 25 depicts an example video mapping for causing display of the wheel of FIG. 24.

FIG. 25 depicts an example video mapping for causing display of the wheel of FIG. 24. The video mapping may include dedicated spaces for each of the components mentioned with respect to FIG. 24.

In some implementations, the video mapping may be performed by multiple computing devices. This may be advantageous when the video mapping for some portions may be transmitted to multiple different locations for display while other portions may be determined separately for each location. Alternatively, the video mapping may be performed by a single computing device. This may be advantageous as it may prevent coordination problems that may arise from using multiple different computing devices to maintain the video mapping for portions that may be displayed together. Various configurations are possible and contemplated without departing from the scope of the present disclosure.

The issue with dynamic wheel type games and other wheel type games discussed above that there may be a disconnect between animating spinning of a wheel responsive to user touch input and animating spinning of the wheel to arrive at a wheel stop position corresponding to a game outcome illustrates one of the issues with using virtual wheel elements instead of physical wheel elements. People are very comfortable the user interface of interacting with a physical wheel, such as a physical wheel that is spinnable and may include one or more pegs that cause a ticker or other indicator to move and/or tick and/or make other sounds. However, physical wheels and/or other physical elements are not configurable, limiting game play possibilities. Replacing physical elements with virtual elements that are configurable frees up limitations on game play possibilities, but do not generally have as intuitive a user interface as physical elements. However, physical elements may be configured to interact with virtual elements as if the virtual elements were physical elements, improving the user interface for users as the users may have a better understanding of what is going on.

Figure 26A:
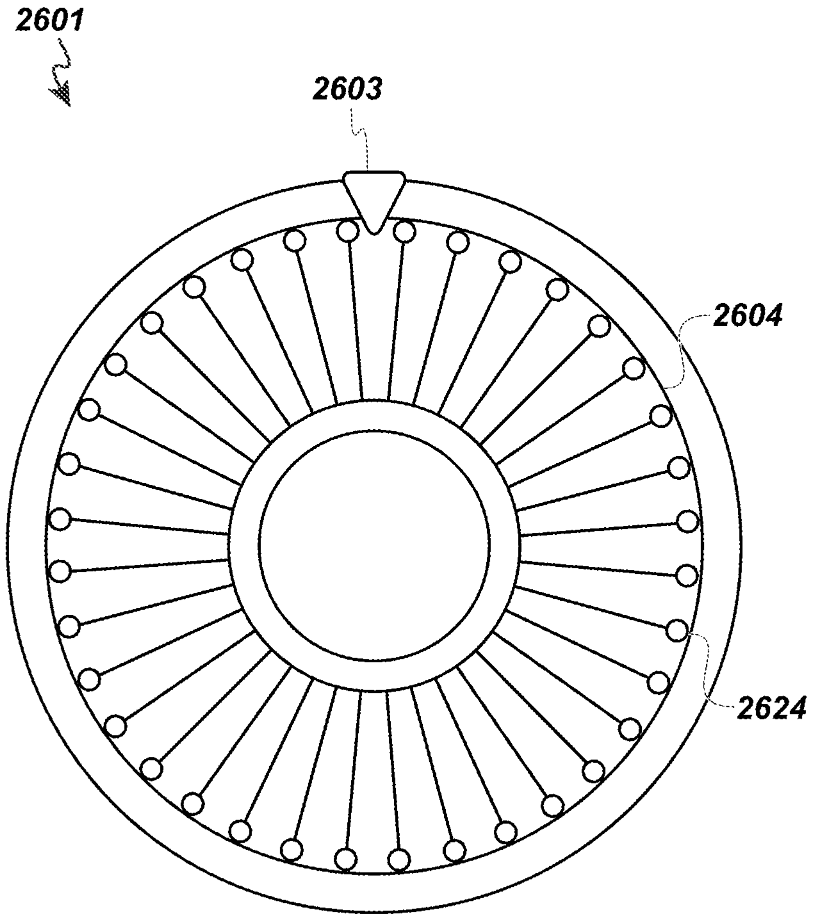
FIG. 26A depicts an indicator that interacts with a wheel of a dynamic wheel type game.

FIG. 26A depicts an indicator 2603 that interacts with a wheel 2604 of a dynamic wheel type game 2601. As shown, the indicator 2603 may be a triangular pointer and/or other element that may be connected to a servo motor and/or other actuator that is operable to move the indicator 2603 responsive to movement of the wheel 2604. For example, the wheel 2604 may include a number of virtual pegs 2624. When a virtual peg 2624 reaches the indictor 2603 during spinning of the wheel 2604, the servo motor and/or other actuator may move the indicator 2603 accordingly.

In some implementations, the indicator 2603 may also be a display. Various information may be displayed on such a display. Various configurations are possible and contemplated without departing from the scope of the present disclosure.

Figure 26B:
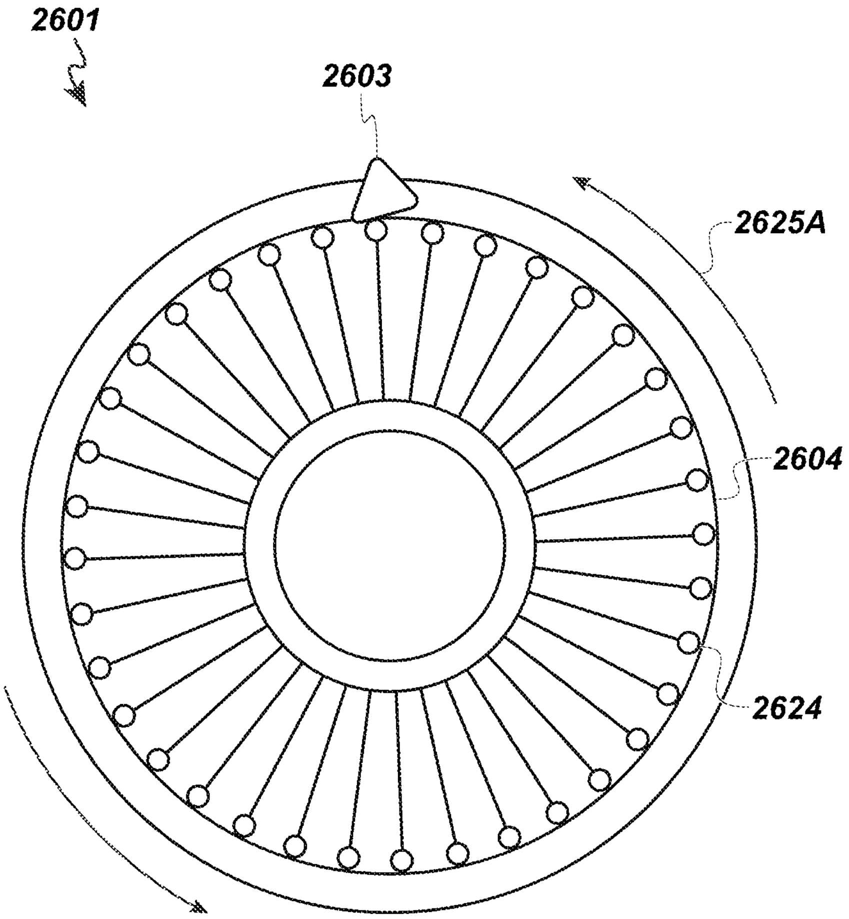
FIG. 26B depicts the wheel of FIG. 26A moving in a first direction.

FIG. 26B depicts the wheel 2604 of FIG. 26A moving in a first direction 2625A. As shown, the indicator 2603 is rotated corresponding to the first direction 2625A as if physically moved by the virtual pegs 2624.

Figure 26C:
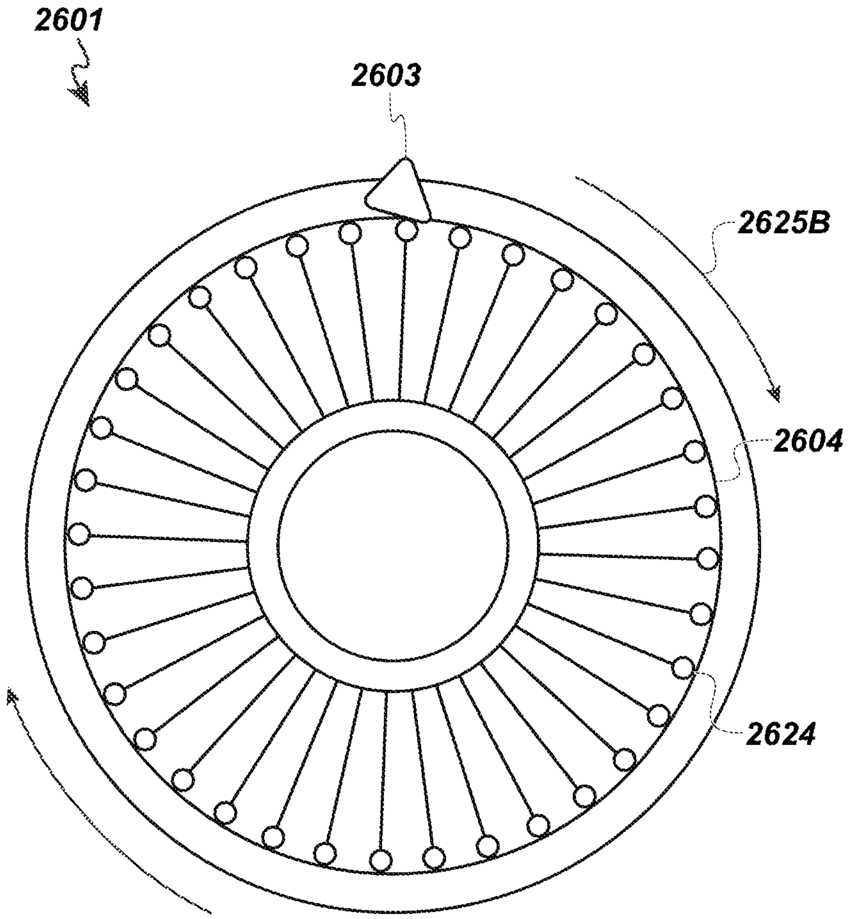
FIG. 26C depicts the wheel of FIG. 26B moving in a second direction.

FIG. 26C depicts the wheel 2604 of FIG. 26B moving in a second direction 2625B. As shown, the indicator 2603 is rotated corresponding to the second direction 2625B as if physically moved by the virtual pegs 2624.

The processing unit, processor, and/or other controller that controls the servo motor and/or other actuator may also control a ticking and/or other sound that may be presented at the same time that the indicator 2603 is moved. In various examples, different components may control the servo motor and/or other actuator and the sound.

In order to simulate physical elements, the sound and the movement may be synchronized. In some implementations, a determination to trigger one of the servo motor and/or other actuator or the sound may also trigger the other in order to synchronize these two items. In other implementations, the sound may be monitored (whether in software, using a microphone and/or other sensor, and so on) and the servo motor and/or other actuator may be actuated in response to detecting the sound. In still other implementations, the virtual peg 2624 may be optically detected, such as using a camera and/or other image sensors, and the servo motor and/or other actuator may be actuated (and/or the sound may be presented) in response to detecting the virtual peg 2624.

Figure 27A:
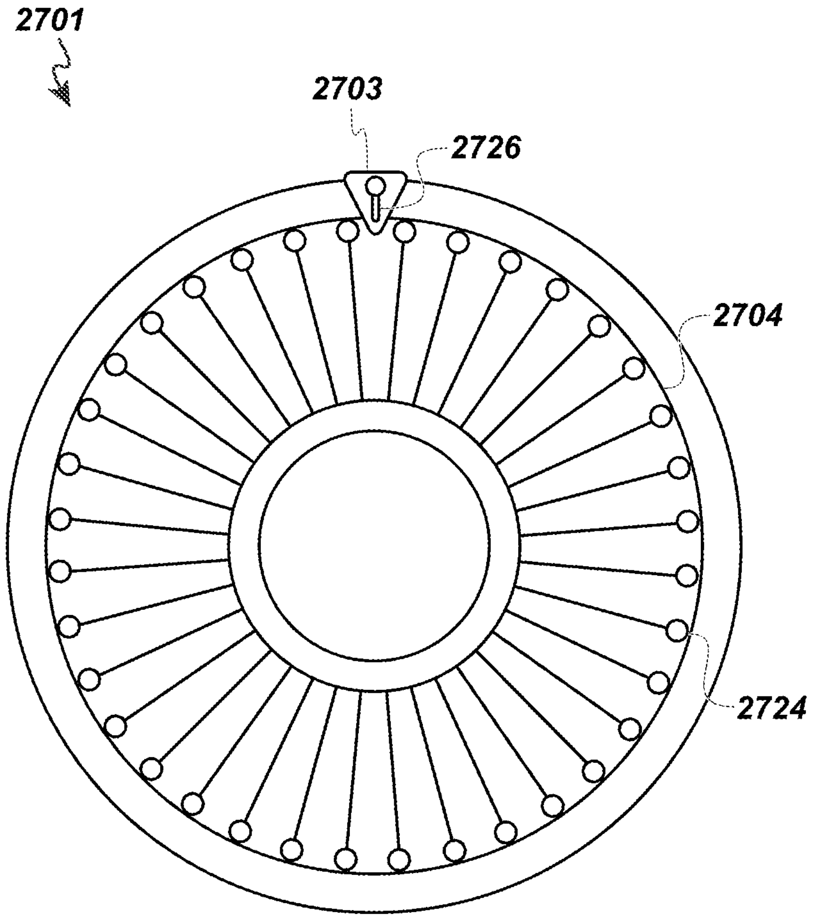
FIG. 27A depicts an indicator that interacts with a wheel of a dynamic wheel type game.

FIG. 27A depicts an indicator 2703 that interacts with a wheel 2704 of a dynamic wheel type game 2701. As shown, the indicator 2703 may be a triangular pointer and/or other element that is also a display operable to illustrate a virtual indicator 2726 that is operable to move responsive to movement of the wheel 2704. For example, the wheel 2704 may include a number of virtual pegs 2724. When a virtual peg 2724 reaches the virtual indicator 2726 during spinning of the wheel 2704, the indicator 2703 may change the virtual indicator 2726 as if moving accordingly.

Figure 27B:
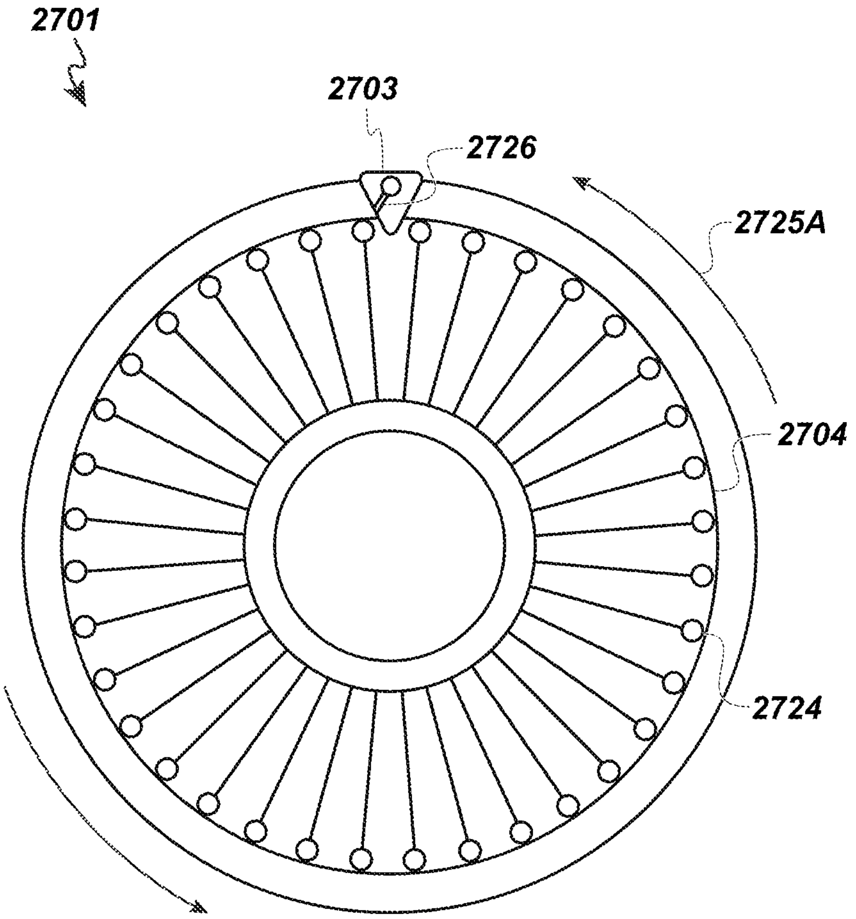
FIG. 27B depicts the wheel of FIG. 27A moving in a first direction.

FIG. 27B depicts the wheel 2704 of FIG. 27A moving in a first direction 2725A. As shown, the virtual indicator 2726 is rotated corresponding to the first direction 2725A as if physically moved by the virtual pegs 2724. As also shown, the virtual indicator 2726 may extend outside of the display area of the indicator 2703 when rotated.

Figure 27C:
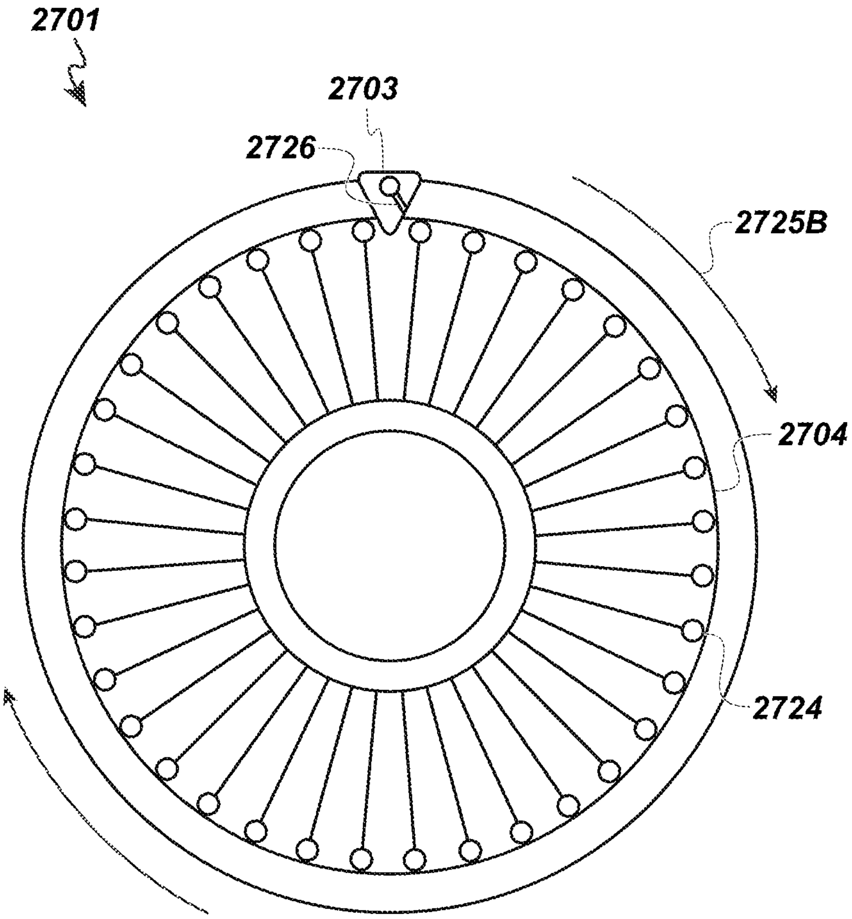
FIG. 27C depicts the wheel of FIG. 27B moving in a second direction.

FIG. 27C depicts the wheel 2704 of FIG. 27B moving in a second direction 2725B. As shown, the virtual indicator 2726 is rotated corresponding to the second direction 2725B as if physically moved by the virtual pegs 2724. As also shown, the virtual indicator 2726 may extend outside of the display area of the indicator 2703 when rotated.

Figure 28A:
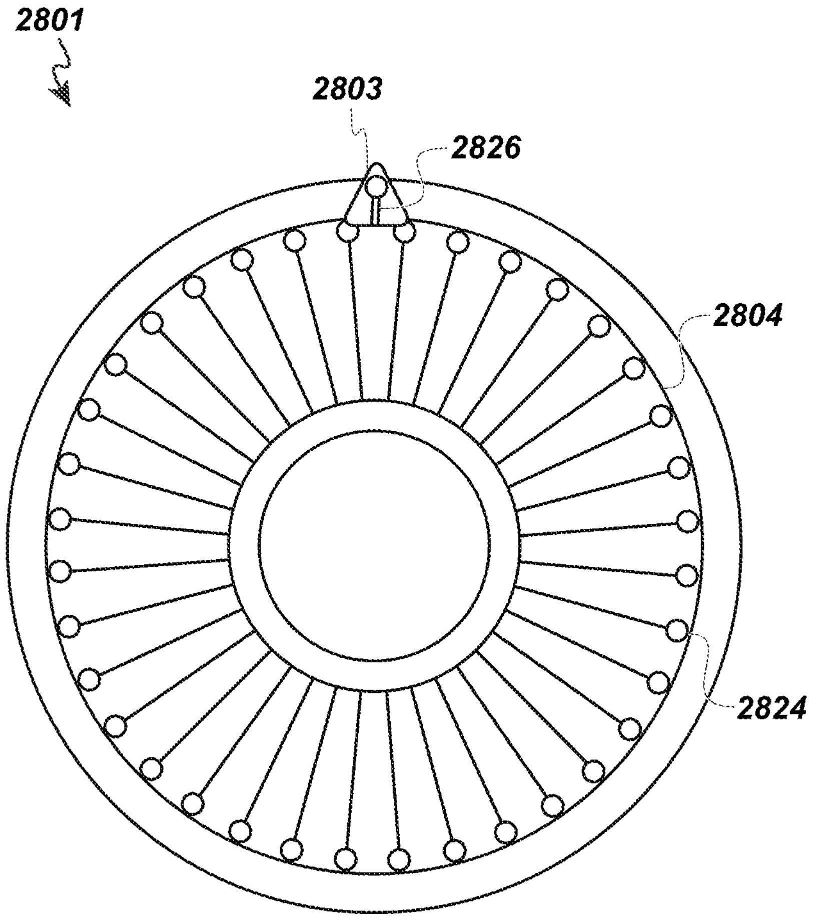
FIG. 28A depicts an indicator that interacts with a wheel of a dynamic wheel type game.

FIG. 28A depicts an indicator 2803 that interacts with a wheel 2804 of a dynamic wheel type game 2801. As shown, the indicator 2803 may be an inverted triangular pointer and/or other element that is also a display operable to illustrate a virtual indicator 2826 that is operable to move responsive to movement of the wheel 2804. For example, the wheel 2804 may include a number of virtual pegs 2824. When a virtual peg 2824 reaches the virtual indicator 2826 during spinning of the wheel 2804, the indicator 2803 may change the virtual indicator 2826 as if moving accordingly.

Figure 28B:
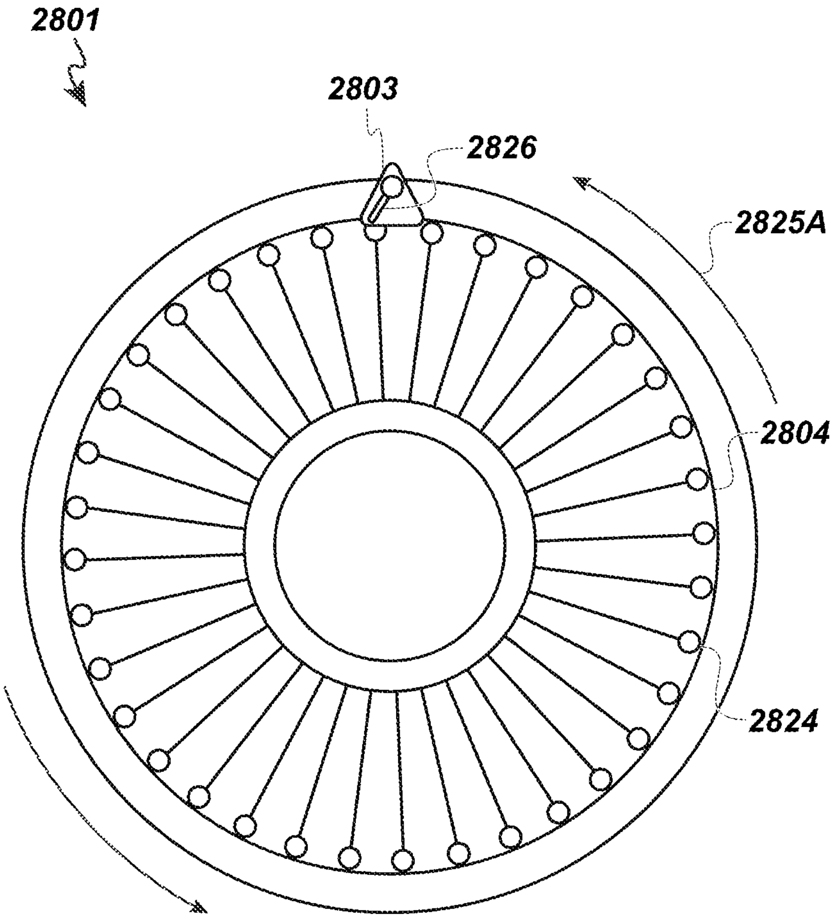
FIG. 28B depicts the wheel of FIG. 28A moving in a first direction.

FIG. 28B depicts the wheel 2804 of FIG. 28A moving in a first direction 2825A. As shown, the virtual indicator 2826 is rotated corresponding to the first direction 2825A as if physically moved by the virtual pegs 2824. As also shown, the virtual indicator 2826 may not extend outside of the display area of the indicator 2803 when rotated.

Figure 28C:
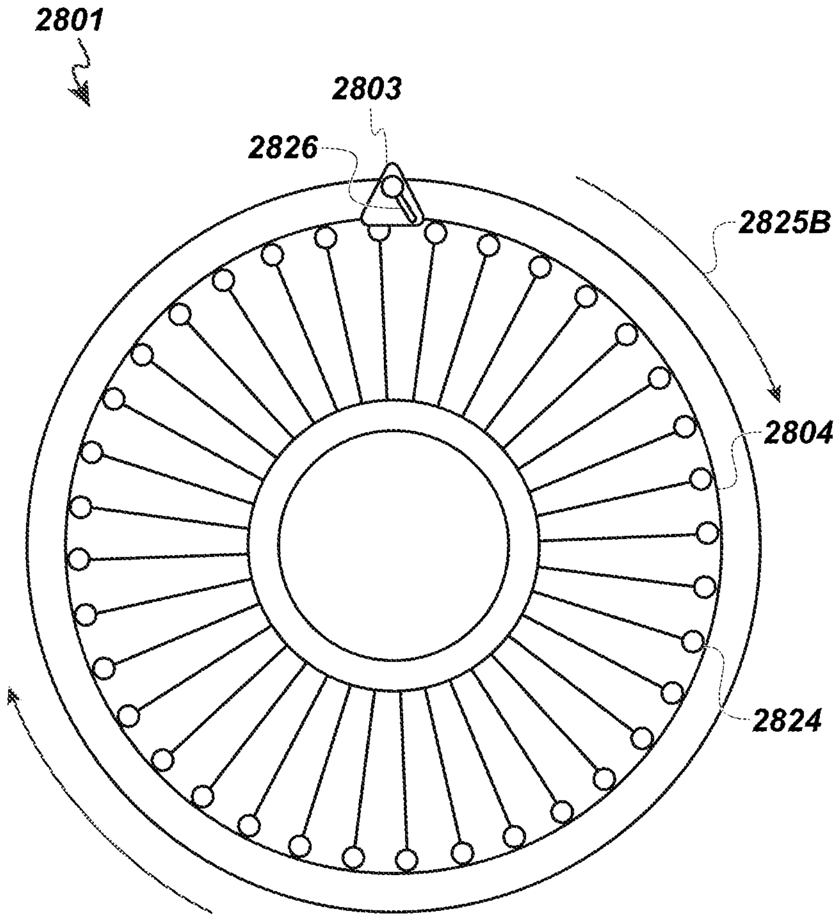
FIG. 28C depicts the wheel of FIG. 28B moving in a second direction.

FIG. 28C depicts the wheel 2804 of FIG. 28B moving in a second direction 2825B. As shown, the virtual indicator 2826 is rotated corresponding to the second direction 2825B as if physically moved by the virtual pegs 2824. As also shown, the virtual indicator 2826 may not extend outside of the display area of the indicator 2803 when rotated.

Figure 29A:
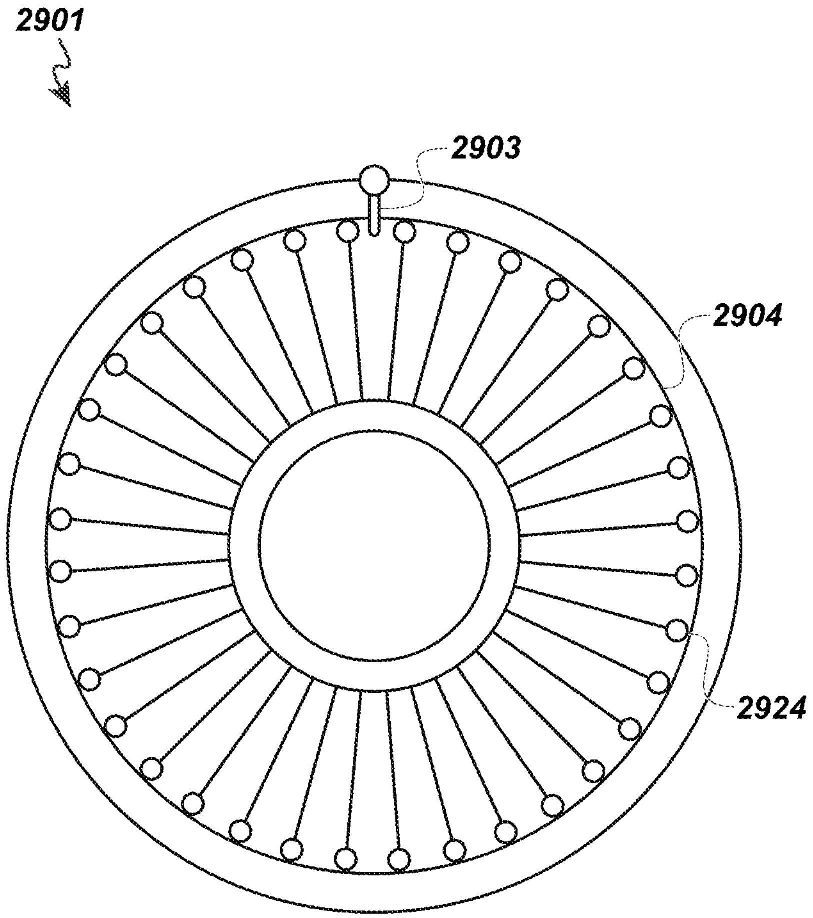
FIG. 29A depicts an indicator that interacts with a wheel of a dynamic wheel type game.

FIG. 29A depicts an indicator 2903 that interacts with a wheel 2904 of a dynamic wheel type game 2901. As shown, the indicator 2903 may be a flapper and/or other element that may be connected to a servo motor and/or other actuator that is operable to move the indicator 2903 responsive to movement of the wheel 2904. For example, the wheel 2904 may include a number of virtual pegs 2924. When a virtual peg 2924 reaches the indictor 2903 during spinning of the wheel 2904, the servo motor and/or other actuator may move the indicator 2903 accordingly.

In some implementations, the indicator 2903 may also be a display. Various information may be displayed on such a display. Various configurations are possible and contemplated without departing from the scope of the present disclosure.

Figure 29B:
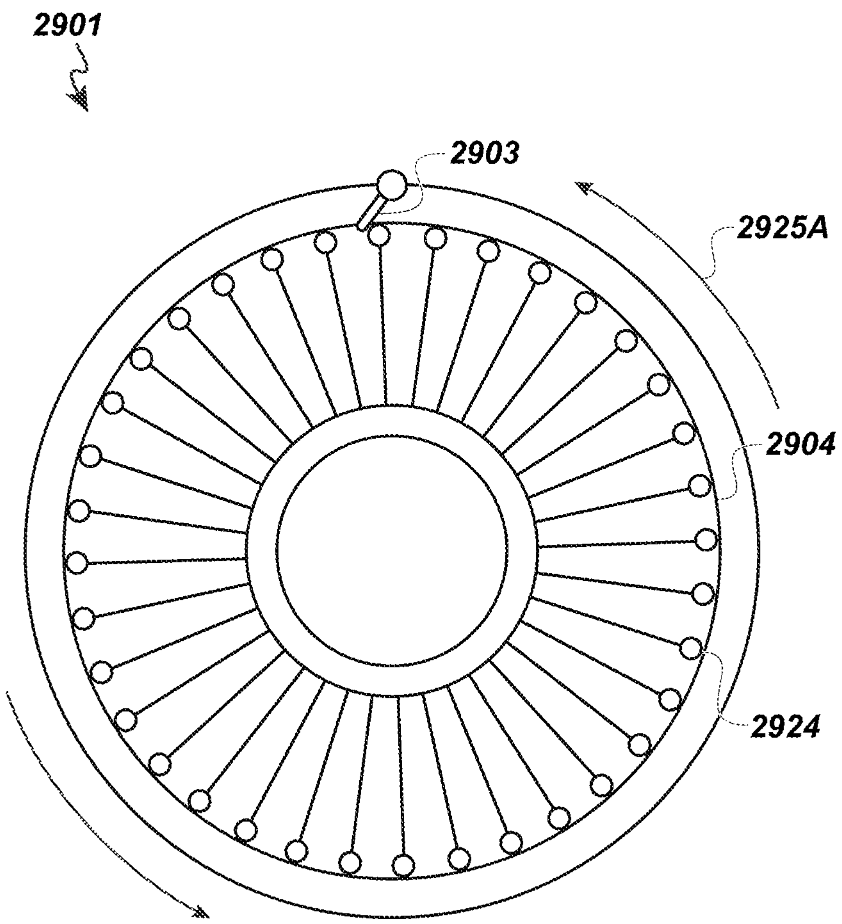
FIG. 29B depicts the wheel of FIG. 29A moving in a first direction.

FIG. 29B depicts the wheel 2904 of FIG. 29A moving in a first direction 2925A. As shown, the indicator 2603 is rotated corresponding to the first direction 2925A as if physically moved by the virtual pegs 2924.

Figure 29C:
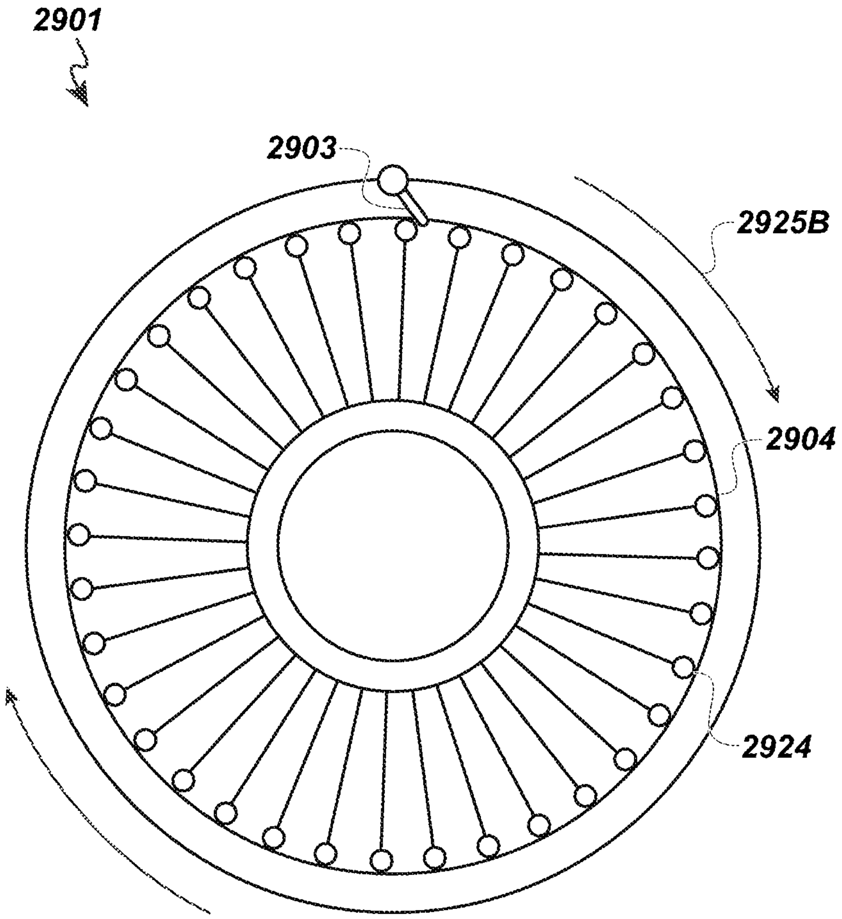
FIG. 29C depicts the wheel of FIG. 29B moving in a second direction.

FIG. 29C depicts the wheel 2904 of FIG. 29B moving in a second direction 2925B. As shown, the indicator 2603 is rotated corresponding to the second direction 2925B as if physically moved by the virtual pegs 2924.

Although specific configurations are illustrated and described with respect to FIGS. 26A-29C, it is understood that these are examples. In other implementations, other configurations may be used without departing from the scope of the present disclosure.

Figure 30:
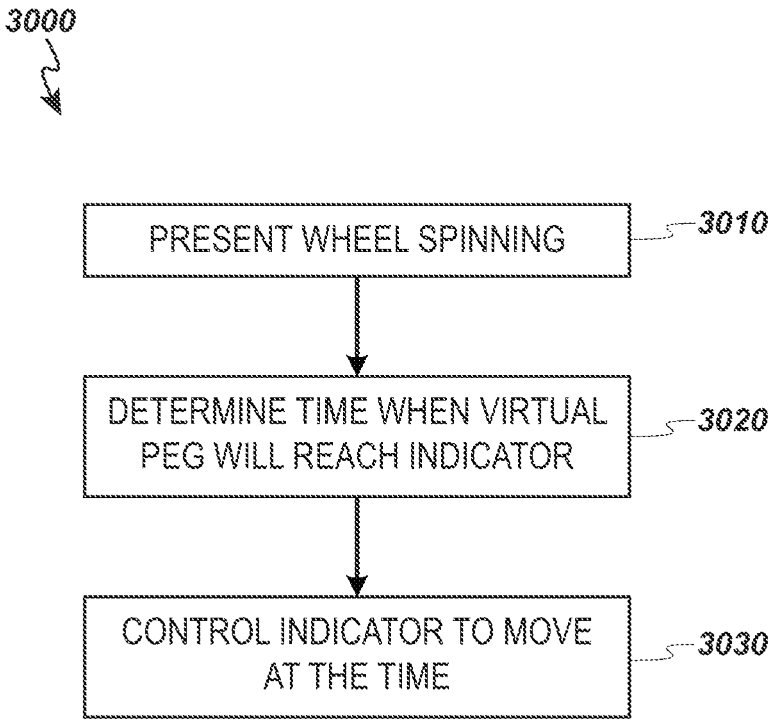
FIG. 30 depicts an example method for moving an indicator responsive to movement of a wheel of a dynamic wheel type game. The method may be performed by one or more of the devices depicted in FIGS. 1-3.

FIG. 30 depicts an example method 3000 for moving an indicator responsive to movement of a wheel of a dynamic wheel type game. The method 3000 may be performed by one or more of the devices depicted in FIGS. 1-3.

At operation 3010, a processor or mechanism presents a wheel spinning. In some examples, the spinning of the wheel may be presented in response to user input. Such user input may indicate a direction of spin, a speed of spin, a spin momentum, and so on.

At operation 3020, the processing unit determines a time when a virtual peg of the wheel will reach an indicator. The time may be determined by optically detecting the virtual peg, by determining when a sound associated with the indicator interacting with the virtual peg will be triggered, by monitoring when the sound is presented, and so on.

At operation 3030, the processing unit controls the indicator to move at the time. Such movement may be the same as and/or similar to that illustrated above with respect to FIGS. 26A-29C.

In various examples, this example method 3000 may be implemented as a group of interrelated software modules or components that perform various functions discussed herein. These software modules or components may be executed within a cloud network and/or by one or more computing devices, such as one or more of the devices depicted in FIGS. 1-3.

Although the example method 3000 is illustrated and described as including particular operations performed in a particular order, it is understood that this is an example. In various implementations, various orders of the same, similar, and/or different operations may be performed without departing from the scope of the present disclosure.

For example, the method 3000 is illustrated and described as controlling the indicator to move. However, it is understood that this is an example. In some implementations, the indicator may be a virtual indicator (such one displayed on a display) and the movement may be virtual Various configurations are possible and contemplated without departing from the scope of the present disclosure.

In various implementations, a system may include a non-transitory storage medium that stores instructions and a processor. The processor may execute the instructions to configure a bonus game triggerable from a base game that determines a winner between two opponents selected from the base game; set a highest jackpot for the bonus game awarded when user picks correspond to the winner between the two opponents, a loser between the two opponents, and an order of the two opponents; and maintain a target return to player for the highest jackpot by configuring odds of triggering the bonus game from the base game and the user picks corresponding to the winner, the loser, and the order of the two opponents.

In some examples, the processor may set a lower jackpot value for the bonus game awarded when the user picks correspond to one but not all of the winner, the loser, and the order of the two opponents. In various examples, the processor may set a lower jackpot value for the bonus game awarded when the user picks include a set of opponents that includes the winner and the loser.

In some implementations, a system may include a non-transitory storage medium that stores instructions and a processor. The processor may execute the instructions to determine a base game result of a base game corresponding to spinning of a first wheel including a group of opponents; determine the base game result triggers a bonus game that corresponds to spinning of a second wheel that includes multiple first segments corresponding to a first opponent of the group of opponents and multiple second segments corresponding to a second opponent of the group of opponents, a proportion of the second wheel corresponding to an area occupied by the multiple first segments compared to the multiple second segments corresponding to a first probability that the bonus game result will be the first opponent, the first probability corresponding to a target return to player; change the first probability that the bonus game result will be the first opponent to a second probability that the bonus game result will be the first opponent in exchange for a side bet; and maintain the target return to player by compensating for changing the first probability to the second probability.

In a number of examples, the processor may change the first probability that the bonus game result will be the first opponent to the second probability that the bonus game result will be the first opponent by changing a size of one of the multiple first segments. In various examples, the processor may change the first probability that the bonus game result will be the first opponent to the second probability that the bonus game result will be the first opponent by changing a number of the multiple first segments. In a number of examples, the processor may change the first probability that the bonus game result will be the first opponent to the second probability that the bonus game result will be the first opponent by changing the multiple first segments to correspond to a different opponent of the group of opponents.

In various examples, the processor may add a portion of the side bet to a pot when the bonus game result is the second opponent. In some such examples, the processor may use funds from the pot to compensate for changing the first probability that the bonus game result will be the first opponent to the second probability that the bonus game result will be the first opponent.

In a number of examples, the processor may compensate for changing the first probability that the bonus game result will be the first opponent to the second probability that the bonus game result will be the first opponent by decreasing a size of a potential award for the bonus game result being the first opponent. In various examples, the first wheel may be an outer wheel and the second wheel may be an inner wheel. In some examples, the second wheel may be an altered version of the first wheel. In various examples, the processor may transition a third wheel to the second wheel for the bonus game, the third wheel including a single first segment corresponding to the first opponent and a single second segment corresponding to the second opponent.

In a number of implementations, a system may include a non-transitory storage medium that stores instructions and a processor. The processor may execute the instructions to select a wheel layout including multiple first segments corresponding to a first opponent of a group of opponents and multiple second segments corresponding to a second opponent of the group of opponents; display a spinning wheel with the wheel layout on a main screen; receive multiple user picks from multiple electronic gaming machines; determine a wheel stop position for the spinning wheel; and communicate game results to each of the multiple electronic gaming machines that are determined according to the wheel stop position, a winner between the first opponent and the second opponent, a loser between the between the first opponent and the second opponent, an order of the first opponent and the second opponent, and a respective one of the multiple user picks.

In some examples, the processor may select the wheel layout to maintain a target return to player. In various examples, the processor may select the wheel layout using a weighted table of wheel layouts. In a number of examples, the processor may select the wheel layout from a set of wheel layouts that has an equal probability of being selected.

In a number of examples, the processor may change a probability of selecting the first opponent for the wheel layout in response to the multiple user picks. In some examples, the processor may provide an output via the main screen in response to the multiple user picks. In some examples, the processor may instruct the multiple electronic gaming machines to provide an output in response to the multiple user picks.

In various examples, the displaying the spinning wheel with the wheel layout on the main screen may include displaying multiple indicators on the main screen corresponding to the multiple electronic gaming machines. In some examples, the displaying the spinning wheel with the wheel layout on the main screen may include displaying a first indicator on the main screen corresponding to a first of the multiple electronic gaming machines during a first turn associated with the first of the multiple electronic gaming machines. In a number of such examples, the displaying the spinning wheel with the wheel layout on the main screen may include displaying a second indicator on the main screen corresponding to a second of the multiple electronic gaming machines during a second turn associated with a second of the multiple electronic gaming machines.

In some examples, the processor may set a highest jackpot when one of the multiple user picks correspond to the winner between the two opponents, a loser between the two opponents, and an order of the two opponents. In various examples, the processor may set a lower jackpot value when one of the multiple user picks correspond to one but not all of the winner, the loser, and the order of the two opponents. In a number of examples, the processor may set a lower jackpot value when one of the multiple user picks includes a set of opponents that includes the winner and the loser.

In various examples, a proportion of the wheel corresponding to an area occupied by the multiple first segments compared to the multiple second segments may correspond to a probability that the game results will be the first opponent.

In some implementations, a method may include selecting a wheel layout including multiple first segments corresponding to a first opponent of a group of opponents and multiple second segments corresponding to a second opponent of the group of opponents; displaying a spinning wheel with the wheel layout on a main screen; receiving multiple user picks from multiple electronic gaming machines; determining a wheel stop position for the spinning wheel; and communicating game results to each of the multiple electronic gaming machines that are determined according to the wheel stop position, a winner between the first opponent and the second opponent, a loser between the first opponent and the second opponent, an order of the first opponent and the second opponent, and a respective one of the multiple user picks.

In various examples, the method may further include selecting the wheel layout to maintain a target return to player. In a number of examples, the method may further include changing a probability of selecting the first opponent for the wheel layout in response to the multiple user picks.

In a number of implementations, a computer program product stored in at least one non-transitory computer-readable medium may include first instructions executable by at least one processor to select a wheel layout including multiple first segments corresponding to a first opponent of a group of opponents and multiple second segments corresponding to a second opponent of the group of opponents; second instructions executable by the at least one processor to display a spinning wheel with the wheel layout on a main screen; third instructions executable by the at least one processor to receive multiple user picks from multiple electronic gaming machines; fourth instructions executable by the at least one processor to determine a wheel stop position for the spinning wheel; and fifth instructions executable by the at least one processor to communicate game results to each of the multiple electronic gaming machines that are determined according to the wheel stop position, a winner between the first opponent and the second opponent, a loser between the first opponent and the second opponent, an order of the first opponent and the second opponent, and a respective one of the multiple user picks.

In various examples, the computer program product may further include sixth instructions executable by the at least one processor to provide an output via the main screen in response to the multiple user picks. In a number of examples, the computer program product may further include sixth instructions executable by the at least one processor to instruct the multiple electronic gaming machines to provide an output in response to the multiple user picks.

In various implementations, a system may include a non-transitory storage medium that stores instructions and a processor. The processor may execute the instructions to perform an evaluation of at least one parameter or condition of a wheel type game, select at least one audio or visual output according to the evaluation, and output the at least one audio or visual output.

In some examples, the processor may provide a first output upon determining that a player participated in a previous game instance where a second output was provided and the second output upon determining that the player did not participate in the previous game instance where the second output was provided. In a number of examples, the processor may perform the evaluation of the at least one parameter or condition by evaluating at least one rule associated with the at least one audio or visual output.

In various examples, the at least one parameter or condition may be that a game outcome is rare or uncommon according to a distribution of wheel segments. In some examples, the at least one parameter or condition may be that a game outcome is a near miss or a close call according to a distribution of wheel segments. In a number of examples, the at least one parameter or condition may be a distribution of wheel segments. In various examples, the at least one parameter or condition may be a threshold number of players selecting a same opponent for the wheel type game.

In some examples, the processor may perform the evaluation of the at least one parameter or condition by comparing the at least one of the parameter or condition to a previous game instance. In a number of examples, the processor may perform the evaluation of the at least one parameter or condition by comparing the at least one of the parameter or condition to real life historical sport data accessed by the processor. In various examples, the processor may dynamically assemble the at least one audio or visual output from a set of output segments.

In some implementations, a system may include a non-transitory storage medium that stores instructions and a processor. The processor may execute the instructions to select opponents for a wheel type game, retrieve a first color for a first of the opponents and a second color for a second of the opponents, determine that the first color is similar to the second color, retrieve an alternate color, and animate output for the wheel type game including the first color and the alternate color.

In various examples, the processor may determine that the first color is similar to the second color by comparing a first RGB value of the first color to a second RGB value of the second color. In some such examples, the processor may compare the first RGB value of the first color to the second RGB value of the second color by calculating a distance between the first RGB value and the second RGB value using a three-dimensional distance formula.

In a number of examples, the processor may determine whether the distance is greater than a threshold. In some examples, the processor may retrieve the first color, the second color, and the alternate color from a table that associates opponents and colors.

In a number of implementations, a system may include a non-transitory storage medium that stores instructions and a processor. The processor may execute the instructions to receive user touch input to spin a wheel of a wheel type game, animate the wheel responsive to the user touch input, determine an initial wheel speed according to the user touch input, stop the wheel, and animate the wheel spinning at the initial wheel speed and stopping at a wheel stop position.

In various examples, the processor may determine the initial wheel speed according to the user touch input by converting the user touch input to a torque value. In some examples, the processor stopping the wheel may be visually imperceptible to a player. In a number of examples, the processor may use a first script to animate the wheel responsive to the user touch input and a second script to animate the wheel spinning at the initial wheel speed and stopping at the wheel stop position. In various examples, the user touch input may be a swipe.

In various implementations, a system may include a non-transitory storage medium that stores instructions and a processor. The processor may execute the instructions to receive user touch input on a touch screen display to spin a wheel of a wheel type game, animate the wheel responsive to the user touch input using a physics engine, determine an initial wheel speed according to the user touch input by converting the user touch input to a torque value, stop the wheel, and animate the wheel spinning at the initial wheel speed and stopping at a wheel stop position.

In some examples, the processor stopping the wheel may be visually imperceptible to a player. In various examples, the physics engine may simulate physics in virtual objects on displays to ensure that the objects correctly accelerate and respond to collisions, gravity, and other forces as physical versions of the objects would in the real world.

In a number of examples, the processor may use a first script to animate the wheel responsive to the user touch input and a second script to animate the wheel spinning at the initial wheel speed and stopping at the wheel stop position. In various such examples, the first script may determine the torque value from the user touch input and provide such to a conversion adapter. In some such examples, the first script may provide the torque value to a conversion adapter. In a number of such examples, the conversion adapter may stop the when and provide the torque value to the second script. In various such examples, the second script may animate the wheel spinning at the initial wheel speed corresponding to the torque value until the wheel stops at the wheel stop position.

In some examples, the processor may determine the wheel stop position using a random number generator that produces numbers related to wheel stop positions. In various examples, the processor may use an adapter interface to stop the wheel.

In a number of implementations, a system may include a display, a physical ticker adjacent the display, a non-transitory storage medium that stores instructions, and a processor. The processor may execute the instructions to control display of a wheel of a wheel type game rotating on the display, the wheel including virtual pegs and control the physical ticker to move when one of the virtual pegs passes the physical ticker.

In various examples, the physical ticker may be a mechanical flapper. In some examples, the processor may control a servo to move the physical ticker. In a number of examples, the processor may control the physical ticker to move upon optically detecting that the one of the virtual pegs passes the physical ticker.

In some examples, the processor may control play of a sound when the one of the virtual pegs passes the physical ticker. In various such examples, the processor may control the physical ticker to move upon at least one of determining to control play of the sound or receiving an instruction to control play of the sound.

In a number of examples, the movement may be in a same direction as a rotation of the wheel. In various examples, the processor may control the physical ticker to move in a first direction when a rotation of the wheel is in the first direction and control the physical ticker to move in a second direction when the rotation of the wheel is in the first direction. In some examples, the processor may determine a direction in which the wheel is rotating and control the physical ticker to move in the direction. In a number of examples, the processor may be a component of a server that transmits a message to an electronic device that includes the physical ticker.

While the disclosure has been described with respect to the figures, it will be appreciated that many modifications and changes may be made by those skilled in the art without departing from the spirit of the disclosure. Any variation and derivation from the above description and figures are included in the scope of the present disclosure as defined by the claims.

What is claimed is:

1. A system comprising:

a non-transitory storage medium that stores instructions; and a processor that executes the instructions to:

receive user touch input on a touch screen display to spin a wheel of a wheel type game;

animate the wheel responsive to the user touch input using a physics engine;

determine an initial wheel speed according to the user touch input by converting the user touch input to a torque value;

stop the wheel; and re-animate the wheel spinning at the initial wheel speed and stopping at a wheel stop position.

2. The system of claim 1, wherein the processor stopping the wheel is visually imperceptible to a player.

3. The system of claim 1, wherein the physics engine simulates physics in virtual objects on displays to ensure that the objects correctly accelerate and respond to collisions, gravity, and other forces as physical versions of the objects would in the real world.

4. The system of claim 1, wherein the processor uses:

a first script to animate the wheel responsive to the user touch input; and a second script to re-animate the wheel spinning at the initial wheel speed and stopping at the wheel stop position.

5. The system of claim 4, wherein the first script determines the torque value from the user touch input and provides such to a conversion adapter.

6. The system of claim 4, wherein the first script provides the torque value to a conversion adapter.

7. The system of claim 6, wherein the conversion adapter stops the wheel and provides the torque value to the second script.

8. The system of claim 7, wherein the second script re-animates the wheel spinning at the initial wheel speed corresponding to the torque value until the wheel stops at the wheel stop position.

9. The system of claim 1, wherein the processor determines the wheel stop position using a random number generator that produces numbers related to wheel stop positions.

10. The system of claim 1, wherein the processor uses an adapter interface to stop the wheel.

11. The system of claim 1, wherein the physics engine simulates physics in virtual objects on displays to ensure that the objects correctly accelerate and respond to collisions, gravity, and centripetal forces as physical versions of the objects would in the real world.

* * * * *